US006643254B1

United States Patent
Kajitani et al.

(10) Patent No.: US 6,643,254 B1
(45) Date of Patent: Nov. 4, 2003

(54) REROUTING METHOD FOR A PVC ROUTE ON AN ATM NETWORK AND A NETWORK MANAGEMENT SYSTEM USING THE REROUTING METHOD

(75) Inventors: Yuki Kajitani, Kawasaki (JP); Hiroaki Abe, Kawasaki (JP); Toshimasa Arai, Kawasaki (JP); Asuro Harada, Kawasaki (JP); Yasuhiro Yamaguchi, Kawasaki (JP); Kazuya Jimbo, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/305,982

(22) Filed: May 5, 1999

(30) Foreign Application Priority Data

Aug. 6, 1998 (JP) .......................................... 10-223166

(51) Int. Cl.[7] .............................................. H04L 12/28
(52) U.S. Cl. ........................ 370/217; 370/218; 370/248
(58) Field of Search ................................ 370/218, 221, 370/248, 397, 216, 217, 360

(56) References Cited

U.S. PATENT DOCUMENTS

| 5,065,393 A | * 11/1991 | Sibbitt et al. ............... 370/360 |
| 5,905,714 A | * 5/1999 | Havansi ...................... 370/218 |
| 6,055,239 A | * 4/2000 | Kato .......................... 370/397 |
| 6,181,680 B1 | * 1/2001 | Nagata et al. ............... 370/248 |
| 6,311,288 B1 | * 10/2001 | Heeren et al. ............... 370/217 |
| 6,442,132 B1 | * 8/2002 | Burns et al. ................. 370/218 |

FOREIGN PATENT DOCUMENTS

| JP | 9-036884 | 2/1997 |
| JP | 10-164079 | * 6/1998 |

* cited by examiner

Primary Examiner—Salvatore Cangialosi
(74) Attorney, Agent, or Firm—Katten Muchin Zavis Roseman

(57) ABSTRACT

The present invention relates to a method of rerouting a PVC route on an ATM network by previously defining an alternate route for the PVC route and by switching the PVC route to a previously defined alternate route when a fault occurs in a network element forming the PVC route. Further, the present invention relates to a network management system connected to a plurality of network elements, and includes an ATM network resource managing unit for managing resources included in the ATM network; a PVC connection managing unit connected to the element data collecting unit through the LAN or WAN for managing situation of connection of the PVC route; a PVC route searching unit for searching the PVC route; a fault event analyzing unit for receiving a fault from the fault notifying unit through the communication network when the fault occurs at any one of network elements, and analyzing the fault; an alternate route defining unit for previously defining the alternate route for the PVC; and an alternate route processing unit for switching a faulty route to the alternate route defined by the alternate route defining unit when the fault occurs at any one of network elements.

32 Claims, 44 Drawing Sheets

Fig.37

| | E56 | |
|---|---|---|
| PVC 1 | NE1→VP1(VC1)→NE2→VP2(VC2)→NE3→ VP3(VC3)→NE4→VP4(VC4)→NE5 | |
| PVC 2 | NE1→VP1(VC20)→NE2→VP2(VC21)→NE3 | |
| ... | ... | |
| PVCn | NE8→VP20(VC39)→NE9 | |

E57' (BEFORE CHANGE)

| PRIORITY ORDER | NAME | ALTERNATE ROUTE |
|---|---|---|
| 1 | PVC(1)1 | NE1→NE2→NE6→NE7→NE4→NE5 |
| 2 | PVC(1)2 | NE1→NE2→NE6→NE3→NE4→NE5 |
| 3 | PVC(1)3 | NE1→NE2→NE3→NE7→NE4→NE5 |
| 4 | PVC(1)4 | NE1→NE2→NE8→NE3→NE4→NE5 |
| 5 | PVC(1)5 | NE1→NE2→NE3→NE9→NE4→NE5 |
| 6 | PVC(1)6 | NE1→NE2→NE8→NE9→NE4→NE5 |
| 7 | PVC(1)7 | NE1→NE2→NE8→NE3→NE7→NE4→NE5 |
| 8 | PVC(1)8 | NE1→NE2→NE8→NE9→NE3→NE4→NE5 |
| 9 | PVC(1)9 | NE1→NE2→NE8→NE9→NE3→NE7→NE4→NE5 |

E57 (AFTER CHANGE)

| PRIORITY ORDER | NAME | ALTERNATE ROUTE |
|---|---|---|
| 1 | PVC(1)9 | NE1→NE2→NE8→NE9→NE3→NE7→NE4→NE5 |
| 2 | PVC(1)4 | NE1→NE2→NE8→NE3→NE4→NE5 |
| 3 | PVC(1)3 | NE1→NE2→NE3→NE7→NE4→NE5 |
| 4 | PVC(1)6 | NE1→NE2→NE8→NE9→NE4→NE5 |
| 5 | PVC(1)5 | NE1→NE2→NE3→NE9→NE4→NE5 |
| 6 | PVC(1)2 | NE1→NE2→NE6→NE3→NE4→NE5 |
| 7 | PVC(1)1 | NE1→NE2→NE6→NE7→NE4→NE5 |
| 8 | PVC(1)8 | NE1→NE2→NE8→NE9→NE3→NE4→NE5 |
| 9 | PVC(1)7 | NE1→NE2→NE8→NE3→NE7→NE4→NE5 |

REROUTING METHOD FOR A PVC ROUTE ON AN ATM NETWORK AND A NETWORK MANAGEMENT SYSTEM USING THE REROUTING METHOD

BACKGROUND OF THE INVENTION

1. Field of the Invention

The present invention relates to an ATM (Asynchronous Transfer Mode) network in the field of a network management operated by an operation company coupled to an information communication network, or a network management operated within a company. In particular, the present invention relates to an operation of the network management having a rerouting function in response to a fault of a structural component (a network element) provided on a PVC (Permanent Virtual Connection) route.

Further, the present invention relates to a method of managing a plurality of network elements in an ATM exchange network formed of a plurality of ATM exchanges, transfer units, routers, bridges, computers, etc. connected to each other through networks.

Still further, the present invention relates to a method of manually or automatically switching to another PVC route when a fault occurs at any one of network elements provided in the PVC route, as the operation from the network management system.

2. Description of the Related Art

There are common services to be improved, i.e., an improvement in the efficiency of an operator's work in order to manage each domain of a network, and an improvement of service to an end user who utilizes the network. These common subjects should be solved in the network management system. Accordingly, the present invention aims to improve efficiency of the operation of the network management in the service field. On the other hand, an action to realize network standardization, for example, ITU-T Recommendation, ISO, etc., has been developed by network operation companies or by network equipment vendors.

For a fault of a line interface, it is possible to switch the faulty line interface to an alternate line interface based on an APS function provided in an ATM exchange. Conventional alternation systems provided in the ATM exchange have been disclosed, for example, in the Japanese Unexamined Patent Publication (Kokai) No. 8-242240, the Japanese Unexamined Patent Publication (Kokai) No. 5-160851 and the Japanese Unexamined Patent Publication (Kokai) No. 7-74747.

These documents, however, disclose an alternation system which can be utilized only for a faulty ATM exchange itself or only for a network element adjacent to the faulty ATM exchange. That is, the conventional alternation system cannot be applied to a PVC route from one end to the other end including the faulty ATM and network element.

In actuality, when the fault occurs in the ATM exchange so that it is necessary to provide a route which is alternate to the faulty ATM exchange, or when one of doubled VOD servers is faulty so that it is necessary to switch the faulty VOD server to the other VOD server, it is possible to solve the above switching process based on only operation from the network management system from the viewpoint of the whole of the network.

Further, as another conventional method, there is a method of searching another route just after the fault occurred, and determining an alternate route based on a result of search. However, a lot of time is required in this method so that it is very difficult to utilize this method in actual use.

Still further, when handling a very large network system, for example, an ATM network which is operated by a communication company, network elements themselves become very large and complicated, the amount of managing data and kinds which are held in each network element becomes large, and the number of network elements becomes also very large.

In the above case, in the network management system which handles managing data of network elements having such very large scale, many kinds and very large amount, when resolving a fault by using an alternation system when the fault occurs on the communication network, a lot of time is required for detecting the alternate route in real-time for each network element. Further, in the alternation function only for each network element, it is impossible to resolve the fault if the network element itself was broken down.

SUMMARY OF THE INVENTION

The primary object of the present invention is to provide a rerouting method which can quickly provide an alternate route when the fault occurs in an ATM network, in a network managing operation for each network.

Another object of the present invention is to provide a network management system which can quickly determine the alternate route and execute the rerouting process for the alternate route when the fault occurs on the PVC routes.

In accordance with one aspect of the present invention, there is provided a method of rerouting a PVC route on an ATM network, including steps of: previously defining an alternate route for the PVC route which is managed in an ATM network managing system; and switching the PVC route to a previously defined alternate route when a fault occurs in a network element forming the PVC route.

In a preferred embodiment, the method of rerouting the PVC route further includes step of determining an order of relief for a plurality of PVC routes in accordance with information of importance in which each PVC route previously holds when the fault occurs, and a step of rerouting the PVC route based on the order of relief.

In another preferred embodiment, the method of rerouting the PVC route further includes step of executing check of situation of the alternate route when the defined route cannot be used as the alternate route due to the fault or when a route is not defined as the alternate route, and step of notifying the situation.

In still another preferred embodiment, the method of rerouting the PVC route further includes step of notifying whether an alternation route should be returned to a previous route before alternation when the previous route is recovered during use of the defined alternate route, and step of returning to the previous route.

In still another preferred embodiment, the method of rerouting the PVC route further includes steps of, when defining the alternate route or at any time, comparing the alternate route with the previous route before alternation for each structural element of the PVC route on the alternate route defined when executing an actual switching process; sorting an element necessary for newly preparing in the alternate route after alternation with an element which can utilize the present element before alternation; and previously defining an effective switching order so as to omit a decision process when executing switching process.

In still another preferred embodiment, the method of rerouting the PVC route further includes steps of previously setting the alternate route for each segment, and re-setting the alternate route for only the segment which is disconnected, and making the alternate route which reroutes between only faulty segments on the PVC route which includes a plurality of segments.

In still another preferred embodiment, the method of rerouting the PVC route further includes steps of determining whether a present VP/VC on the alternate route can be utilized or not as the alternate route at registration of the same; executing registration as the alternate route for the VP/VC which was determined as the alternate route which can be utilized; and diverting an element VP/VC of another PVC route which exists on the alternate route.

In still another preferred embodiment, the method of rerouting the PVC route further includes steps of providing an interactive unit for a maintenance operator when executing alternate route switching process; providing a relief order information of a faulty PVC route, an attribute information of the faulty PVC route, and a candidate information of changeable PVC route to the maintenance operator; and determining the alternate route based on the maintenance operator's decision.

In still another preferred embodiment, the method of rerouting the PVC route further includes step of, when there are a plurality of alternate routes, designating a priority order of change of the route in an alternate route list for each route, at registration by the maintenance operator or at any time, so that flexibility of route selection can be raised.

In still another preferred embodiment, the method of rerouting the PVC route further includes step of, when there are a plurality of alternate routes, extracting a degree of margin for an average value or a maximum value of a band in each structural element of the alternate route candidate from a resource managing function and an actual network when the fault occurs, so that an optimum changing order of the alternate route having a margin for the resource can be automatically set in the network managing system.

In still another preferred embodiment, the method of rerouting the PVC route further includes step of, when there are a plurality of alternate routes, assuming a line margin for line interface or connection in each structural element of the alternate route candidate when fault occurs, from transmission amount of cells or traffic information in the network managing system during a predetermined interval before the fault occurs; and comparing the information extracted from the network managing system and the actual network, so that a switching order of an optimum alternate route having little traffic can be automatically set.

In still another preferred embodiment, the method of rerouting the PVC route further includes step of, when there are a plurality of alternate routes, extracting an activity ratio of a CPU in the network element NE including each structural element of the alternate PVC route candidate when the fault occurs, from the network managing system and the actual network, so that an optimum alternate route switching order having little load on a CPU can be automatically set.

In still another preferred embodiment, the method of rerouting the PVC route further includes steps of previously setting a VP/VC for a PVC route on the alternate route, providing a situation in which the VP/VC for the PVC route to be alternated has been already completed on the alternate line when executing alternation, and switching only connections at a start point and end point of alternation when the line is disconnected.

In still another preferred embodiment, the method of rerouting the PVC route further includes steps of providing a unit for sharing the alternate route by a plurality of main routes, and providing a unit for notifying the shared situation and a used situation of the alternate route.

In accordance with another aspect of the present invention, there is provided a network management system connected to a plurality of network elements provided on a permanent virtual channel (PVC) route through a predetermined communication network, each network element includes an element data collecting unit and a fault notifying unit, and the system includes: an ATM network resource managing unit for managing resources included in the ATM network; a PVC connection managing unit connected to the element data collecting unit through the communication network for managing the situation of the connection of the PVC route; a PVC route searching unit for searching the PVC route; a faulty event analyzing unit for receiving a fault from the fault notifying unit through the communication network when the fault occurs at any one of network elements, and analyzing the fault; an alternate route defining unit for previously defining the alternate route for the PVC; and an alternate route processing unit for switching a faulty route to the alternate route defined by the alternate route defining unit when the fault occurs at any one of the network elements.

In a preferred embodiment, the alternate route defining unit includes an alternate route selecting unit and a faulty PVC route switching table; the alternate route selecting unit selects any one of PVC routes from the faulty PVC route switching table; and the faulty PVC route switching table is formed by a plurality of faulty element containing PVC routes and a plurality of changeable PVC routes each corresponding to each faulty element containing PVC route.

In another preferred embodiment, the network management system further includes a PVC relief order determining unit connected between the faulty event analyzing unit and the alternate route defining unit, for determining an order of relief for the PVC based on information of importance which is previously held in each PVC route, when the fault occurs, and the PVC connection managing unit includes connection information which are defined by an importance of a customer, an importance of continuity, a service class and a designation value by an operator, in order to select the alternate route.

In still another preferred embodiment, the network management system further includes an alternate route confirming unit connected between the alternate route defining unit and the alternate route processing unit, for checking and notifying the situation of another alternate route, when the defined alternate route cannot be used due to a fault, or when the alternate route has not yet been defined.

In accordance with still another aspect of the present invention, there is provided a network management system connected to a plurality of network elements provided on a permanent virtual channel (PVC) route through a predetermined communication network, each network element including an element data collecting means and a recovery notifying means, the system including: an ATM network resource managing unit for managing resources included in the ATM network; a PVC connection managing unit connected to the element data collecting unit through the communication network for managing situation of connection of the PVC; a PVC route searching unit for searching the PVC route; a recovery event analyzing unit for receiving recovery information from the recovery notifying unit through the communication network, when a fault is recovered at any one of network elements, and analyzing the recovery information from the recovery notifying unit; a previous route defining means for defining a route before alternation; and a recovery processing means for recovering the route.

In a preferred embodiment, the previous route defining unit includes a route selecting unit before alternation and a recovery PVC route switching table, the route selecting unit selects any one of PVC routes before alternation from the recovery PVC route switching table, and the recovery PVC route switching table is formed by a plurality of alternate PVC routes, a plurality of routes during alternation and a plurality of recovery element containing PVC routes.

In another preferred embodiment, the alternate route defining unit includes an alternate route establishing steps defining unit, an alternate route selecting unit, and a faulty PVC route switching table; the alternate route establishing steps defining unit includes, a PVC route overlap determining unit for determining overlap of the PVC route, an alternate route establishing steps analyzing unit, a data storage for storing route difference data, and an alternate route establishing steps data storage; and the faulty PVC route switching table includes a PVC list, an alternate route list and an alternate route preparing steps list.

In still another preferred embodiment, the faulty PVC route switching table is formed by the plurality of faulty element containing PVC routes having a PVC route collection list and a segment collection list in which one PVC route in the PVC route collection list corresponds to one segment collection list, and the changeable PVC route having an alternate route collection list in which one segment in the segment list corresponds to the alternate route collection list.

In still another preferred embodiment, the changeable PVC route further includes an alternate route PVC information list having a plurality of segments each having VP, VC and flag information, in which one PVC route in the alternate route collection list corresponds to the alternate route PVC information list.

In still another preferred embodiment, the network management system further includes a maintenance/interaction processing unit connected between the alternate route defining unit and a maintenance operator's terminal.

In still another preferred embodiment, the alternate route defining unit further includes a maintenance/interaction switching unit.

In still another preferred embodiment, the alternate route defining unit includes an alternate route priority order defining unit having an alternate route manually defining unit connected a console which is handled by an operator, and an alternate route new priority order table; and a faulty PVC route switching table having the PVC list and the alternate route list in which one PVC in the PVC list corresponds to the alternate route list.

In still another preferred embodiment, the alternate route defining unit includes an alternate route priority order defining unit having a connection information analyzing unit connected to a console which is handled by an operator and further connected to the PVC connection managing unit, an alternate route automatically defining unit, and an alternate route new priority order table; and a faulty PVC route switching table having the PVC list and the alternate route list in which one PVC in the PVC list corresponds to the alternate route list.

In still another preferred embodiment, the network management system further includes an ATM network performance managing unit; the alternate route defining unit including an alternate route priority order defining unit having a traffic information analyzing unit connected to a console which is handled by an operator and further connected to the PVC connection managing unit and the ATM network performance managing unit, an alternate route automatically defining unit, and an alternate route new priority order table; and a faulty PVC route switching table having the PVC list and the alternate route list in which one PVC in the PVC list corresponds to the alternate route list.

In still another preferred embodiment, the alternate route defining unit includes an alternate route priority order defining unit having an activity ratio of a CPU analyzing unit connected to a console which is handled by an operator and further connected to the ATM network resource managing unit, an alternate route automatically defining unit, and an alternate route new priority order table; and a faulty PVC route switching table having the PVC list and the alternate route list in which one PVC in the PVC list corresponds to the alternate route list.

In still another preferred embodiment, the faulty route switching table includes a fault element containing PVC list, a segment list in which one PVC route in the faulty element containing PVC list corresponds to the segment list, an alternate route list in which one segment in the segment list corresponds to the alternate route list, and a segment list in which one alternate PVC route in the alternate route list corresponds to the segment list.

In accordance with still another aspect of the present invention, there is provided a network management system connected to a plurality of network elements provided on a permanent virtual channel (PVC) route through a predetermined communication network, each network element including an element data collecting means and a fault notifying unit, the system including: an ATM network resource managing unit for managing resources included in the ATM network; a PVC connection managing unit connected to the element data collecting unit through the communication network for managing situation of connection of the PVC; a PVC route searching unit for searching the PVC route; a faulty event analyzing unit for receiving a fault from the fault notifying unit through the communication network when the fault occurs at any one of network elements, and analyzing the fault; a sharing route defining unit for previously defining the sharing route for the PVC; a sharing route processing unit for determining the sharing route; and an alternate route processing unit for switching a faulty route to the alternate route defined by the sharing route processing unit when the fault occurs at any one of network elements.

In a preferred embodiment, the sharing route defining unit includes a sharing route selecting unit and a sharing PVC route table, the sharing route selecting unit selects any one of PVC routes from the sharing PVC route table, and the sharing PVC route table is formed by a plurality of faulty element containing PVC routes, a plurality of changeable PVC routes each corresponding to each faulty element containing PVC route, and a plurality of sharing or used situation each corresponding to each changeable PVC route.

BRIEF DESCRIPTION OF THE DRAWINGS

FIG. 37 shows a concrete example of the ninth embodiment according to the present invention;

DESCRIPTION OF THE PREFERRED EMBODIMENTS

The various preferred embodiments according the present invention will be explained in detail with reference to the attached drawings.

A First Embodiment

Figure 1:
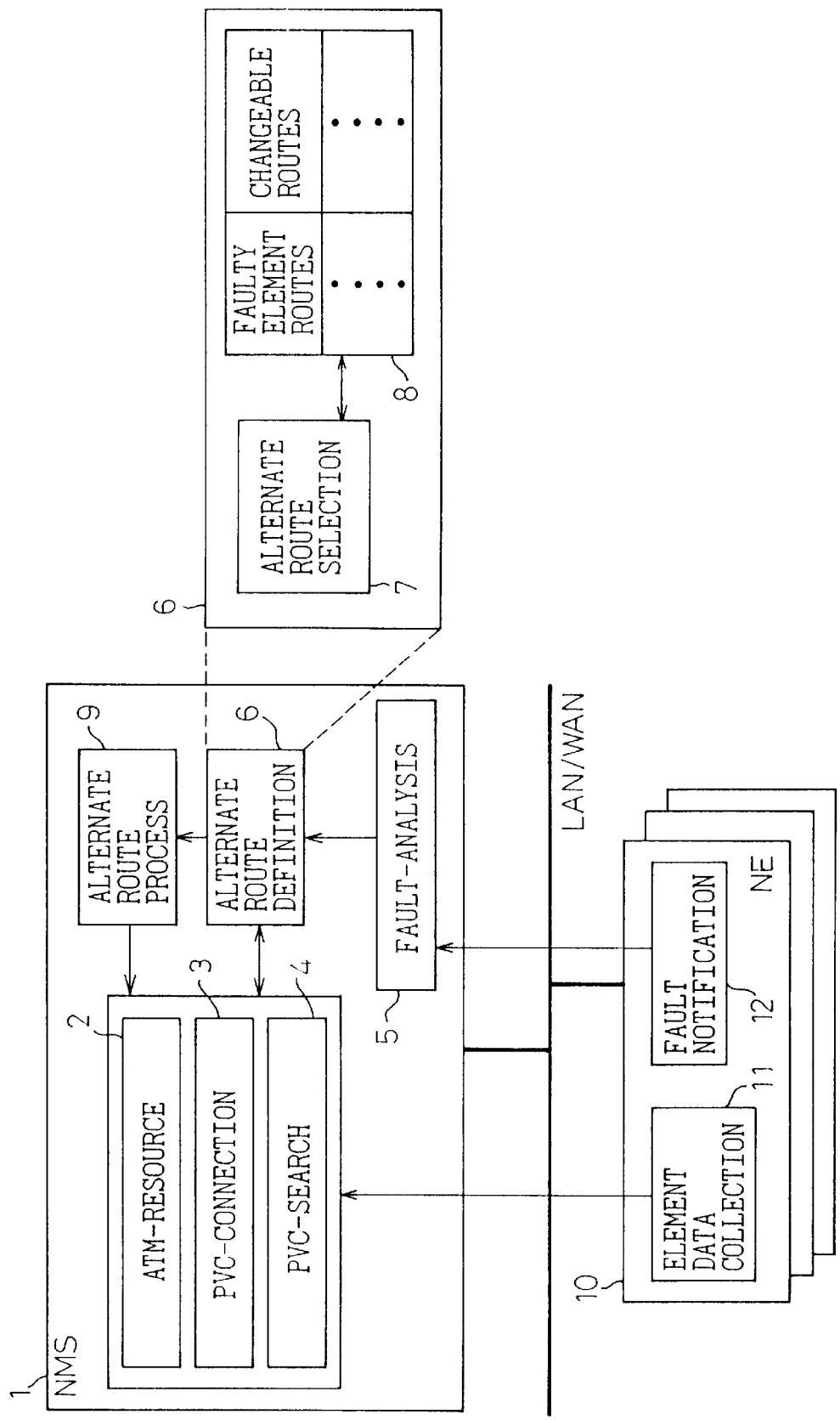
FIG. 1 is a basic structural view of a rerouting system according to a first embodiment of the present invention.

FIG. 1 is a basic structural view of a rerouting system according to the first embodiment of the present invention. A network management system (NMS) 1 includes an ATM network resource managing unit (ATM-RESOURCE) 2, a PVC connection managing unit (PVC-CONNECTION) 3, a PVC route searching unit (PVC-SEARCH) 4, a faulty event analyzing unit (FAULT-ANALYSIS) 5, an alternate route defining unit (ALTERNATE ROUTE DEFINITION) 6 and an alternate route processing unit (ALTERNATE ROUTE PROCESS) 9. Further, the alternate route defining unit 6 includes an alternate route selecting unit (ALTERNATE ROUTE SELECTION) 7 and a faulty PVC route switching table 8 which is formed by faulty element containing PVC routes (FAULTY ELEMENT ROUTES) and changeable PVC routes (CHANGEABLE ROUTES).

Although detailed explanations are given with reference to the drawings, briefly, in the rerouting system in the first embodiment, an alternate route can be defined for the PVC route, which is managed by the network managing system, at any time. Then, when a fault occurs in any structural element provided on the PVC route (i.e., a SW, a line interface, a VP (Virtual path), a VC (Virtual Channel), etc.), the faulty PVC route is switched to a predetermined alternate route so as to bypass the faulty element.

As shown in the drawing, the network managing system 1 is connected to a plurality of network elements through a LAN (Local Area Network) or a WAN (Wide Area Network). Each network element 10 includes an element data collecting unit (ELEMENT DATA COLLECTION) 11 and a fault notifying unit (FAULT NOTIFICATION) 12. The element data collecting unit 11 holds faulty situation occurred in the network element 10 itself and also holds connection information as to an adjacent network element 10. The fault notifying unit 12 notifies the fault which occurs in the network element 10 to the faulty event analyzing unit 5.

The faulty PVC switching table 8 is provided for defining a plurality of faulty elements containing PVC routes (see FAULTY ELEMENT-ROUTES) $r_k$ and changeable PVC routes (see CHANGEABLE ROUTES) $a_{kj}$ $(r_k)$, each corresponding to the faulty element containing PVC route $r_k$. In this case, the faulty element containing PVC route $r_k$ is defined as a PVC route which includes a faulty network element, and can be expressed as follows.

$r_k$ (where, k=1, 2, ..., m, m≧1)

On the other hand, the changeable PVC route $a_{kj}$ $(r_k)$ is defined as a PVC route which is changeable as an alternate route instead of the faulty element containing PVC route $r_k$, and can be expressed as follows.

$a_{kj}$ $(r_k)$(where, j=1, 2, ..., n, n≧1)

Figure 2:
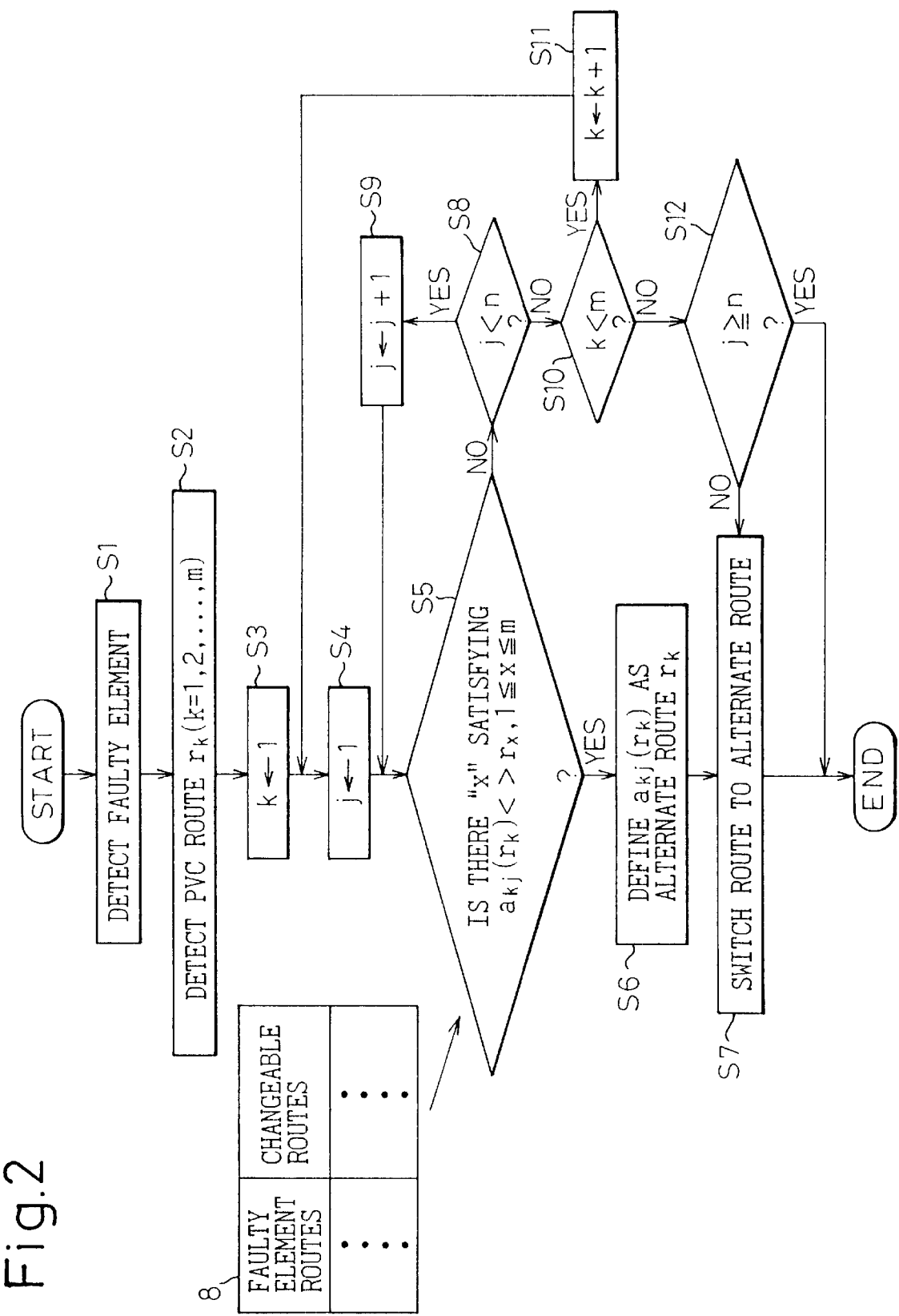
FIG. 2 is a process flowchart in an alternate route defining unit in FIG. 1.

FIG. 2 is a process flowchart in the alternate route defining unit 6 when the fault occurs therein. When the fault occurs in any network element 10, the faulty event analyzing unit 5 detects the faulty network element 10 (see step S1). The PVC route searching unit 4 detects the faulty element containing PVC route $r_k$ (where, k=1, 2, ..., m, m≧1) which contains the faulty event (see step S2).

In these processes, first, "k" is set to 1 in order to check the PVC route from the first faulty element containing PVC route $r_1$ (see step S3). Further, an identifier "j" for the changeable PVC route $a_{kj}$ $(r_k)$ is set to 1, i.e., "j"=1 (see step S4).

Next, the alternate route selecting unit 7 refers to the faulty PVC route switching table 8, and selects the PVC route which does not coincide with another faulty element containing PVC router $r_k$ from a plurality of changeable PVC routes $a_{kj}$ $(r_k)$. That is, in the plurality of changeable PVC routes $a_{kj}$ $(r_k)$, the alternate route selecting unit 7 checks whether there is a valve "x" which satisfies the following relationships in the plurality of changeable PVC routes $a_{kj}$ $(r_k)$ (see step S5).

$a_{kj}$ $(r_k)$<>$r_x$, and

1≦x≦m, j=1, 2, ..., n, n≧1

In the above relationship, the symbol "<>" has two meanings, i.e., either $a_{kj}$ $(r_k)$<$r_x$, or $a_{kj}$ $(r_k)$>$r_x$. In the following explanations, this symbol is used as the same meaning as above.

When the first occurrence of "x" is found, the alternate route selecting unit 7 determines the changeable PVC route $a_{kj}$ $(r_k)$ as the alternate route of the faulty element containing PVC route $r_k$ (see step S6). When "k" does not reach "m", i.e., k<m, (see step S10), "k" is incremented by one (see step S11), and the process is returned to step S4. That is, the alternate route selecting unit 7 checks whether there is "x" which satisfies the following relationships in the next faulty element containing PVC routes $r_k$.

$a_{kj}$ $(r_k)$<>$r_x$, and

1≦x≦m, j=1, 2, ..., n, n≧1

When there is no "x" which satisfies the above relationship, and when "j" does not reach "n" (see step S8), "j" is incremented by one (see step S9). Further, the alternate route selecting unit 7 checks again whether there is "x" which satisfies the following relationships in the next changeable PVC routes $a_{kj}$ $(r_k)$.

$a_{kj}$ $(r_k)$<>$r_x$, and

1≦x≦m, j=1, 2, ..., n, n≧1

When "j" reaches "n" (see step S8), and when "k" does not reach "m" (see step S10), "k" is incremented by one (see step S11). Further, the alternate route selecting unit 7 checks again whether there is "x" which satisfies the following relationships in the next faulty element containing PVC routes $r_k$.

$a_{kj}$ $(r_k)$<>$r_x$, and

1≦x≦m, j=1, 2, ..., n, n≧1

The above steps are repeated in the alternate route selecting unit 7.

When "j" reaches the maximum "n", (see step S12), i.e., when the alternate route was not found even though all changeable PVC routes being searched (see step S9), there is no alternate route. Besides the above case, the alternate route processing unit 9 executes the switching operation to the alternate route.

As explained above, when the fault occurs in the network element which constitutes the PVC route, the faulty route is switched to the alternate route which was previously registered in accordance with the process chart shown in FIG. 2, and it is possible to realize quick countermeasure when the fault occurs.

Figure 20:
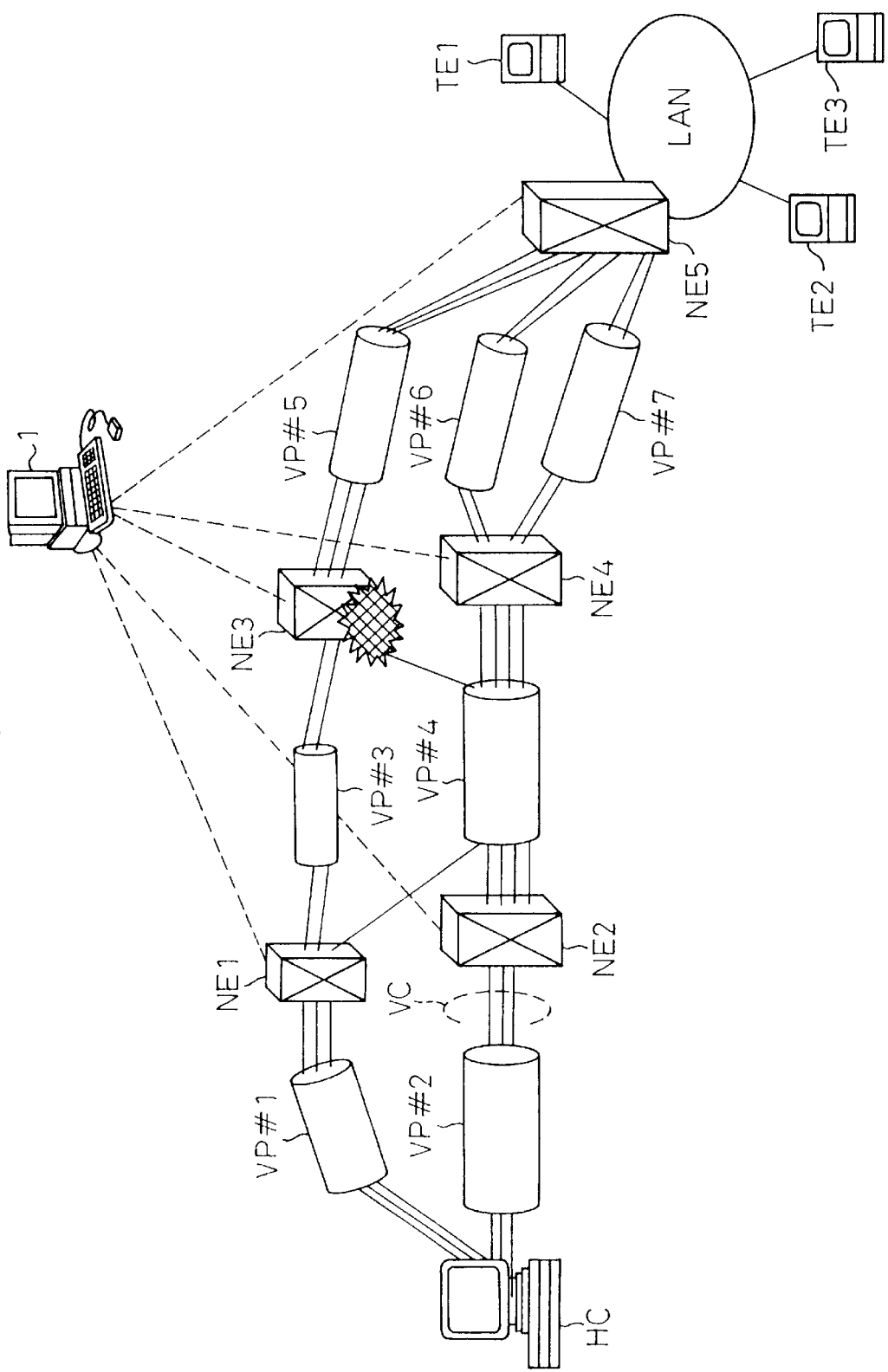
FIG. 20 shows one example of a network system formed by a LAN.
Figure 21:
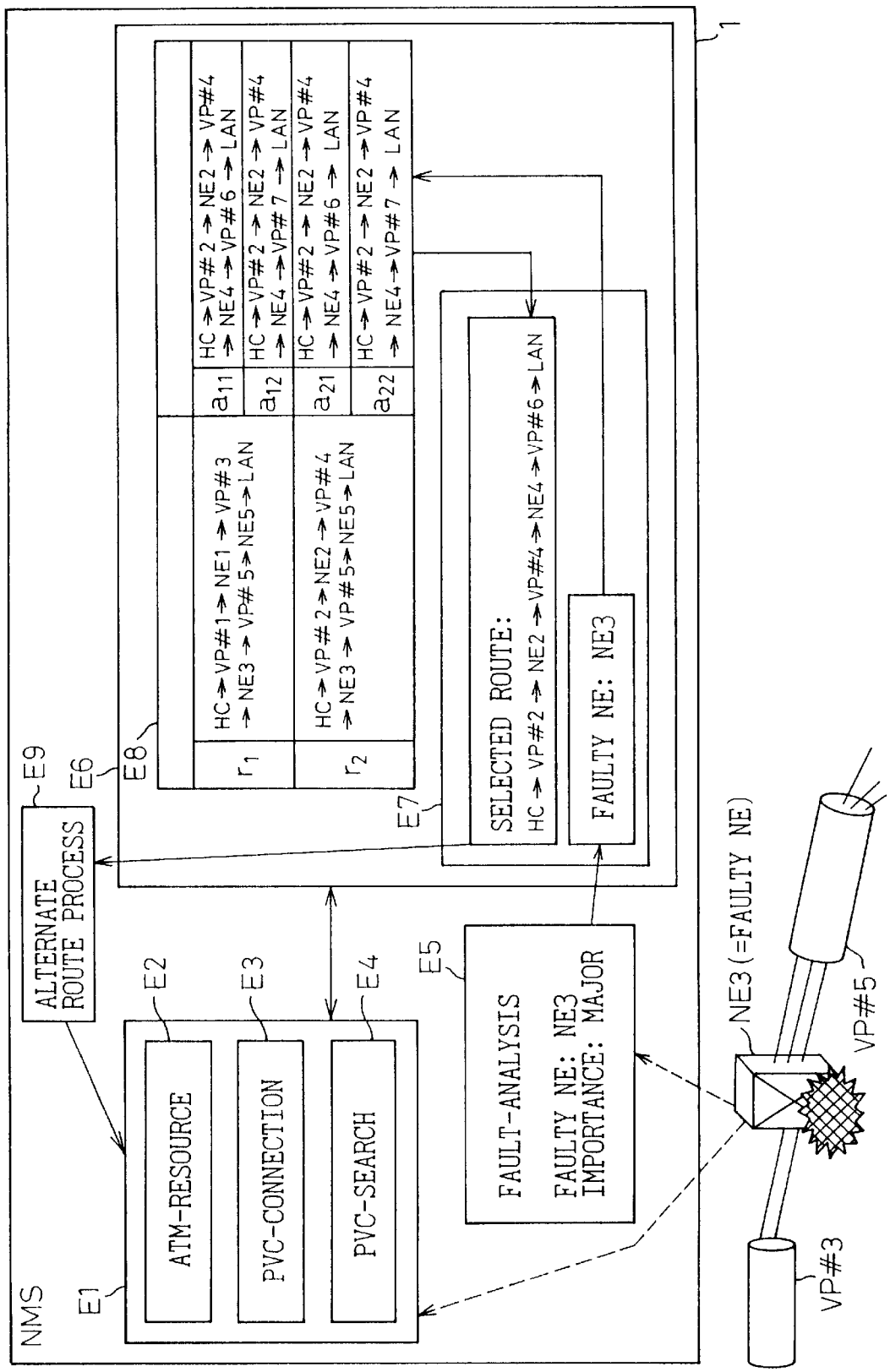
FIG. 21 is an explanatory view of an alternate route when the fault occurs in the network system shown in FIG. 20.

Next, one concrete example for the first embodiment is explained in detail with reference to FIGS. 20 and 21. FIG. 20 shows one example of a network system formed of the LAN, and FIG. 21 is an explanatory view of an alternate route when the fault occurs in the system shown in FIG. 20. In FIG. 20, TE1 to TE3 are terminals in the LAN, HC is a host computer, NE1 to NE5 are ATM exchanges, and VP#1 to VP#7 are virtual paths.

For example, when the fault occurs in the ATM exchange NE3, the alternate route is determined as follows.

In FIG. 21, first, a faulty event analyzing unit (FAULT-ANALYSIS) E5 detects the fault in the ATM exchange NE3 as the fault occurrence element (see step S1 in FIG. 2). Next, the faulty event analyzing unit E5 searches the PVC route including the ATM exchange NE3 from a faulty PVC route switching table E8 provided in an alternate route defining unit E6 (see step S2 in FIG. 2).

In this case, the following two routes are detected. That is, the first faulty element containing PVC route $r_1$ takes the route from the host computer HC→VP#1→ATM exchange NE1→VP#3→ATM exchange NE3→VP#5→ATM exchange NE5→LAN (TE1 to TE3), and the second faulty element containing PVC route $r_2$ takes the route from the host computer HC→VP#2→ATM exchange NE2→VP#4→ATM exchange NE3→VP#5→ATM exchange NE5→LAN (TE1 to TE3).

When both "k" and "j" are 1 (see steps S3 and S4 in FIG. 2), the faulty event analyzing unit E5 checks whether the fault occurrence element is not included in the changeable PVC route (see step S5 in FIG. 2). After above steps, the faulty event analyzing unit E5 detects the following changeable PVC route $a_{kj}$ which is used. instead of two faulty element containing routes $r_1$ and $r_2$. That is, the changeable PVC route $a_{11}$ takes the route from the host computer HC→VP#2→ATM exchange NE2→VP#4→ATM exchange NE4→VP#6→ATM exchange NE5→LAN (TE1 to TE3).

As is obvious, since the faulty element containing PVC route is not included in the changeable PVC route all, this route is determined as the alternate route instead of two faulty element containing PVC routes $r_1$ and $r_2$. An alternate route selecting unit E7 determines this route $a_{11}$ as the selected alternate route (see step S6 in FIG. 2), and an alternate route processing unit E9 switches the route from the faulty element containing routes $r_1$ and $r_2$ to the changeable PVC route $a_{11}$.

In this case, it is considered that there is another changeable PVC route $a_{12}$. That is, the route from the host computer HC→VP#2→ATM exchange NE2→VP#4→ATM exchange NE4→VP#7→ATM exchange NE5→LAN (TE1 to TE3), as the alternate instead of the faulty element containing PVC routes $r_1$ and $r_2$.

However, in the present invention, since the alternate route which was found at the first time is selected as the alternate route, the above another changeable PVC route $a_{12}$ is not used as the alternate route.

A Second Embodiment

Next, as the second embodiment, when the fault occurs, an order of relief for a plurality of PVC routes is determined based on the information which is previously held in each PVC route in order to determine a grade of importance. The rerouting process for the plurality of PVC routes in the rerouting system according to the second embodiment is performed based on the above order of relief.

Figure 3:
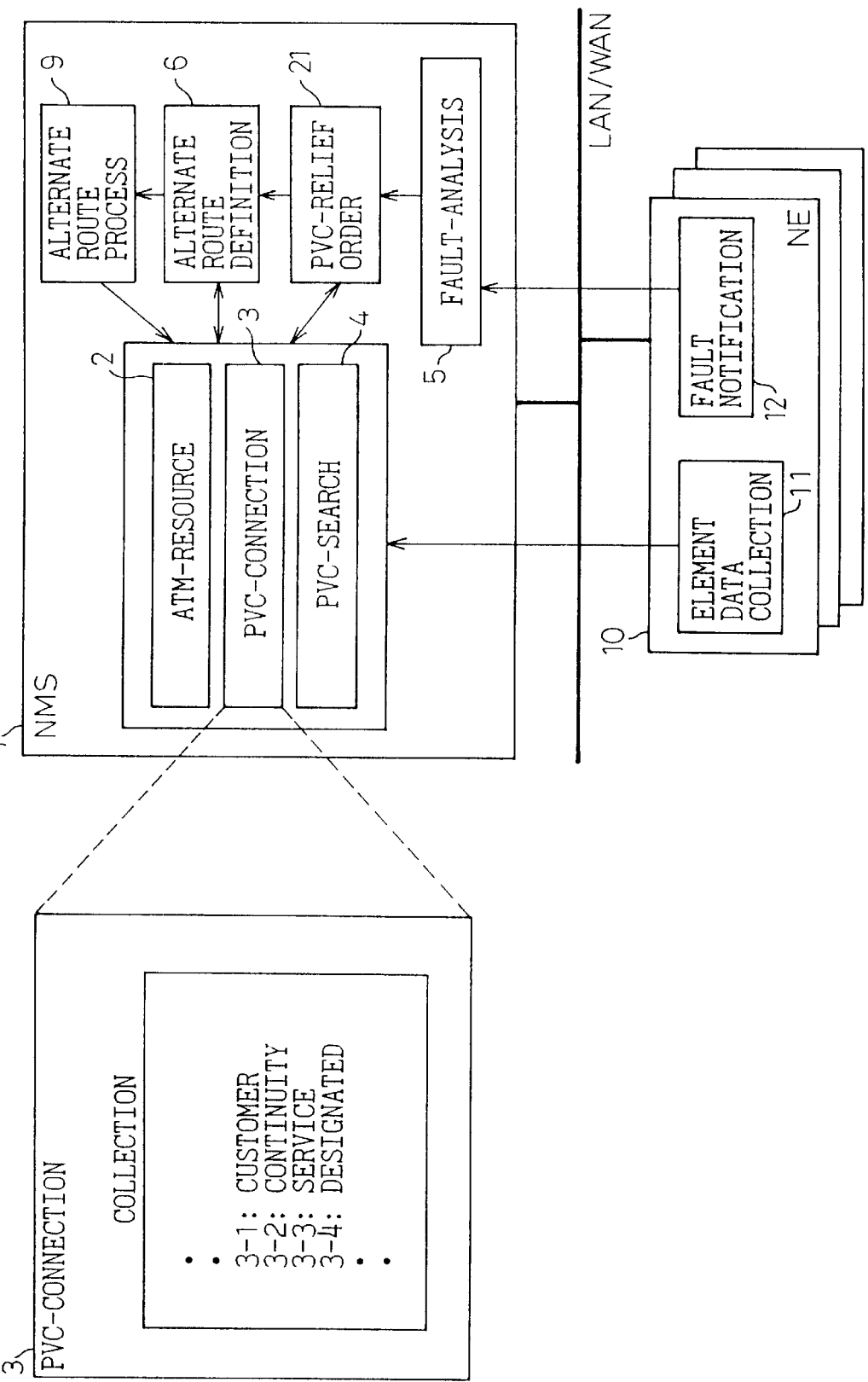
FIG. 3 is a basic structural view of a rerouting system according to a second embodiment of the present invention.

FIG. 3 is a basic structural view of a rerouting system according to the second embodiment of the present invention. The same reference numbers used in FIG. 1 are attached to the same components shown in FIG. 3. Reference number 21 denotes a PVC relief order decision unit (PVC-RELIEF ORDER) which outputs an order of relief for the PVC route provided within circuits (paths) to be rerouted in accordance with the following input information, i.e., an input 1: PVC routes containing a faulty circuit which is output from the PVC route searching unit (PVC-SEARCH) 4, and an input 2: PVC connection information collection 3-1, 3-2, 3-3 and 3-4 which are held in each PVC route and output from the PVC connection managing unit (PVC-CONNECTION) 3.

In this case, reference number 3-1 denotes a grade of importance for a customer (CUSTOMER) who utilizes the PVC route (below, an importance for customer), 3-2 denotes a grade of importance for continuity (CONTINUITY) of utilization of the PVC route (below, importance based on continuity), 3-3 denotes a service class (SERVICE) when constant utilization of the PVC route is expected (for example, a service class is defined as CBR (constant bit rate)/ABR (available bit rate), and 3-4 denotes a designated value (DESIGNATED) of an order of relief which is previously set by an operator.

The PVC connection information 3-1, 3-2, 3-3 and 3-4 are previously input at registration of each PVC route as an attribute information of each PVC route which is already stored in the PVC connection managing unit 3.

When it is necessary to execute the rerouting process, the order of relief for the PVC route is output from the PVC relief order decision unit 21 in accordance with the following steps.

Based on the faulty element detected by the faulty event analyzing unit 5 (see step S1 in FIG. 2), the PVC route searching unit 4 detects the PVC route which contains the faulty element (see step S2). For the detected PVC route (at the input 1), the PVC relief order decision unit 21 acquires the PVC connection information including the information 3-1 to 3-4 and corresponding to each PVC route from the PVC connection managing unit 3.

The PVC relief order decision unit 21 compares an input value for each PVC (a setting value corresponding to each PVC in the PVC connection information 3-1 to 3-4) based on the grade of importance in the PVC connection information 3-1 to 3-4, and outputs the order of relief to the alternate route defining unit 6.

Based on the order of relief output from the PVC relief order decision unit 21, i.e., $r_k$ (k=1, 2, . . . , m, m≧1), the alternate route defining unit 6 sets the alternate route for each PVC route. After setting of the alternate route, the rerouting process is executed by the same manners as the first embodiment.

As mentioned above, in the second embodiment, when the fault occurs, the order of relief for a plurality of PVC routes is determined based on the grade of important information which are held in each PVC route. As a result, the rerouting process is started from the most important PVC route in the plurality of PVC routes so that it is possible to realize quick recovery for the fault in accordance with the order of relief for the plurality of PVC routes.

Figure 22:
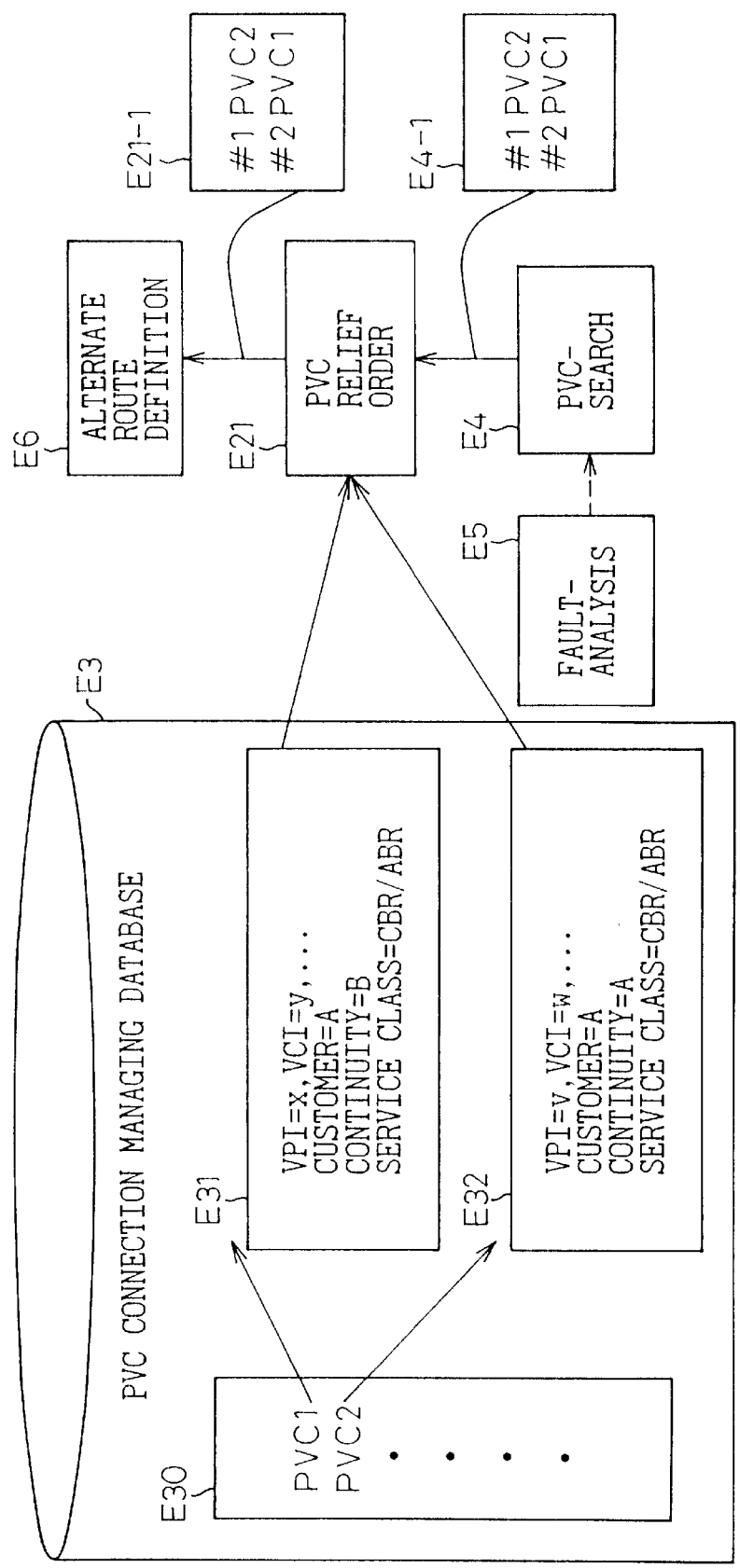
FIG. 22 is an explanatory view of a PVC connection managing database according to the present invention.
Figure 23:
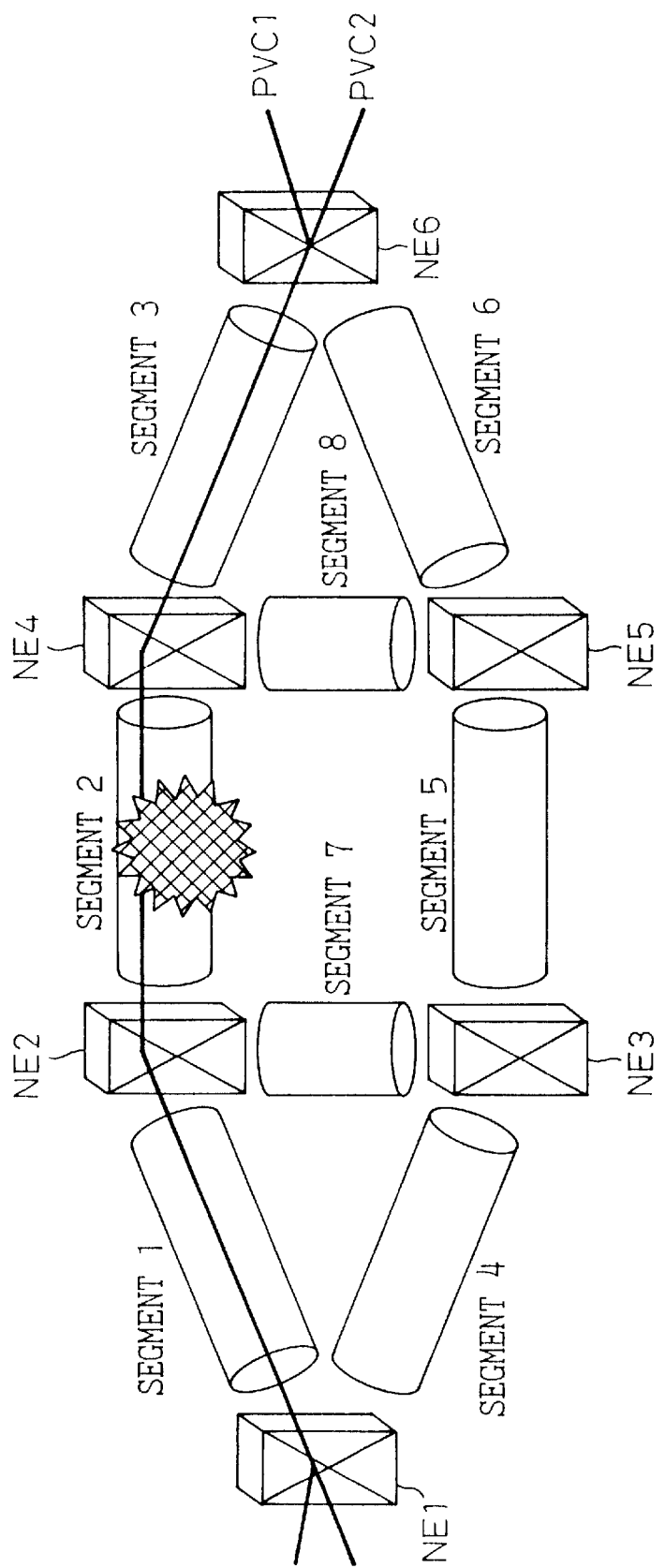
FIG. 23 shows another example of a network system.

Next, another concrete example for the second embodiment is explained in detail with reference to FIGS. 22 and 23. FIG. 22 is an explanatory view of a PVC connection managing database (PVC CONNECTION MANAGING DATABASE) E3, and FIG. 23 shows another example of the network system. As shown in FIG. 3, when two PVC routes (PVC1 and PVC2) are set on the network to be managed, a PVC connection managing unit E30.(see FIG. 2) is provided within the PVC connection managing database E3. A PVC1 attribute information list E31 and a PVC2 attribute information list E32 are set within the PVC connection managing unit E30. The PVC1 list E31 includes VPI=X, VCI=y, . . . , the importance for the customer (CUSTOMER)=A, the importance for continuity (CONTINUITY)=B the service class (SERVICE)=CBR/ABR. Further, the PVC2 list E32 includes VPI=v, VCI=w, . . . , the importance for the customer (CUSTOMER)=A, the importance for continuity (CONTINUITY)=A, the service class (SERVICE)=CBR/ABR.

In this case, both PVC1 and PVC2 in the list E30 are established on the route, i.e., ATM exchange NE1→segment 1→ATM exchange NE2→segment 2 ATM exchange NE4→segment 3→ATM exchange NE6.

When the fault occurs on the segment 2 so that it is necessary to provide the rerouting process for the PVC1 and PVC2, in the network managing system NMS (see FIG. 21), the faulty event analyzing unit (FAULT-ANALYSIS) E5 specifies the faulty element, and the PVC route searching unit (PVC-SEARCH) E4 outputs a list of faulty PVC list E4-1 which indicates the faulty PVC route existing on the faulty element. At that time, two identification names PVC1 and PVC2 are listed on the faulty PVC list E4-1.

The identification name is provided so as to be able to uniquely identify the PVC route, and no particular format is defined for the identification name. In this embodiment, the identification name is defined by PVC1 and PVC2, and the priority order is indicated by #1 and #2.

The PVC relief order decision unit E21 acquires the PVC1 attribute information list (E31) and the PVC2 attribute information list (E32) stored in the PVC connection managing database E3 in accordance with the faulty PVC list E4-1.

Figure 24:
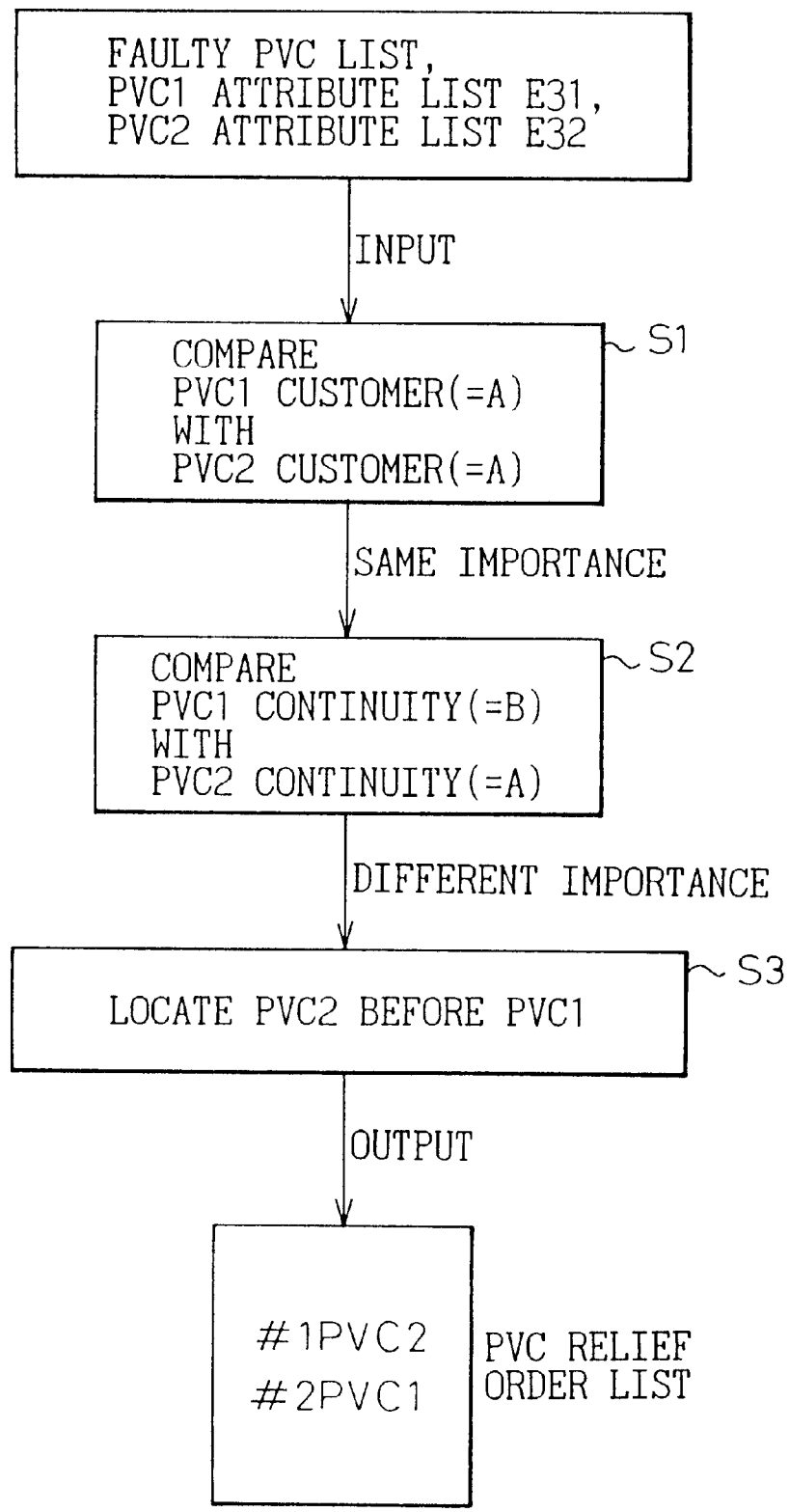
FIG. 24 is a flowchart for explaining priority decision logic used to provide the PVC relief order list.

For each PVC attribute information list, for example, the grade of importance for the PVC1 and PVC2 is compared in accordance with the priority decision logic shown in FIG. 24. In this example, it may be possible to compare a sum of grade of importance without use of the priority decision logic, or it may be possible to provide comparative priority between the grade of importance as shown in FIG. 24.

In this case, the comparative priority is set based on the following rank, i.e., importance for customer>importance for continuity >service class.

Further, the importance for customer and the importance for continuity are set the following rank, i.e., A>B>C (A is the most important).

FIG. 24 is a flowchart for explaining the priority decision logic used to provide the PVC relief order list. First, the importance for customer of the PVC1 (rank A) is compared with the importance for customer of the PVC1 (rank A) (step S1). When both importances are ranked to the same grade, next, the importance for continuity of the PVC1 (rank,B) is compared with the importance for continuity of the PVC2 (rank A)(step S2) when the grade of importance is different from each other, the PVC2 is ranked to the position higher than the PVC1 (step S3). Finally, the PVC relief order list is output from the PVC relief order decision unit 21. That is, the PVC relief order decision unit 21 outputs the PVC2 as the first priority of relief (#1) and the PVC1 as the second priority of relief (#2).

A Third Embodiment

Next, as the third embodiment, when the alternate route is not defined or when the defined alternate route cannot be used caused by the fault, the situation of the alternate route is checked and notified to the alternate route processing unit.

Figure 4:
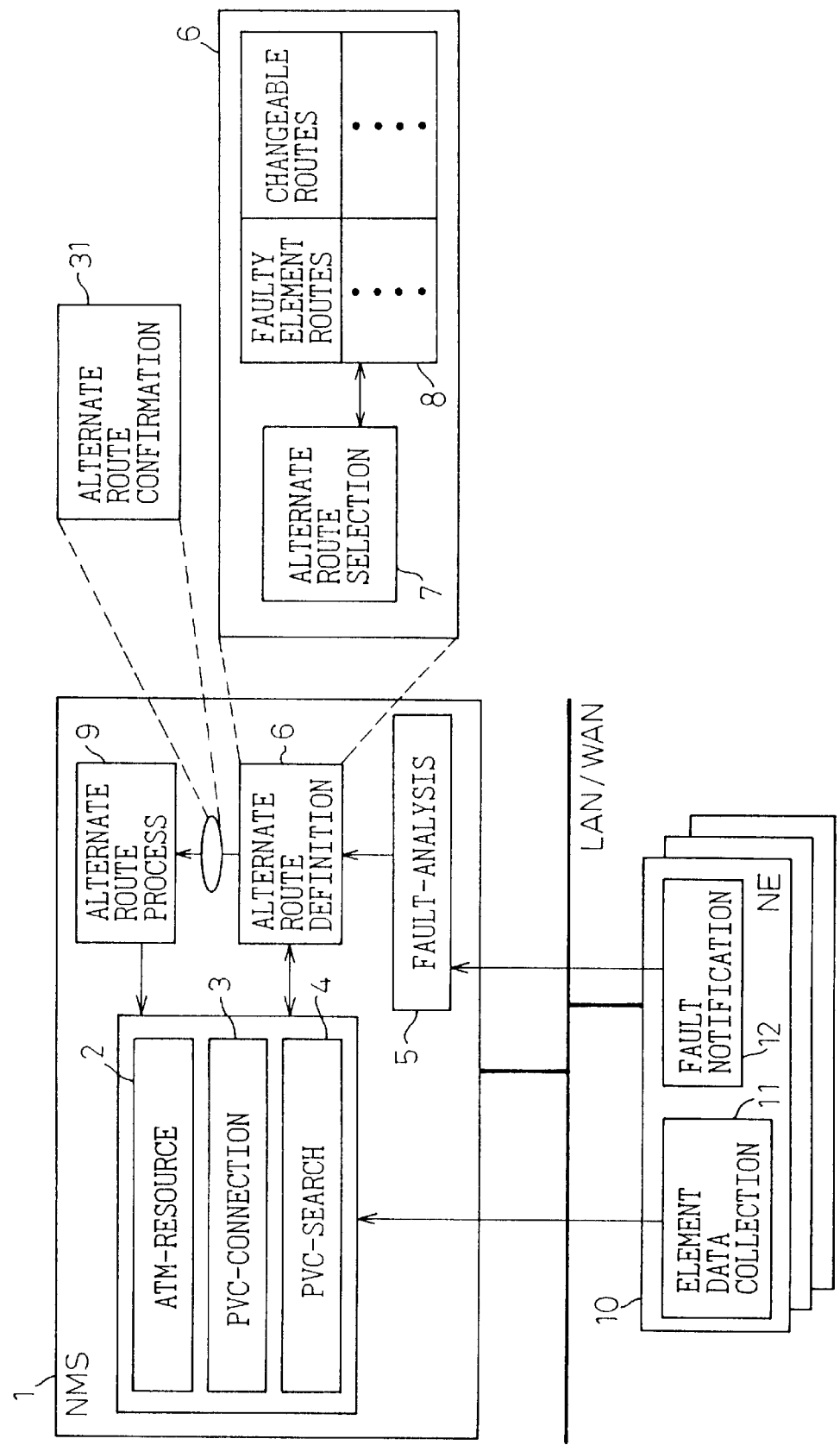
FIG. 4 is a basic structural view of a rerouting system according to a third embodiment of the present invention.
Figure 5:
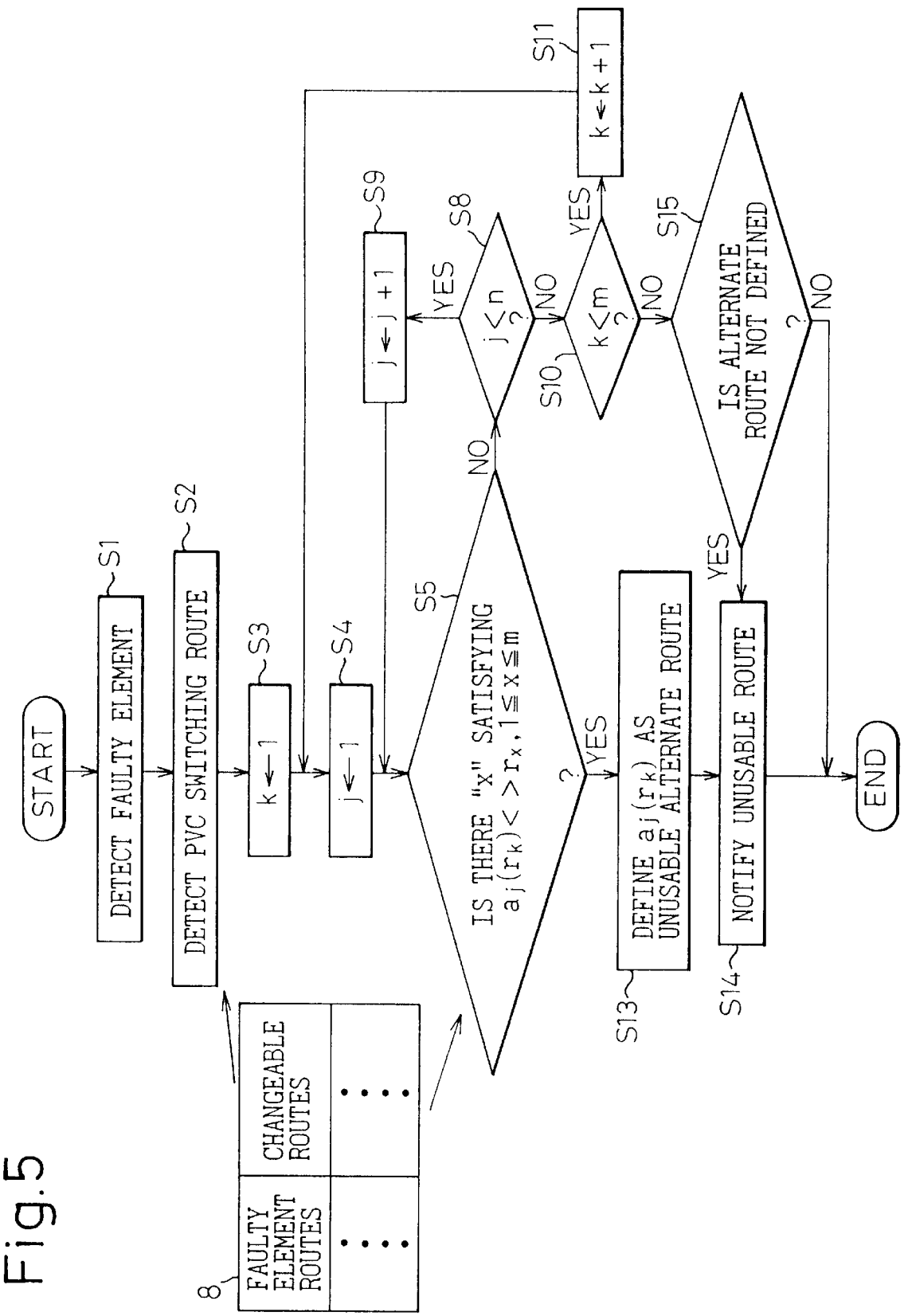
FIG. 5 is a process flowchart for explaining the operation of the structure shown in FIG. 4.

FIG. 4 is a basic structural view of a rerouting system according to the third embodiment of the present invention, and FIG. 5 is a process flowchart for explaining the operation of the structure shown in FIG. 4.

In FIG. 4, the same reference numbers used in FIG. 1 are attached to the same components shown in FIG. 4. Reference number 31 denotes an alternate route confirming unit, (ALTERNATE ROUTE CONFIRMATION). The faulty event analyzing unit 5 detects the faulty element, and the alternate route defining unit 6 detects the PVC route which is defined as the changeable PVC route $a_{kj}$. When the alternate route confirming unit 31 detects that all changeable routes selected by the alternate route selecting unit 7 are faulty or not defined so that it is impossible to define the alternate route (see steps S13 and S14), this situation is informed to an operator who takes charge of maintenance (see step S14).

As mentioned above, in the third embodiment, in the case that there is no alternate route when setting the alternate route, or by previously checking the fact that there is no alternate route before the fault occurs, it is possible to previously prevent delay of service to the customer due to the fact that there is no alternate route.

Figure 25:
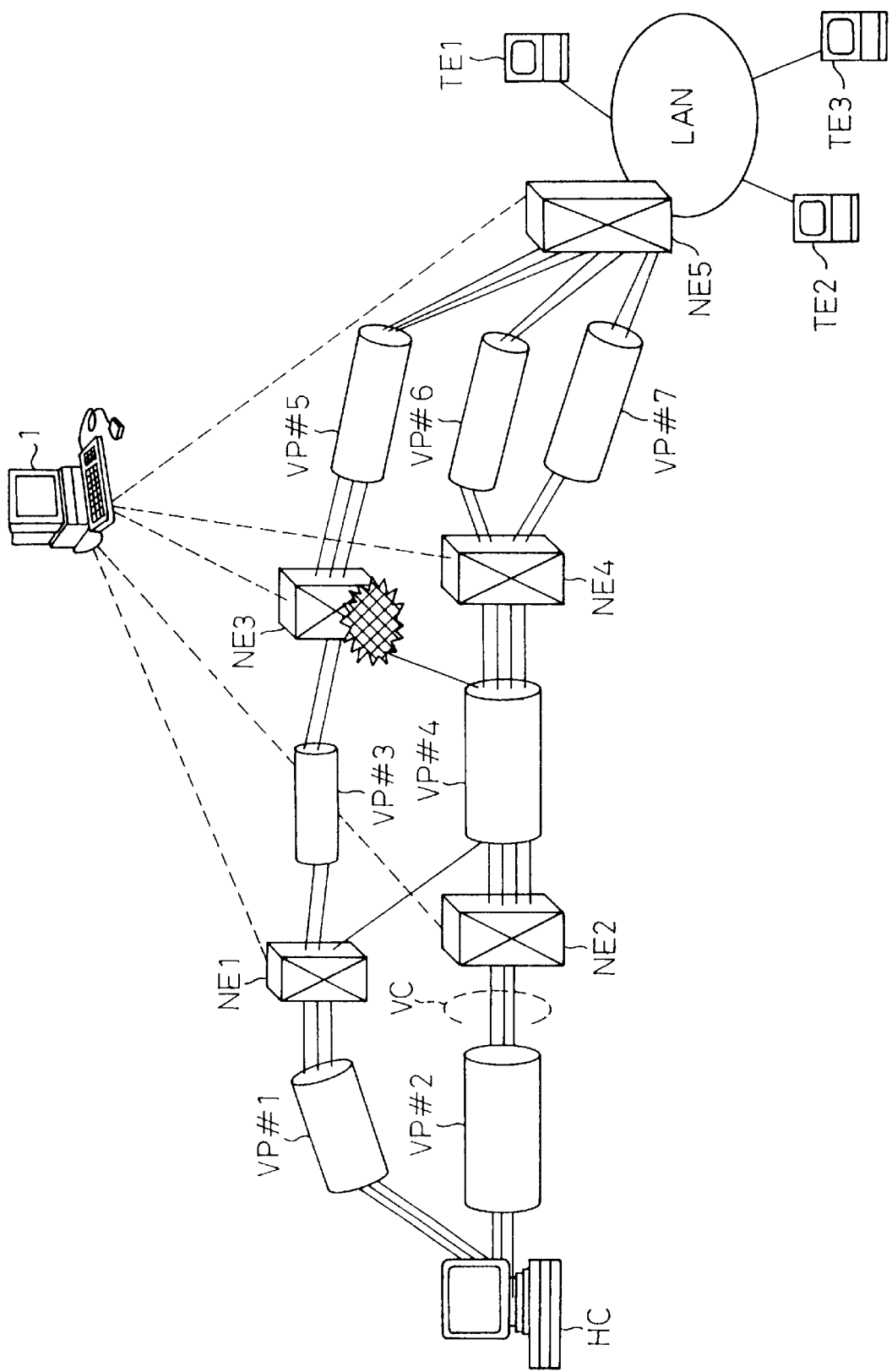
FIG. 25 shows another example of a network system formed by the LAN.
Figure 26:
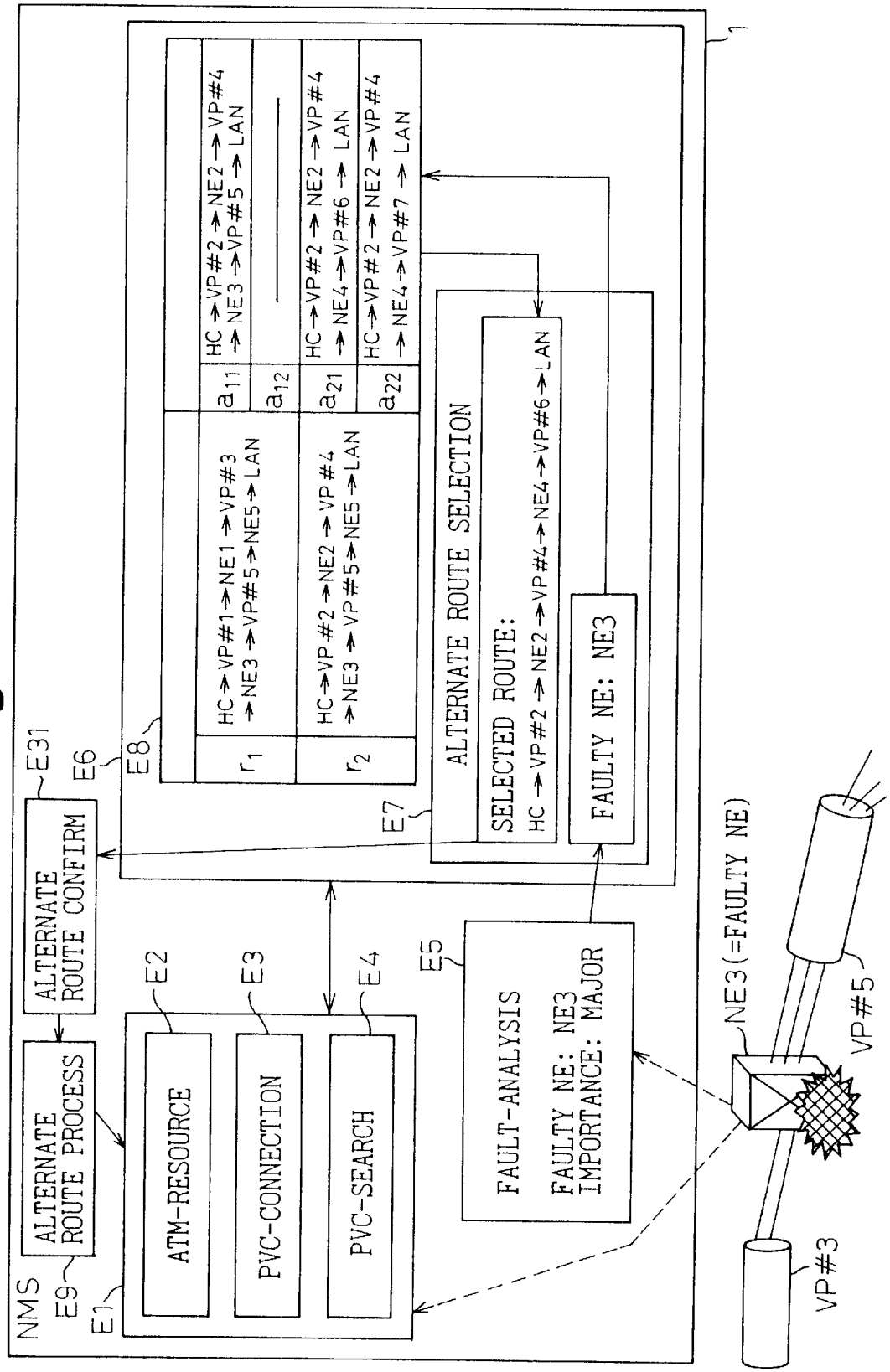
FIG. 26 is an explanatory view of an alternate route when the fault occurs in the network system shown in FIG. 25.

FIG. 25 shows another example of a network system formed by the LAN, and FIG. 26 is an explanatory view of an alternate route when the fault occurs in the network system shown in FIG. 25. In this example, the faulty event analyzing unit E5 receives the faulty information from the ATM exchange NE3, and an alternate route selecting unit E7 searches the faulty element containing PVC route $r_k$ from a faulty PVC route switching table E8. In this embodiment, the PVC routes $r_1$ and $r_2$ correspond to the faulty element containing PVC routes.

In the case of the faulty element containing PVC route $r_2$, since the faulty ATM exchange NE3 is not included on the routes $a_{21}$ and $a_{22}$ which are set as the PVC changeable route, the alternate route confirming unit (ALTERNATE ROUTE CONFIRM) E31 determines that it is possible to set the alternate route, and the alternate route processing unit (ALTERNATE ROUTE PROCESS) E9 executes alternate route process.

On the other hand, in the case of the faulty element containing PVC route $r_1$, since the faulty ATM exchange NE3 is included on the route all which is set as the PVC changeable route, and since the PVC changeable route $a_{12}$ (as the second candidate route) is not registered (i.e., not defined), the alternate route confirming unit E31 determines that it is impossible to use the faulty element containing PVC route $r_1$ the alternate route, and notifies this fact to the operator.

A Fourth Embodiment

Next, as the fourth embodiment, when the faulty route is repaired (i.e., a main route used before the fault occurs is recovered) during use of the alternate route defined in the first embodiment, the route is returned from the alternate route to the main route.

Figure 6:
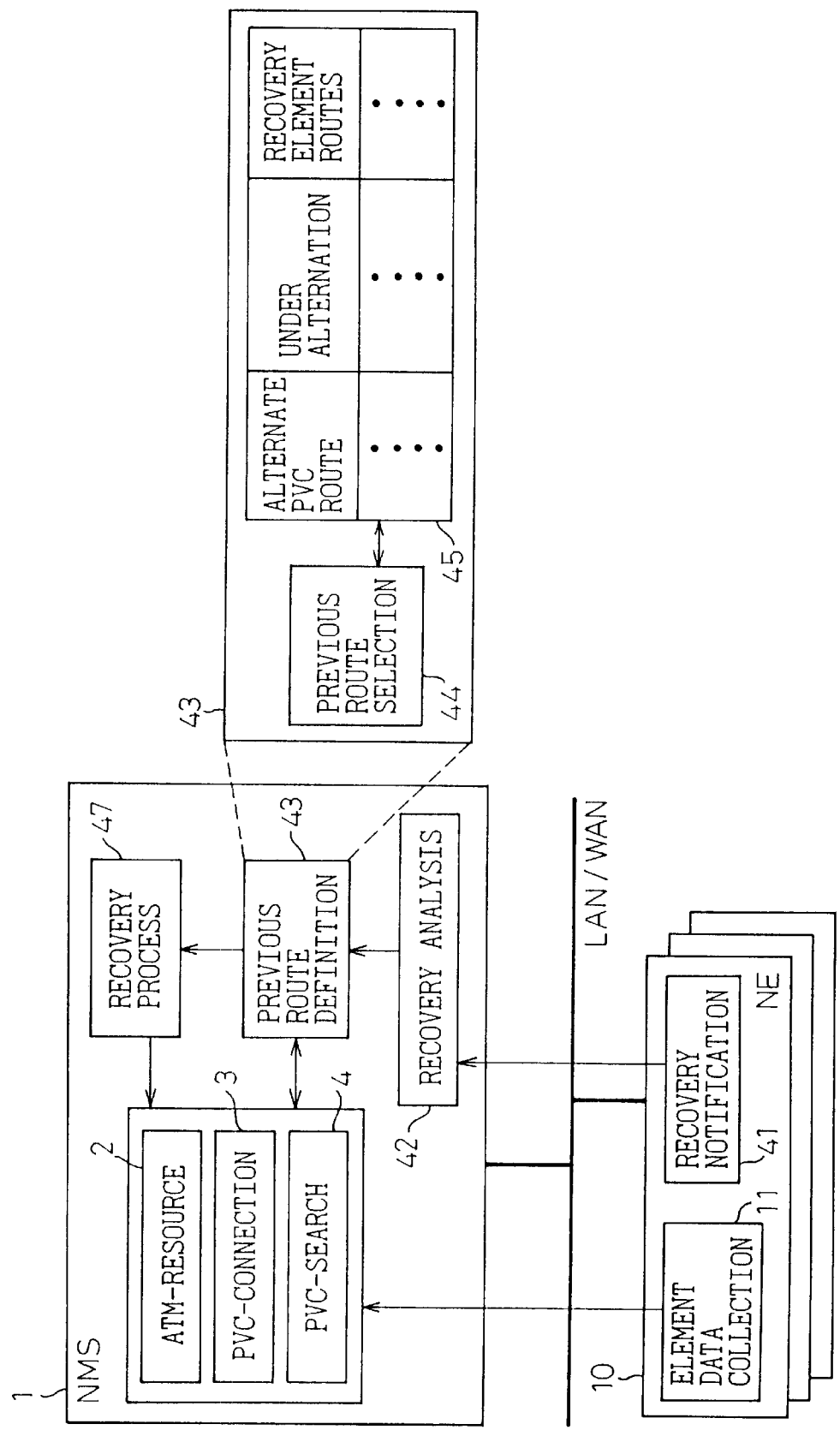
FIG. 6 is a basic structural view of a rerouting system according to a fourth embodiment of the present invention.
Figure 7:
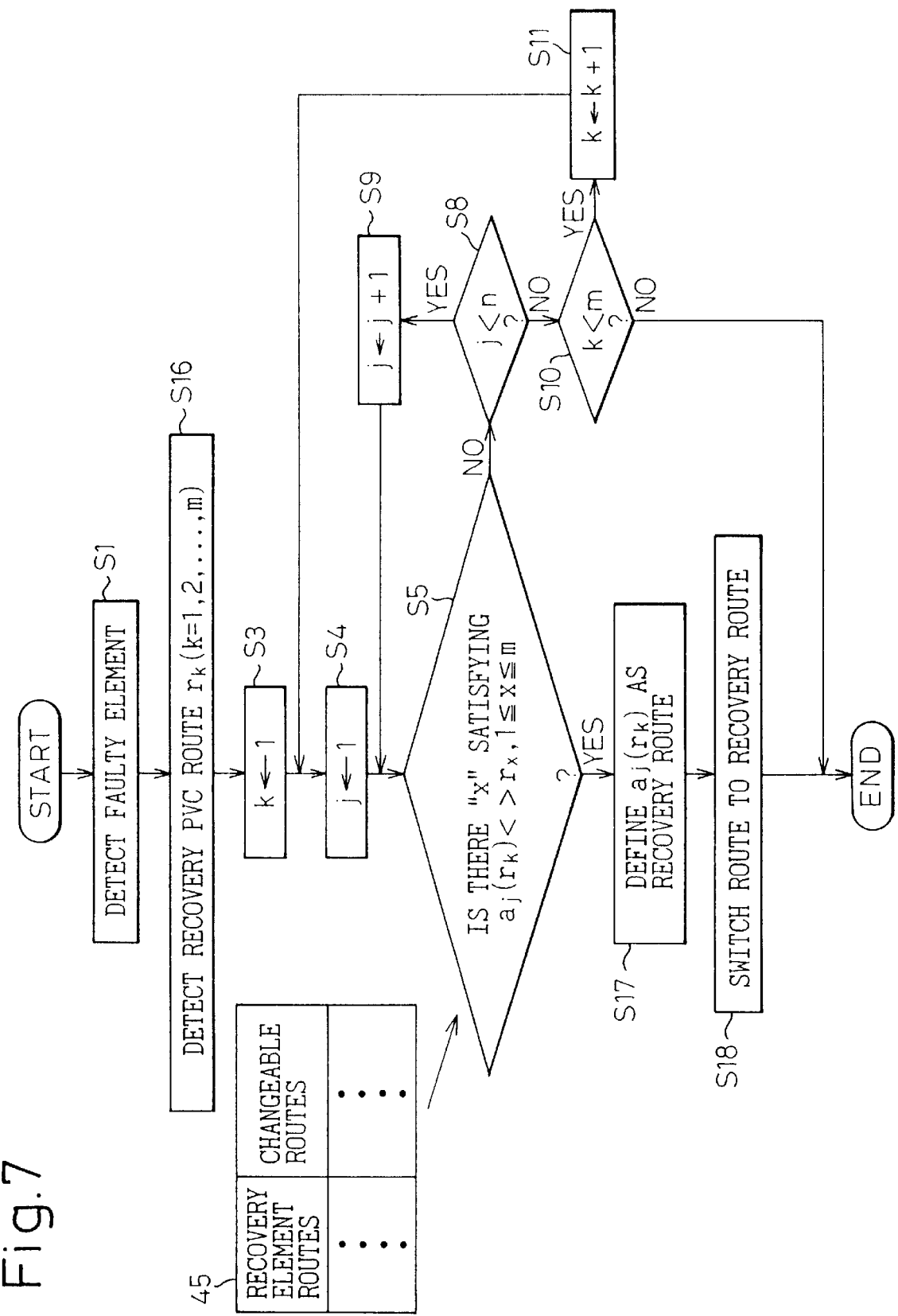
FIG. 7 is a process flowchart for explaining the operation of the structure shown in FIG. 6.

FIG. 6 is a basic structural view of a rerouting system according to the fourth embodiment of the present invention, and FIG. 7 is a process flowchart for explaining the operation of the structure shown in FIG. .6. In the fourth embodiment, based on the recovery information sent from a recovery informing unit (RECOVERY NOTIFICATION) 41, a recovery event analyzing unit (RECOVERY ANALYSIS) 42 detects a set of the corresponding two routes, i.e., one being the PVC route which is used currently and defined as the alternate PVC route for the faulty elements which were faulty before recovery, and the other being the PVC route including the recovered network elements, from a defining unit for the route before alternation (below, a previous route defining unit (PREVIOUS ROUTE DEFINITION) 43. Further, the route is recovered to the route before alternation by a recovery processing unit (RECOVERY PROCESS) 47. In the drawing, reference number 44 denotes a previous route selecting unit (PREVIOUS ROUTE SELECTION), and 45 denotes a recovery PVC route switching table which includes alternate PVC routes, routes under alternation, and recovery element containing PVC routes (RECOVERY ELEMENT ROUTES).

As mentioned above, according to the fourth embodiment, when the faulty route is recovered after alternation of the route, the route is returned to the route before alternation so that it is possible to realize effective utilization of the resource and to realize re-utilization of the alternate route.

Figure 27:
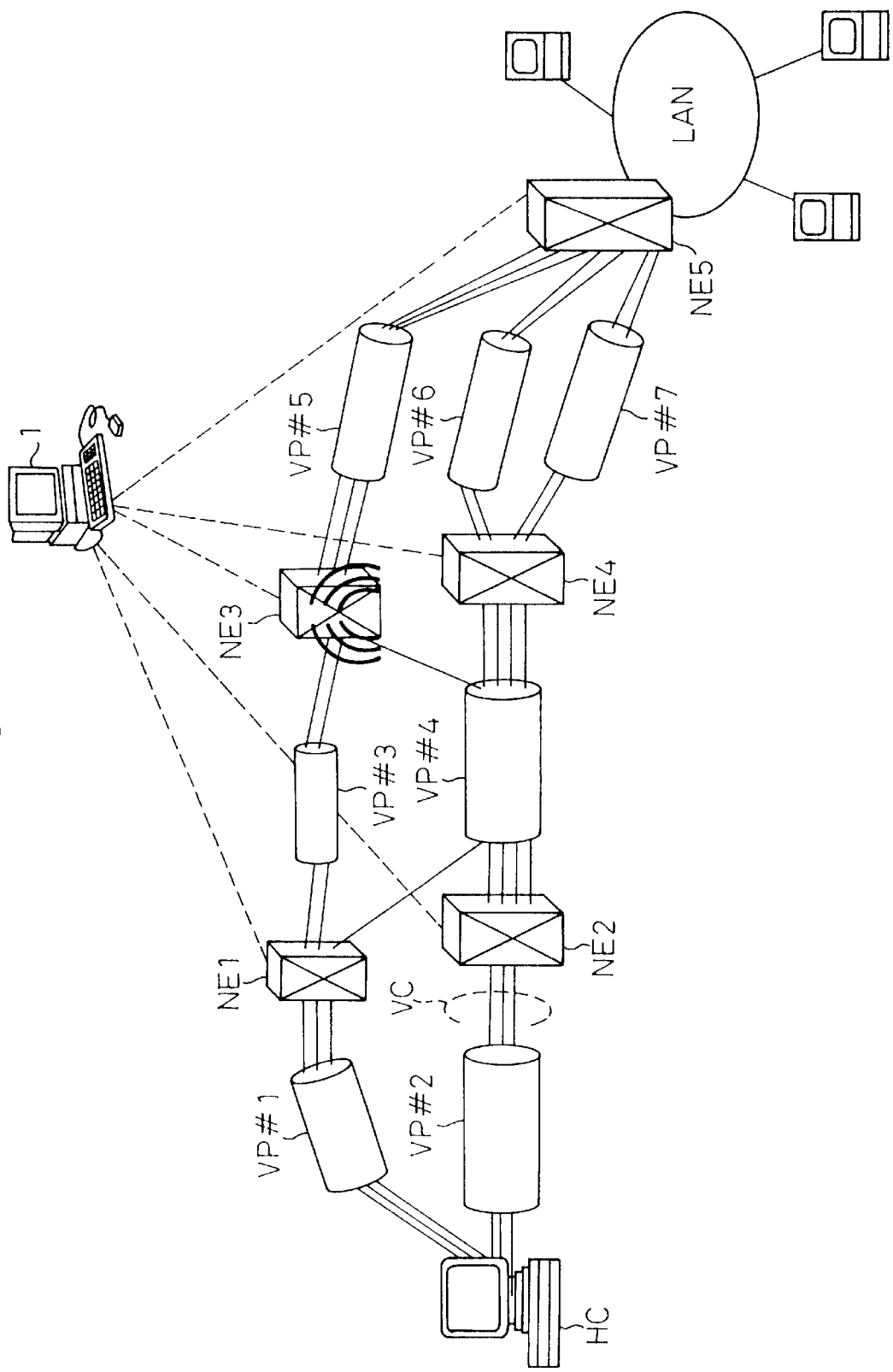
FIG. 27 shows a concrete example of the fourth embodiment according to the present invention.
Figure 28:
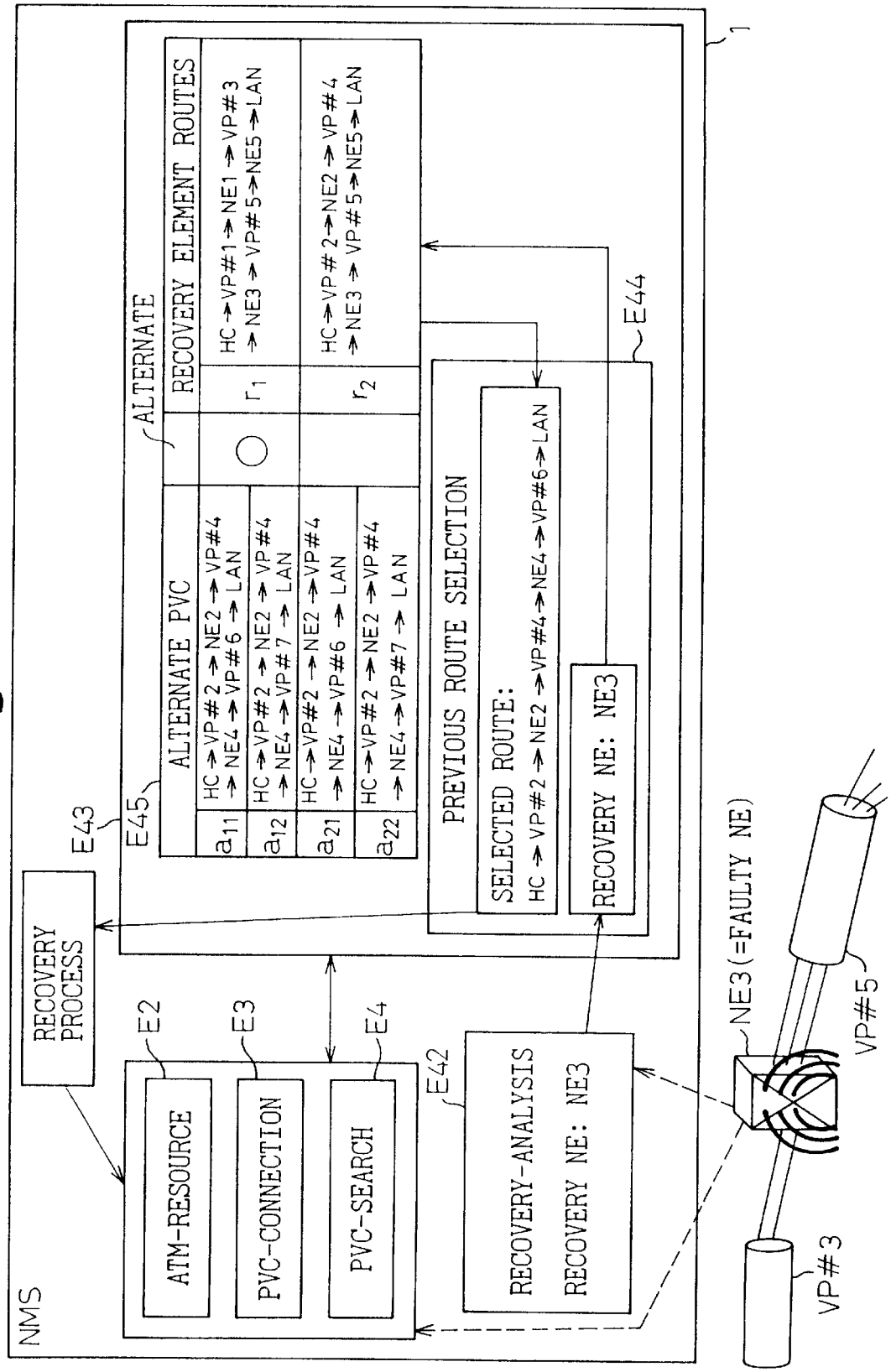
FIG. 28 is an explanatory view for explaining a recovery process when an ATM exchange NE3 was recovered.

FIG. 27 shows a concrete example of the fourth embodiment, and FIG. 28 is an explanatory view for explaining a recovery process when the ATM exchange NE3 was recovered.

In FIG. 28, first, the recovery event analyzing unit E42 detects the ATM exchange as the recovery element to be recovered (step S1). Next, the recovery event analyzing unit E42 searches the PVC route including the ATM exchange NE3 from the recovery PVC route switching table E45 provided within the previous route defining unit E43 (step S16).

The recovery event analyzing unit E42 receives the recovery message from the ATM exchange NE3. A previous route selecting unit E44 searches the recovery element containing PVC routes $r_1$ and $r_2$, which includes the ATM exchange NE3, from a recovery PVC route switching table E45, and extracts the PVC route $a_{11}$ under alternation from the table E45. After these processes, the route is recovered from the PVC route $a_{11}$ to the recovery element containing PVC route $r_1$ in a recovery processing unit E47.

A Fifth Embodiment

Next, as the fifth embodiment, when defining the alternate route or at any time in the first embodiment, effective switching steps for the alternate route are previously defined in such a way that the route before alternation is compared with the PVC structural elements on the alternate routes defined in the actual switching process, and either elements which need to newly prepare, or elements which,can utilize previous elements before alternation is sorted. As a result of previous definition, it is possible to omit the decision process at switching process and to reduce switching processing time in the rerouting system.

Figure 8:
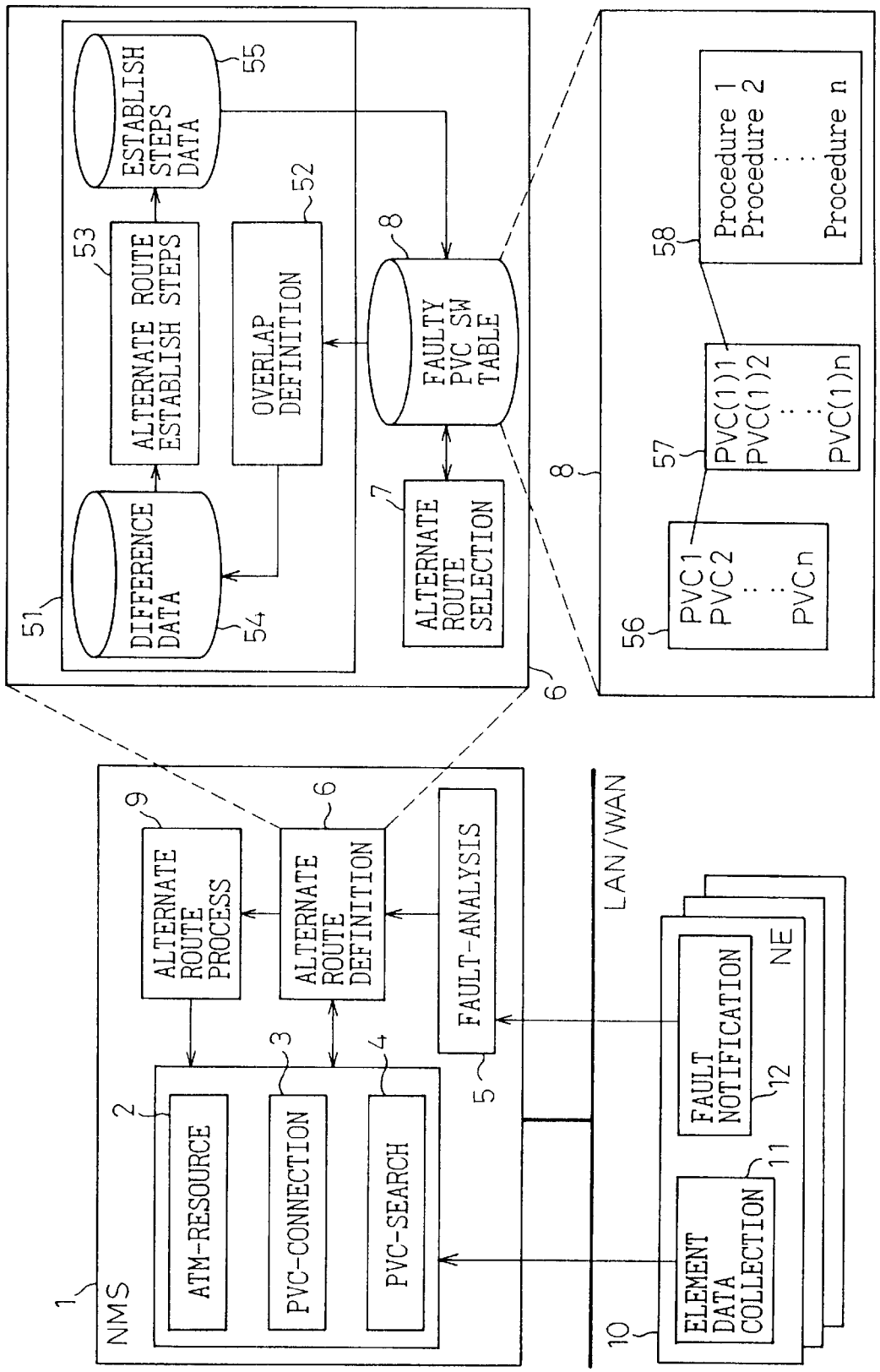
FIG. 8 is a basic structural view of a rerouting system according to a fifth embodiment of the present invention.

FIG. 8 is a basic structural view of a rerouting system according to the fifth embodiment of the present invention. An alternate route establishing steps defining unit 51 takes the present PVC route and the alternate route corresponding to the present PVC route from a PVC list 56 and an alternate route list 57, which are provided in a faulty PVC route switching table (FAULTY PVC SW TABLE) 8, at an optional timing. Further, the portions overlapped/not overlapped with the present PVC route are extracted in a PVC route overlap defining unit (OVERLAP DEFINITION) 52 for each alternate route, and the extracted portions are entered in a route difference data unit (DIFFERENCE DATA) 54.

An alternate route establishing steps analyzing unit (ALTERNATE ROUTE STEPS) 53 analyzes optimum establishing steps, for example, of previously establishing the PVC route for not overlapped portions and, then, of connecting to the overlapped portions, for the PVC route based on the route difference data. The optimum establishing steps are input to an alternate route establishing steps data unit (ESTABLISH STEPS DATA) 55, and registered in an alternate route preparing steps 58 as one of elements of the alternate routes corresponding to the faulty PVC route switching table 8.

As mentioned above, in the fifth embodiment, as shown in FIG. 8, it is possible to omit decision processes when switching the alternate route, and to reduce switching process time by determining the route which can be replaced from the present PVC route, and by previously defining the steps.

Figure 29:
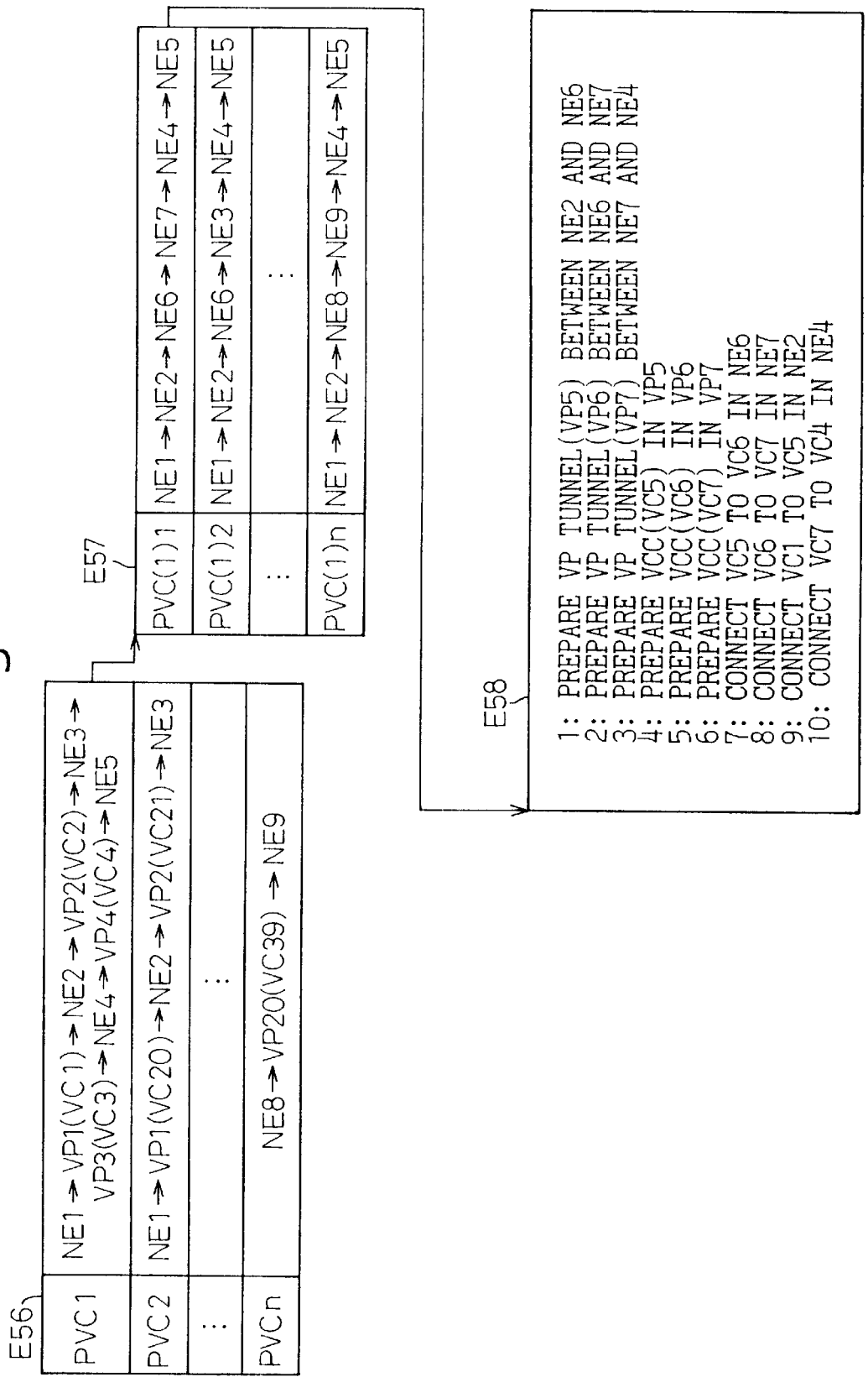
FIG. 29 shows a concrete example corresponding to a faulty PVC route switching table shown in FIG. 8.

FIGS. 29, 30A, 30B, 31A and 31B show concrete examples of the fifth embodiment. FIG. 29 shows a concrete example corresponding to the faulty PVC route switching table 8 shown in FIG. 8, and FIGS. 30A, 30B, 31A and 31B show change of network situation in the alternate route preparing steps 53.

Figure 30A:
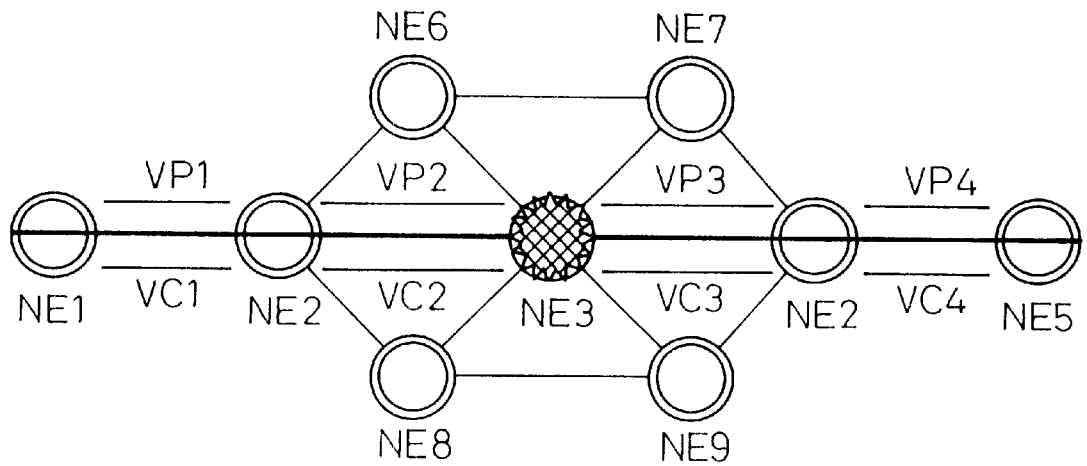
FIGS. 30A, 30B, 31A and 31B show change of network situation in alternate route preparing steps 53.
Figure 30B:
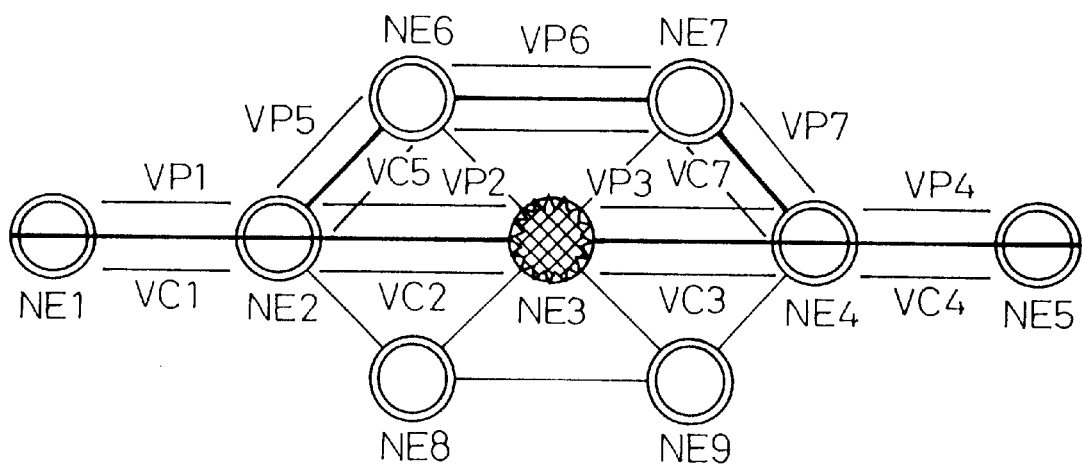
Figure 31A:
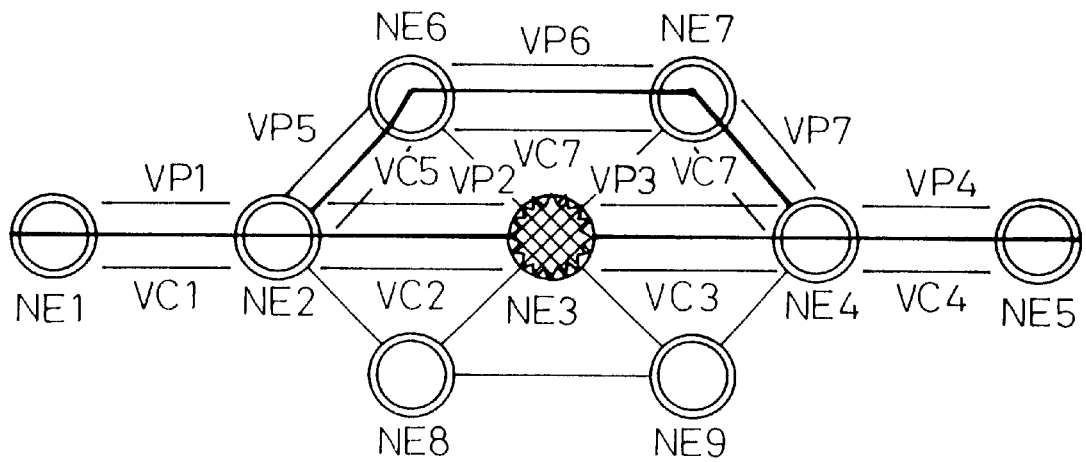
Figure 31B:
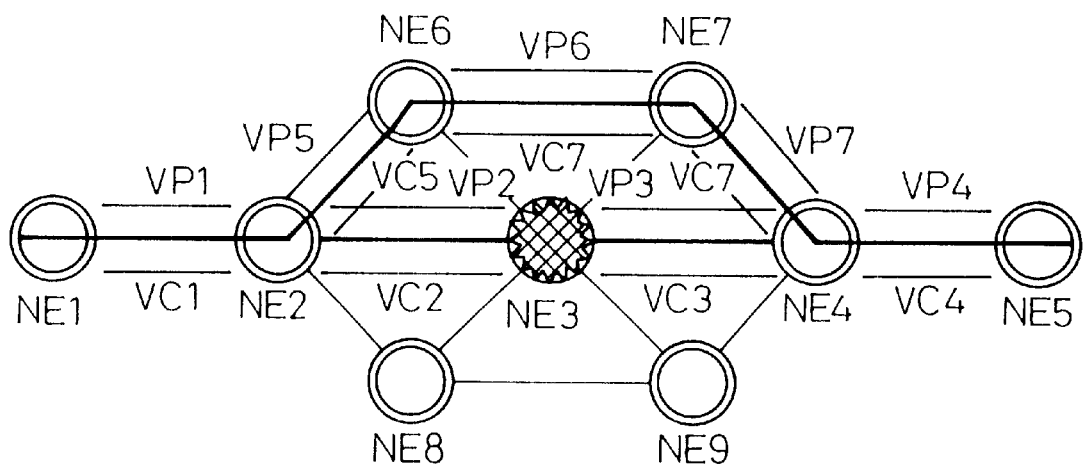

It is assumed that there is a network having the situation shown in FIG. 30A. When the fault occurs in the network element NE3, it is assumed that the PVC(1)1 in the alternate route list E57, which is contained in the PVC1 in the PVC list E56, is applied as the alternate route. At that time, as shown by network situation in FIG. 30B, first, VP tunnels and internal VCCs on the new route, which are not replaced to another route, are prepared. After above steps, as shown by network situation in FIG. 31A, the switching is executed so as to connect the just previously prepared VCC in a certain element NE provided on the new route so that replaceable other routes, besides the present PVC route, are prepared. After above steps, as shown by the network situation in FIG. 31B, the alternate route is prepared by switching boundary network elements between the replaceable portion and the newly prepared portion. The steps as mentioned above are prepared for each alternate route, and registered in an alternate route preparing steps list E58.

That is, as shown in FIG. 29, as the PVC1, when the route [NE1→VP1 (VC1)→NE2→VP2 (VC2)→NE3→PV3 (VC3)→NE4→PV4 (VC4)→NE5] is established, and when the fault occurs in the network element NE3, the alternate route PVC(1), i.e., [NE1→NE2→NE6→NE7→NE4→NE5], is selected. In the alternate route preparing steps, the following steps; i.e., 1: preparation of a VP tunnel (VP5) between NE1 and NE6;
2: preparation of a VP tunnel (VP6) between NE6 and NE7;
3: preparation of a VP tunnel (VP7) between NE7 and NE4;
4: preparation of a VCC (VC5) between the VP5;
5: preparation of a VCC (VC6) within the VP6;
6: preparation of a VCC (VC7) within the VP7;
7: switching to connect VC5 and VC6 in the NE6;
8: switching to connect VC6 and VC7 in the NE7;
9: switching to connect VC1 and VC5 in the NE2; and
10: switching to connect VC7 and VC4 in the NE4;

are prepared, and these steps are registered in the alternate route preparing steps list E58.

A Sixth Embodiment

Next, as in the sixth embodiment, the alternate route for each segment is previously determined in the first embodiment, only the disconnected segment is determined again to the alternate route. As a result, it is possible to establish the alternate route between the faulty segments in the PVC route containing a plurality of segments in the rerouting system.

Figure 9:
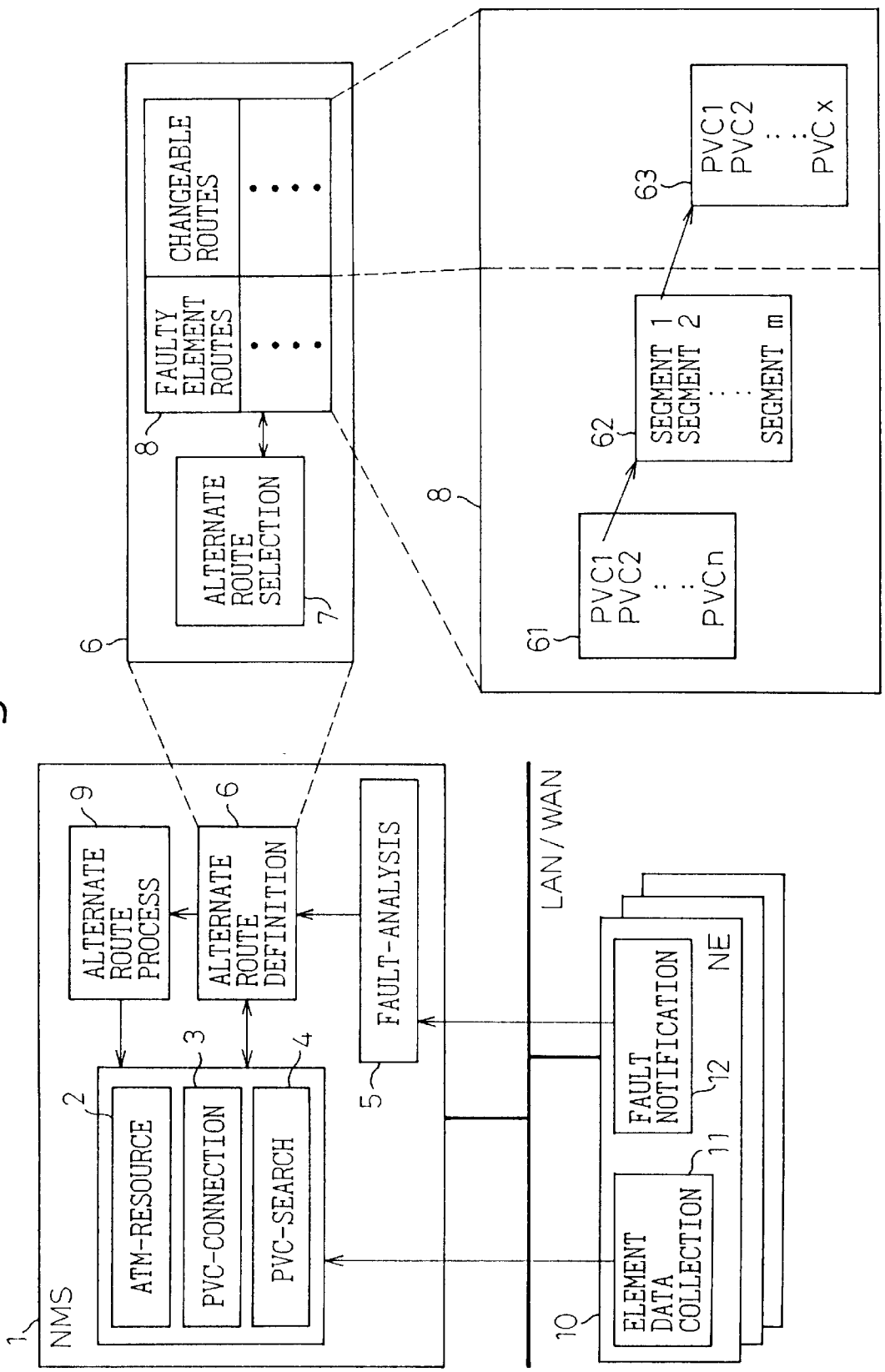
FIG. 9 is a basic structural view of a rerouting system according to a sixth embodiment of the present invention.

FIG. 9 is a basic structural view of a rerouting system according to the sixth embodiment of the present invention. In the faulty PVC route switching table 8 in the first embodiment, as shown in FIG. 9, each PVC route 1 to n in a collection list of faulty element containing routes 61 includes segments 1 to m as shown in a collection list of segments 62, and each segment 1 to m includes PVC routes 1 to x as shown in a collection list of alternate routes 63. That is, one or more alternate route is determined for each segment 1 to m of the collection list 62. The relationship among collection lists 61 to 63 may be determined by the PVC route searching unit 4 when the fault occurs, or may be held previously by the PVC connection managing unit 3.

Figure 10:
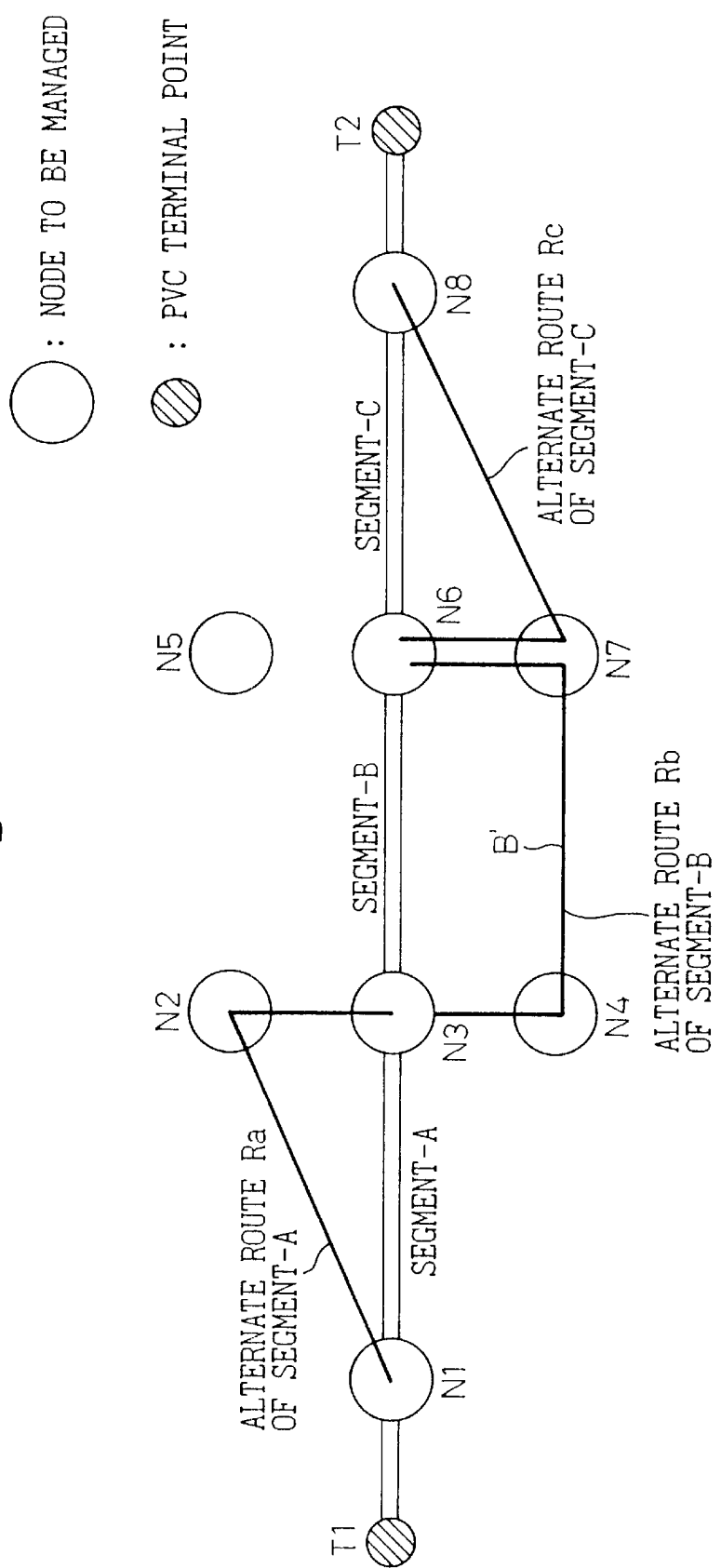
FIG. 10 is an explanatory view for explaining one example of the PVC route.

FIG. 10 is an explanatory view for explaining one example of the PVC route. It is assumed that the PVC route is provided on the path (NODE N1→SEGMENT-A→NODE N3→segment B→NODE N6→SEGMENT-C→NODE N8). In this case, the PVC includes three segments, i.e., SEGMENT-A, SEGMENT-B and SEGMENT-C. AS shown in the drawing, an alternate route Ra can be provided for the segment A, an alternate route Rb can be provided for the segment B, and an alternate route Rc can be provided for the segment C. In the drawing, white circles N1 to N8 denote nodes to be managed, and black dots T1 to T3 denote PVC terminal points.

Further, in the case of another network structure, there is the case that alternate routes should be provided for all routes, not for a certain segment, or there is the case that an alternate route should be provided for collection of a plurality of segments. In particular, when the fault occurs in the network element, it is necessary to provide one alternate route for two segments between faulty network elements. When determining terminal points of the alternate route, the terminal points are set to be changeable in order to select the terminal points of the PVC to be alternated, or to select the terminal points of another segment. The above is shown in FIG. 11.

Figure 11:
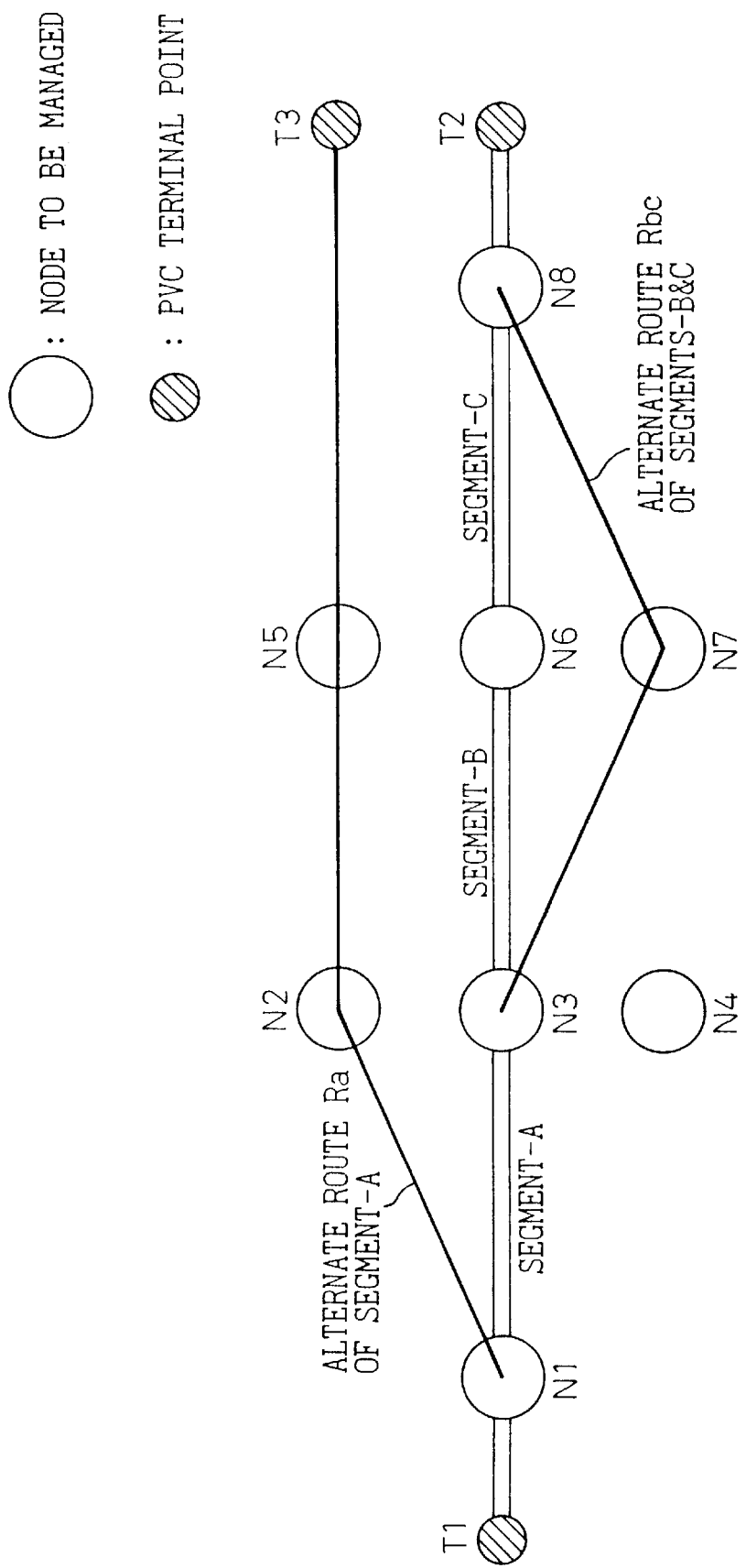
FIG. 11 is an explanatory view for explaining another example of alternate routes.

FIG. 11 is an explanatory view for explaining another example of alternate routes. As shown in the drawing, an alternate route Ra is provided for the segment A, and an alternate route Rbc is provided for the segments B and C. The terminal point for the segment A is set to the node N1 and the new PVC terminal point T3 (see both ends of the solid line), and the terminal point for the segments B and C is set to the nodes 3 and N8 (see both ends of the solid line).

When it is necessary to execute a rerouting operation, the selection of alternate routes is executed by the alternate route defining unit 6 in accordance with the following steps. That is, regarding the PVC to be rerouted, the PVC segment collection 62 and the alternate routes collection 63 for each segment are acquired by the PVC connection managing unit 3. The segment of the faulty element or the segment containing the faulty element is identified in the acquired segment collection 62. Further, the alternate routes are selected from the alternate routes collection 63, which was previously determined, for the identified segment. The above selecting method may be executed based on a setting order of the alternate route, or based on a priority order for each alternate route. Further, it may be possible to execute selection of the alternate route by an operator.

As mentioned above, in the sixth embodiment, when the fault occurs, based on the alternate route information which is previously held in each PVC for each segment, only the faulty segment is rerouted so that it is possible to realize quick rerouting process compared to rerouting processes for all PVC terminal points.

Figure 32:
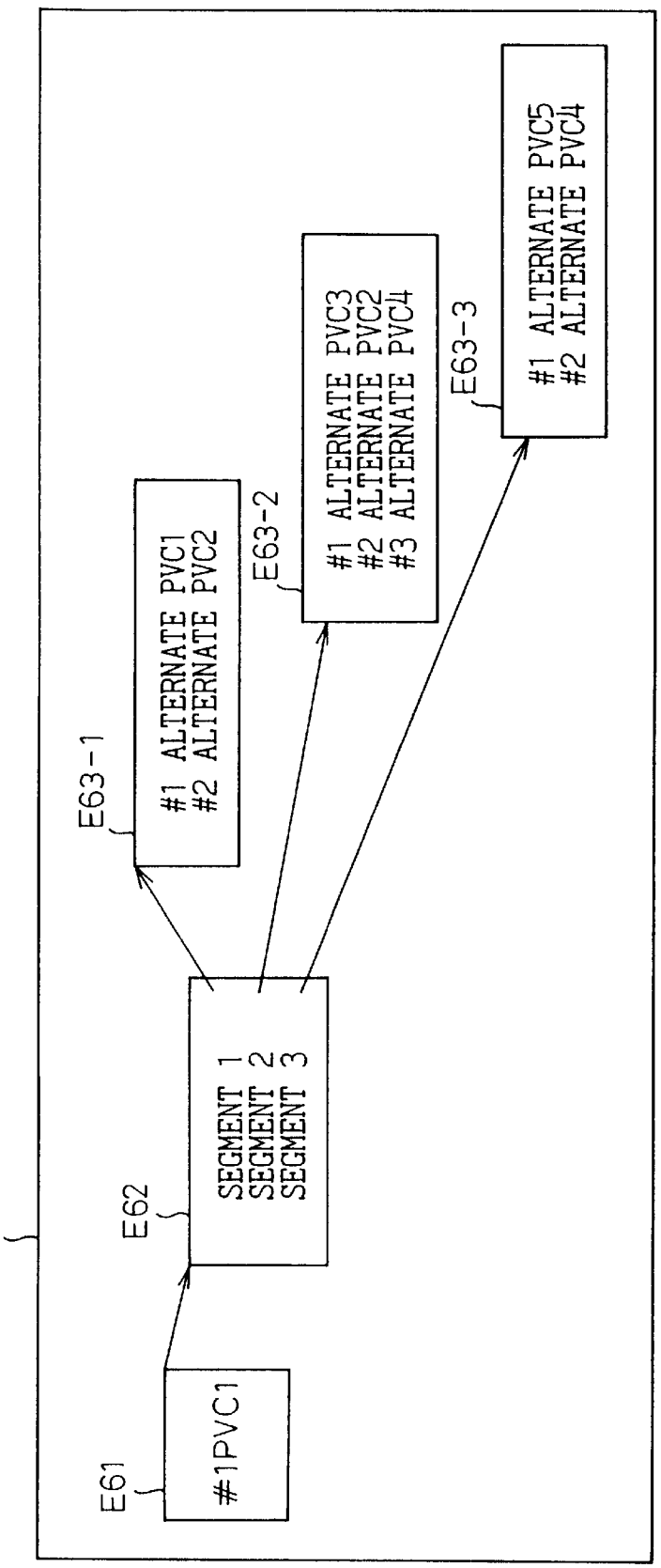
FIG. 32 shows one example of a faulty route changeable table according to the present invention.
Figure 33:
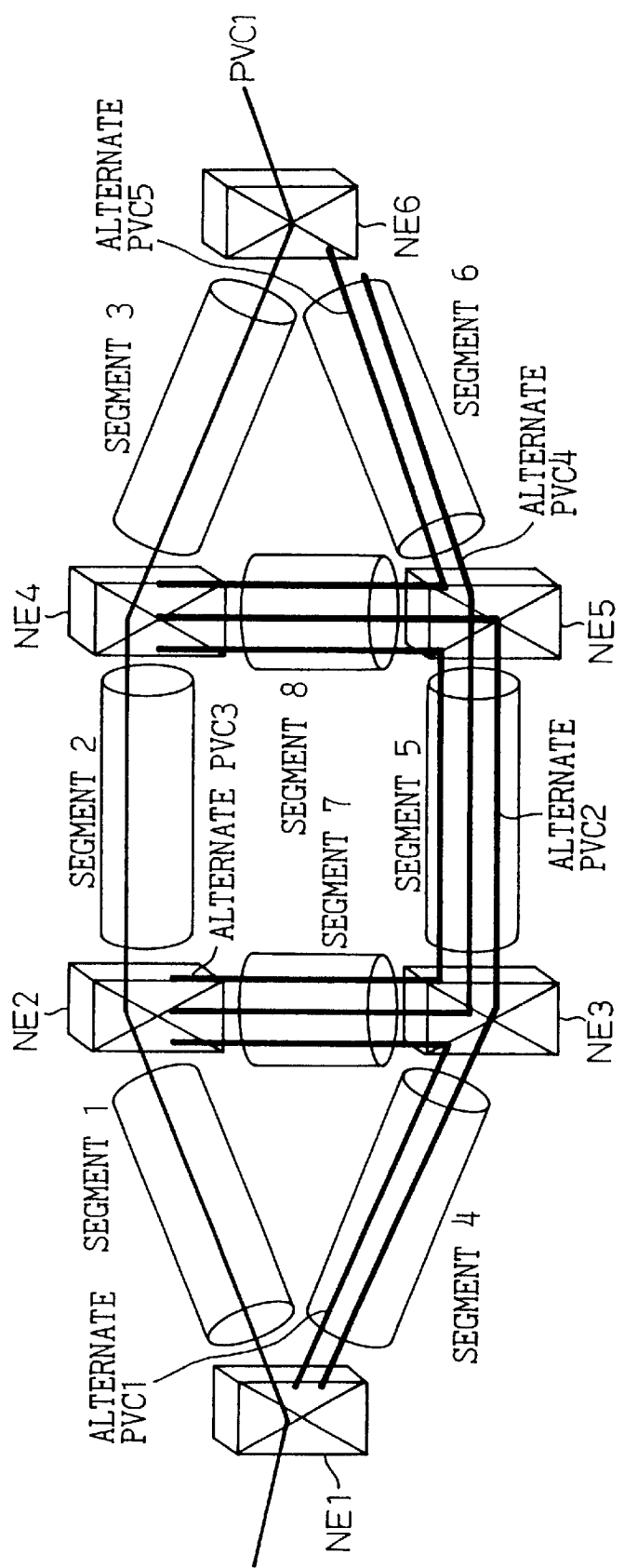
FIG. 33 is a concrete example for the sixth embodiment according to the present invention.

FIG. 32 shows one example of the faulty route changeable table, and FIG. 33 is a concrete examples for the sixth embodiment according to the present invention. When the one PVC (PVC1) is set on the network to be managed, the PVC1 is held in the faulty route switching table E8 as item 1 (i.e., #1PVC) in a faulty element containing PVC route list E61. The PVC1 is relevant to a segment list E62, and formed by three segments 1, 2 and 3 as shown in FIG. 32.

In this case, the alternate PVC routes are set to each segment in the segment list E62. In this embodiment, the alternate routes are as follows.

For segment 1, an alternate route list E63-1 includes two alternate routes #1-alternate PVC1 and #2-alternate PVC2.

For segment 2, an alternate route list E63-2 includes three alternate routes #1P-alternate PVC3, #2-alternate PVC2 and #3-alternate PVC4.

For segment 3, an alternate route list E63-3 includes two alternate routes #1-alternate PVC5 and #2-alternate PVC4.

In this case,
the PVC1 is the PVC containing segments 4 and 7,
the PVC2 is the PVC containing segments 4, 5 and 8,
the PVC3 is the PVC containing segments 7, 5 and 8,
the PVC4 is the PVC containing segments 7, 5 and 6, and the
PVC5 is the PVC containing segments 8 and 6.

The alternate route, which is set to each segment of the PVC to be rerouted, may be set based on the alternate route list when executing the rerouting process, or based on priority order information for each alternate route.

A Seventh Embodiment

Next, as the seventh embodiment, when the alternate route is registered in the sixth embodiment, whether the present VP/VC on the alternate route can be utilized as the alternate route, the available VP/VC is registered as the alternate route. As a result, it is possible to divert the VP/Vc for another PVC on the alternate route as the alternate PVC in the rerouting system, as explained in detail below.

Figure 12:
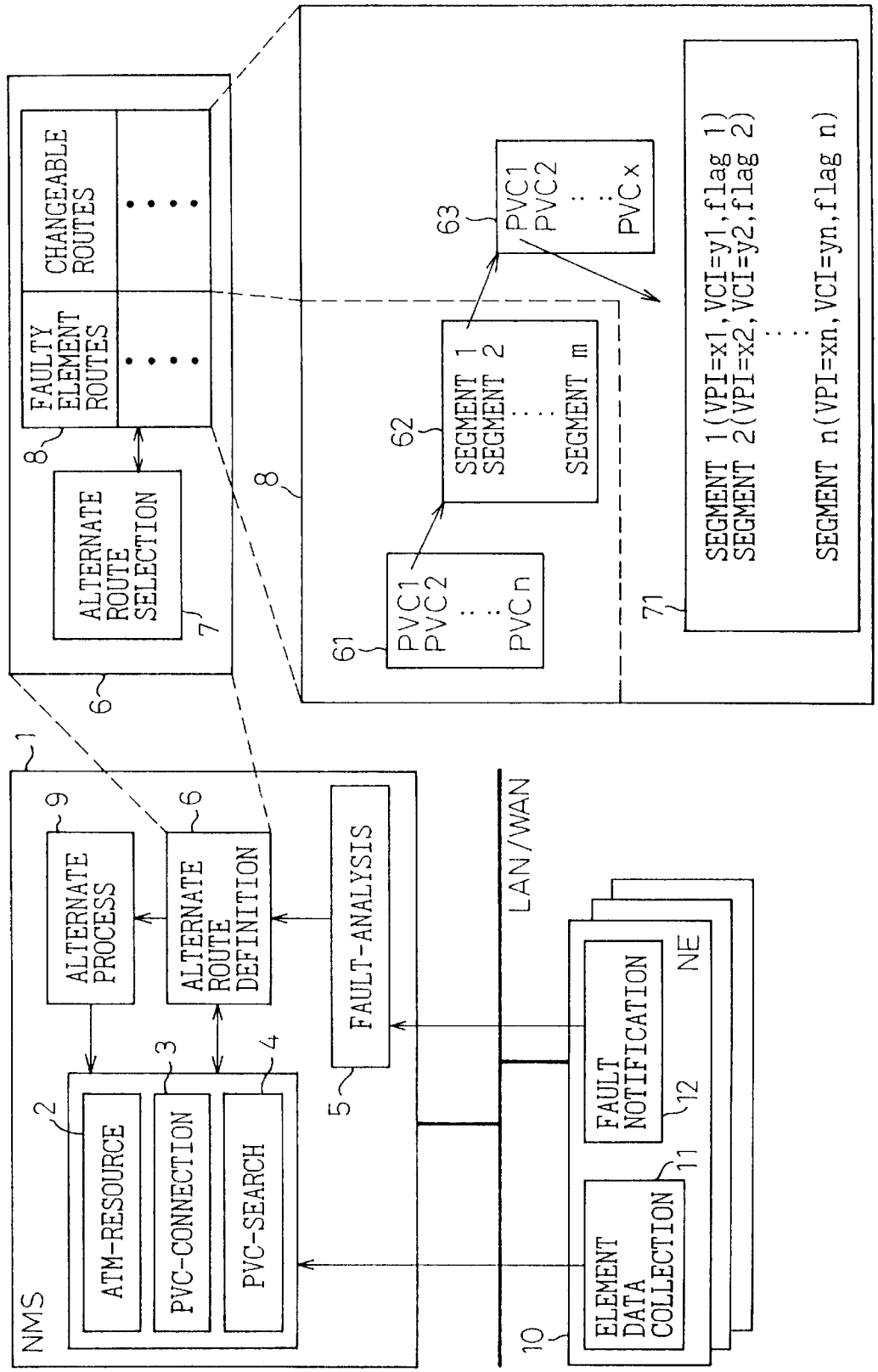
FIG. 12 is a basic structural view of a rerouting system according to a seventh embodiment of the present invention.

FIG. 12 is a basic structural view of a rerouting system according to the seventh embodiment of the present invention. An alternate route collection 63 is relevant to each segment of a segment collection 62, which includes segments 1 to m, on the faulty PVC route switching table 8 in the sixth embodiment. The following information is related to the element (i.e., an alternate PVC) of each alternate route collection as the alternate PVC information 71 which includes segments 1 to n.

one or more segments constituting the alternate route;
a VPI (and in the case of VCI and VCC) information on the segment (including essential elements when setting the VP/VC); and
a flag for indicating whether the present VP/VC is diverted or another PVC is newly set for the segment.

In this embodiment, there are the following two values which are set to the flag.

a new flag for indicating that the VP and VC for the alternate PVC are newly set on the designated segment when executing the rerouting process.
a diverting flag for indicating that the VP and VC for the alternate PVC are diverted from the present PVC on the designated segment.

From the above, when the rerouting process becomes necessary, the alternate route defining unit 6 selects the alternate route from the alternate route collection 63 in accordance with steps described in the sixth embodiment. Further, an alternate route processing unit 9 executes the rerouting process in accordance with the following steps.

The alternate PVC information 71, which is related to the alternate route selected from the alternate route collection 63, is acquired.
Based on the acquired alternate PVC information 71, the VP and VC are set based on the VPI/VCI information for the segment indicated by the newly set flag. Further, both end terminals are disconnected for the segment indicated by the diverting flag for the present PVC (in this case, service of the diverted PVC is interrupted.), and connected again to the segment of the alternate route.

In the disconnection and re-connection between segments in the above rerouting process, when the sequential segments are diverted from one present PVC, the disconnection is not executed between end terminals of the sequential segments and it is possible to use the route without disconnection.

As explained above, in the seventh embodiment, when the fault occurs, and when only the faulty segment is alternated based on the alternate route information for each segment which is previously held by each PVC, it is possible to realize quick rerouting process compared to new setting of the VP/VC at the rerouting process by diverting the VP/VC for the present PVC as the alternate PVC.

Figure 34:
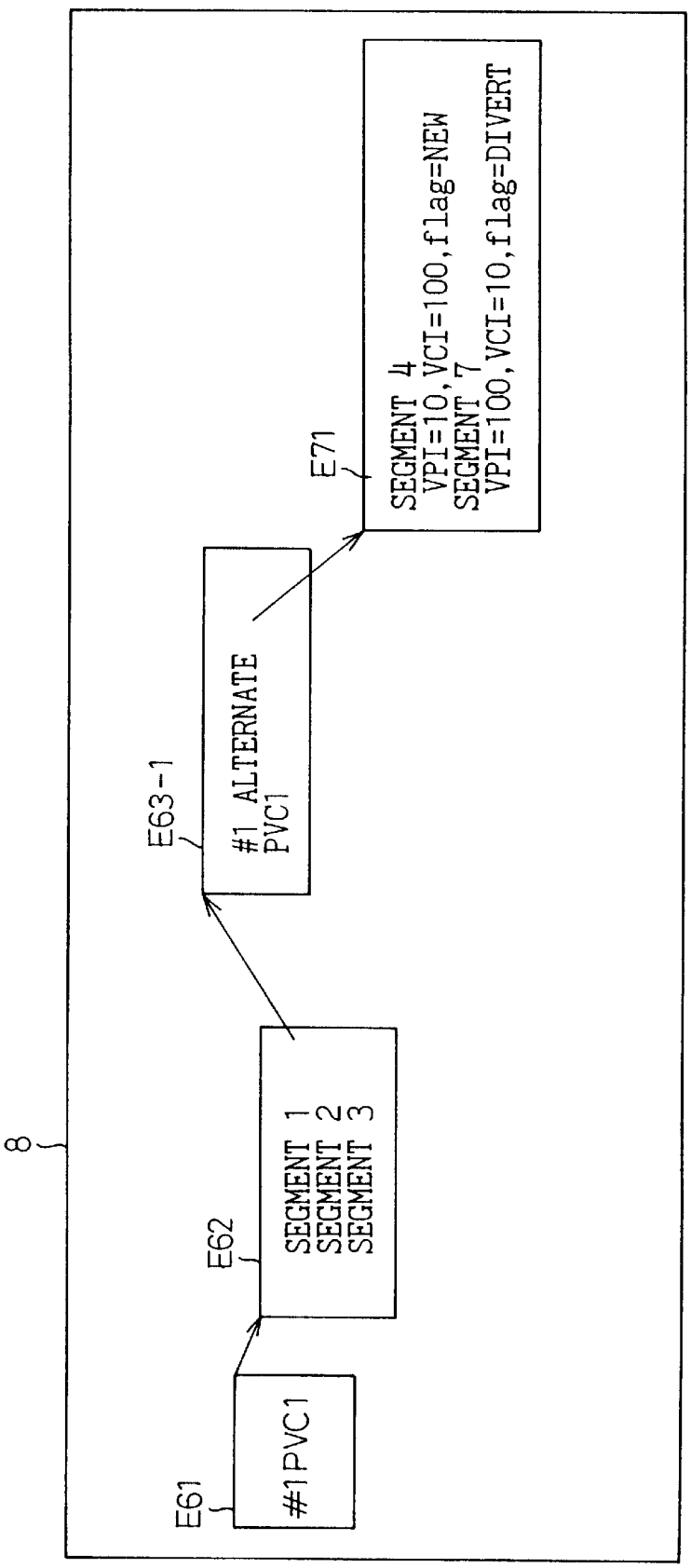
FIG. 34 shows a detailed explanatory view of a faulty route switching table.
Figure 35:
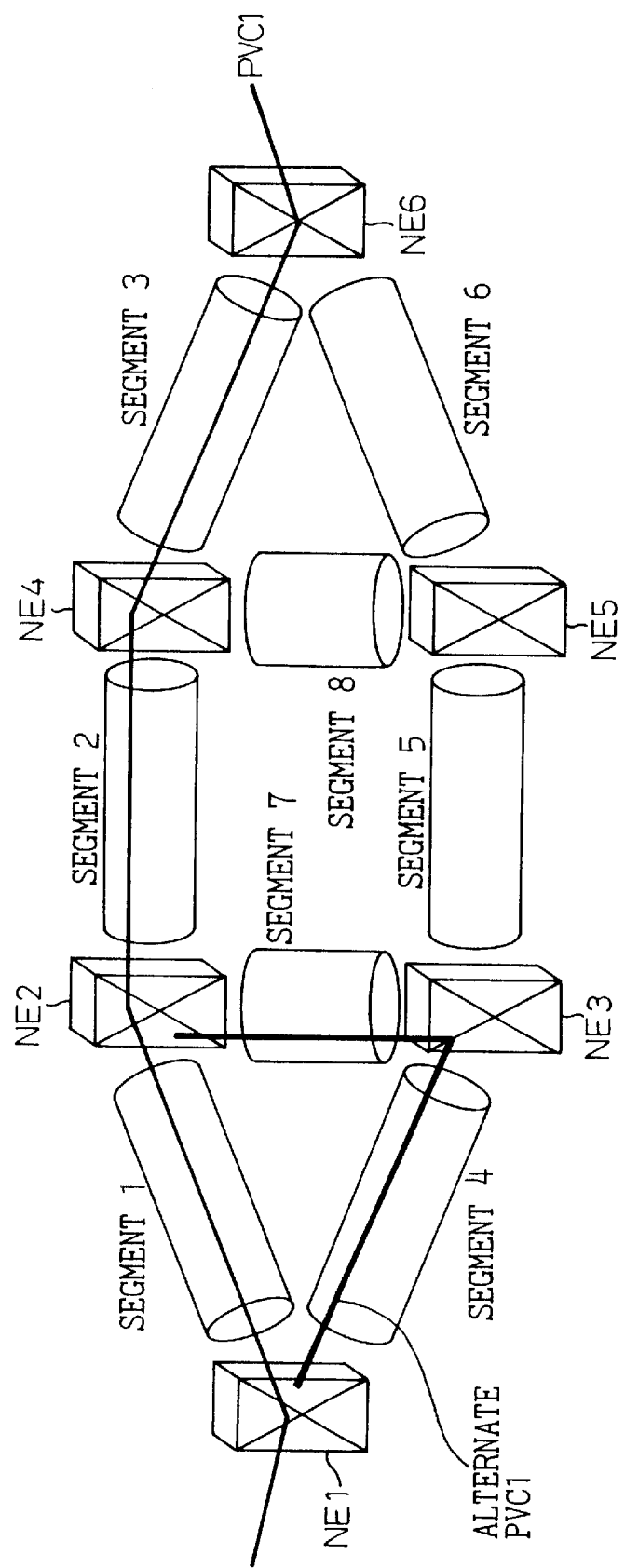
FIG. 35 shows a concrete example of the seventh embodiment according to the present invention.

FIG. 34 shows a detailed explanatory view of the faulty route switching table, and FIG. 35 shows a concrete example of the seventh embodiment.

When one PVC (PVC1) is set on the managing network, the PVC1 includes the segment list 62, which is contained in the PVC1, and the alternate route list E63 (only E63-1 is shown in the drawing) which is different in each segment. Further, for the alternate route PVC1 in the alternate list E63 for the segment 1, the segment information contained in the PVC1 is held in a segment list E71.

In this embodiment, the alternate route PVC1 includes the segment 4 and the segment 7 in the segment information list E71. In this case, the segment 4 includes parameters required for ATM connection, such as VPI/VCI information (VPI=10, VCI=100) and frequency band information. Further, the segment flag information (see flag=NEW) is set in the segment 4. In this case, the flag information "flag=NEW" indicates that, when executing the rerouting process, the VP and VC for the alternate PVC are newly set on the segment 4.

Further, in the segment 7, "flag=DIVERTED" indicates that, when executing the rerouting process, the VP and VC which are used in another PVC, is diverted as the alternate PVC.

An Eighth Embodiment

Next, as the eighth embodiment, when executing the alternate route switching process, an interactive means is provided for executing communication with a maintenance operator. The interactive means provides the relief order information of the faulty PVC, an attribute information of the faulty PVC, and a candidate information of the changeable PVC route, to the maintenance operator, so that it is possible to determine the alternate route based on the maintenance operator's decision in the PVC rerouting system.

Figure 13:
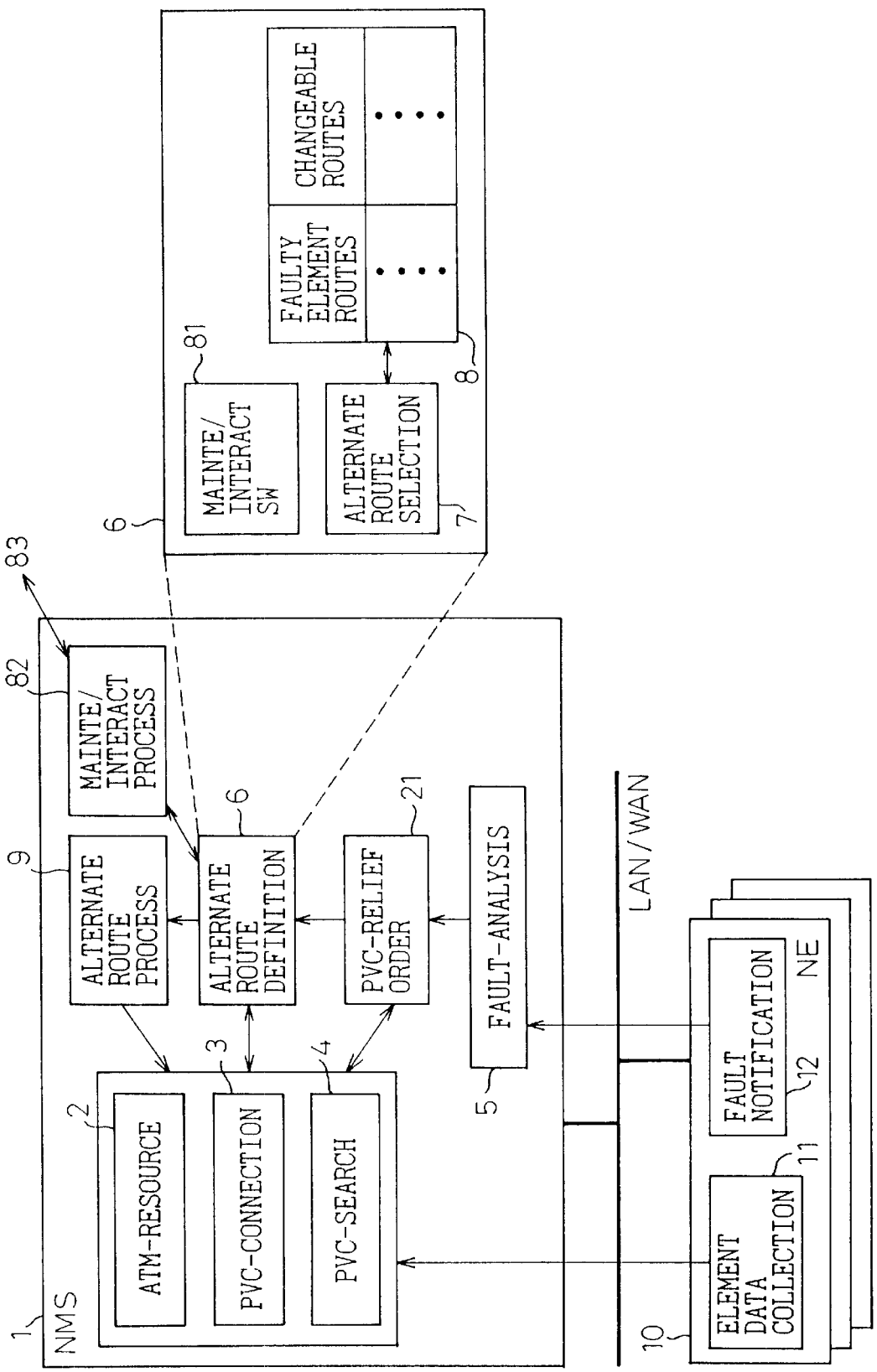
FIG. 13 is a basic structural view of a rerouting system according to an eighth embodiment of the present invention.

FIG. 13 is a basic structural view of a rerouting system according to the eighth embodiment of the present invention. The operations of the alternate route defining unit 6 based on the maintenance operator's decision are as follows in the eighth embodiment.

The alternate route selecting unit 7 in the alternate route defining unit 6 receives the attribute information of the faulty PVC and the relief order. information from the PVC relief order defining unit 21. The alternate route selecting unit 7 searches the faulty PVC route switching table 8, collects the candidate information of the changeable PVC route for each faulty PVC route, and sends these information with the attribute/relief order information of the faulty PVC to a maintenance/interaction switching unit (MAINTE/INTERACT SW) 81 within the alternate route defining unit 6.

The maintenance/interaction switching unit 81 displays the attribute/relief order information of the faulty PVC and the changeable PVC route candidate information on a maintenance operator's terminal (MAINTE/INTERACT PROCESS) 83, and reminds selection of the changeable PVC route by the maintenance operator. When the maintenance operator selects the changeable PVC route, the information is sent to the alternate route processing unit 9.

When the maintenance/interaction is valid, the maintenance/interaction switching unit 81 displays the faulty PVC attribute information, the relief order information, and the changeable PVC route candidate. information to the maintenance operator's terminal 83, through the maintenance/interaction processing 82, in order to remind selection of the changeable PVC route by the maintenance operator. When the maintenance operator selects the changeable PVC route, the information is sent to the alternate route processing unit 9.

When the maintenance/interaction is invalid, the maintenance/interaction unit 81 selects the high priority route from the changeable PVC route, and sends it to the alternate route processing unit 9 as the changeable PVC route information.

The designation, in which the maintenance/interaction is valid or invalid, is previously designated by the maintenance operator from the maintenance operator's terminal 83 to the maintenance/interaction switching unit 81 through the maintenance/interaction processing unit 82.

As mentioned above, in the eighth embodiment, as shown in FIG. 13, when determining the alternate route, it is possible to interact with the maintenance operator.

Further, it is possible to provide the faulty PVC attribute information, the relief order information and the changeable PVC route candidate information, to the maintenance operator, so that the maintenance operator provides a final decision means for the alternate route based on this information. As a result, it is possible to optionally add decision by the maintenance operator besides the present decision element for the changeable PVC route.

Figure 36:
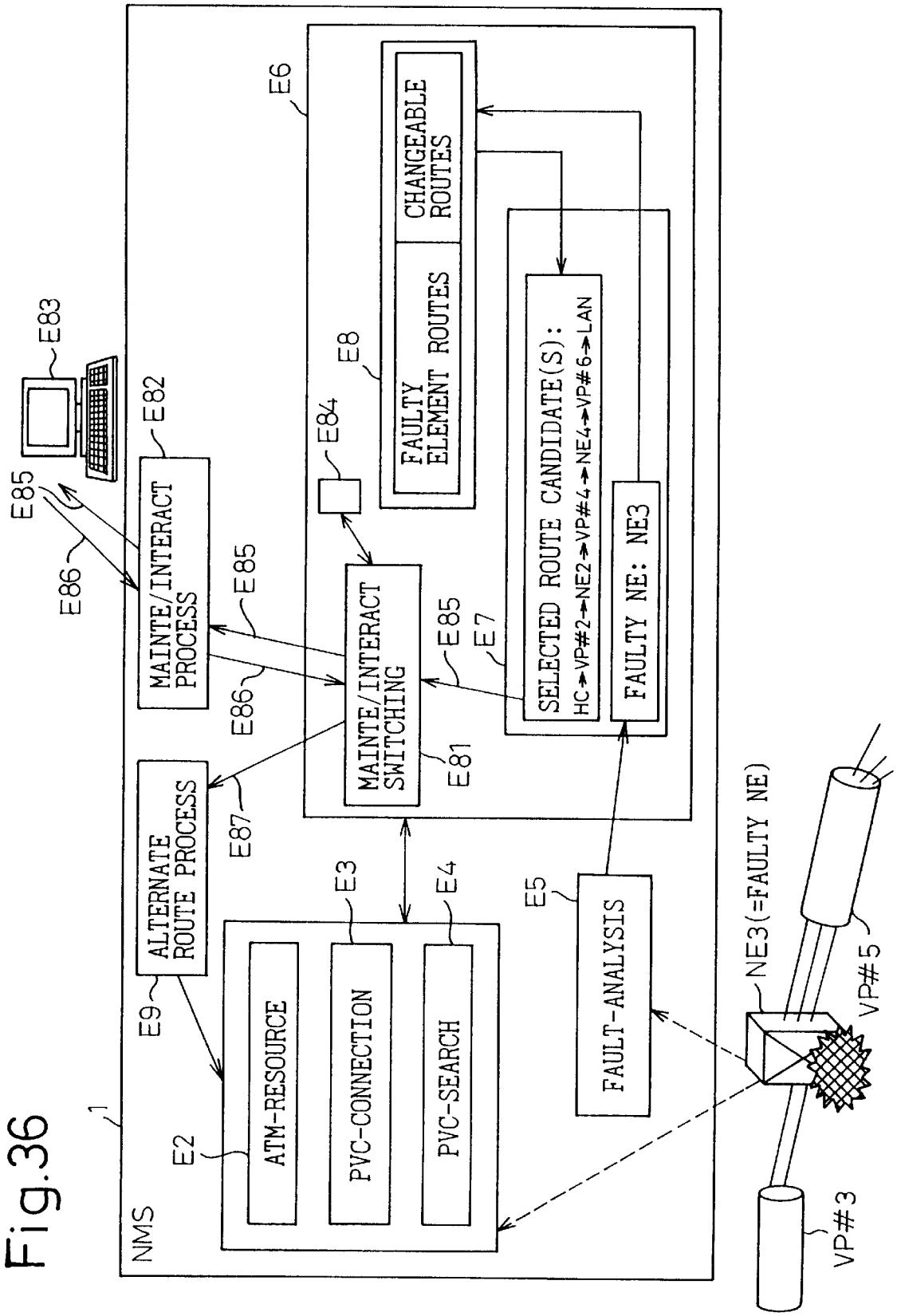
FIG. 36 shows a concrete example of a rerouting system according to the eighth embodiment of the present invention.

FIG. 36 shows a concrete example of a rerouting system according to the eighth embodiment of the present invention. When the maintenance operator provides the designation E86 in which the maintenance/interaction is valid or invalid or the designated PVC route information. The designated information is sent from the maintenance operator's terminal E83 to the maintenance/interaction switching unit (MAINTE/INTERACT SWITCHING) E81 through the maintenance/interaction processing unit (MAINTE/INTERACT PROCESS) E82. The maintenance/interaction switching unit E81 turns on/off the valid/invalid flag E84 of maintenance/interaction.

When the valid/invalid flag E84 of maintenance/interaction is turned on (i.e., maintenance/interaction is valid), the information E85 which includes the faulty PVC attribute information, the faulty PVC relief order information and the changeable VC route candidate information, these being output from the alternate route selecting unit E7, is displayed on the maintenance operator's terminal E83 through the maintenance/interaction switching unit E81 and the maintenance/interaction unit E82.

The maintenance operator E83 refers to the information E85, and executes change of the PVC relief order and decision of changeable PVC route for each faulty PVC route based on his own decision. The result of the decision is sent from the maintenance operator's terminal E83 to the alternate processing unit E9 as the determined PVC route information E86, through the maintenance/interaction processing unit E82 and the maintenance/interaction switching unit E81.

The valid/invalid flag E84 of maintenance/interaction is turned off, the maintenance/interaction switching unit E81 selects the highest priority PVC route from the changeable PVC route in the information E85, which includes the faulty PVC attribute information, the faulty PVC relief order information and the changeable PVC route candidate information, and the selected PVC route is directly sent to the alternate route processing unit E9.

A Ninth Embodiment

Next, as the ninth embodiment, when there are a plurality of alternate routes in the first embodiment, a switching priority order is designated for the alternate list of each route at any optional timing including the timing of the registration by the operator. As a result, it is possible to increase the flexibility of route selection in the rerouting system.

Figure 14:
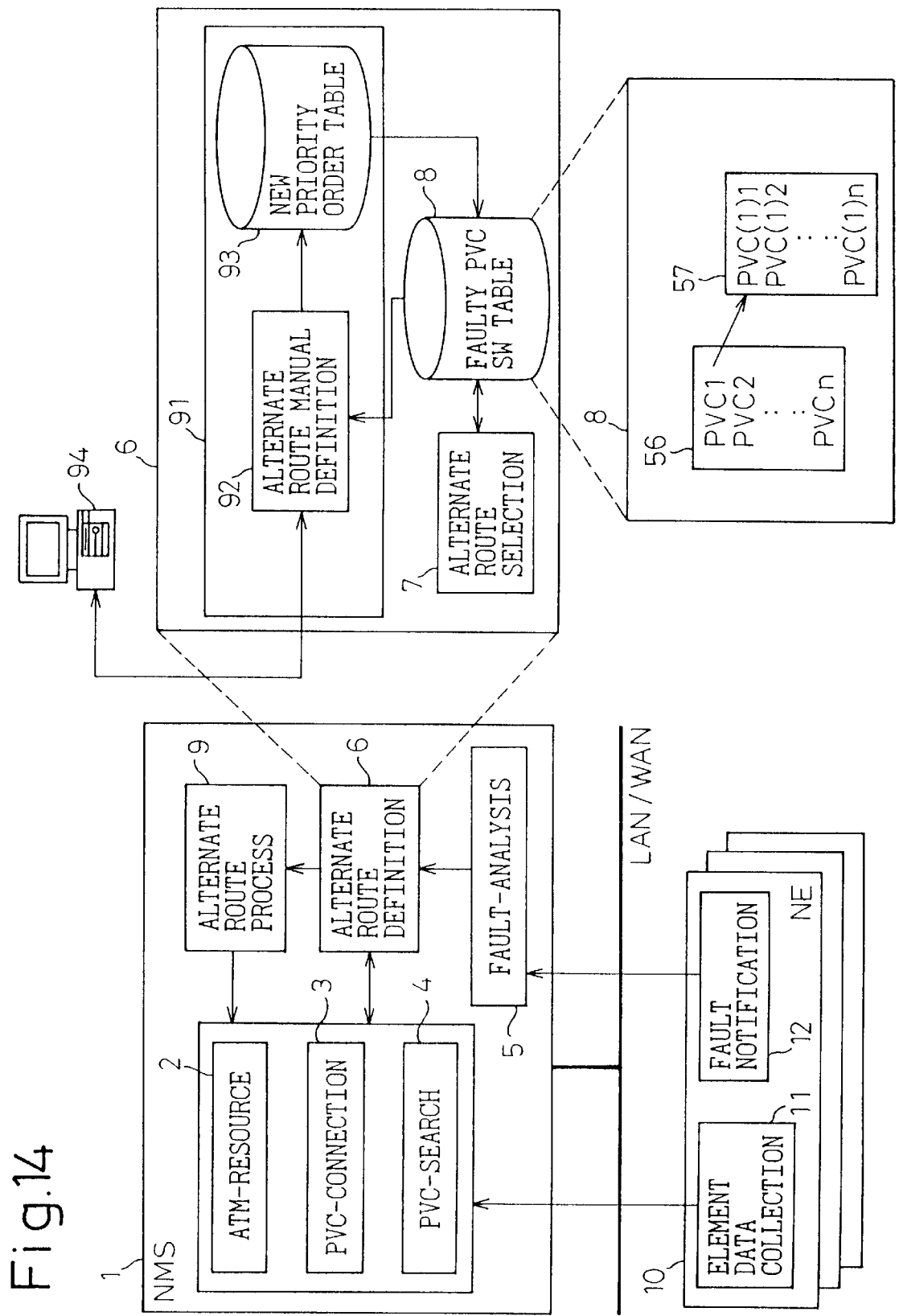
FIG. 14 is a basic structural view of a rerouting system according to a ninth embodiment of the present invention.

FIG. 14 is a basic structural view of a rerouting system according to the ninth embodiment of the present invention. An alternate route manually defining unit (ALTERNATE ROUTE MANUAL DEFINITION) 92 is provided in the ninth embodiment. An alternate route priority order defining unit 91 which is provided in the alternate defining unit 6, extracts one present PVC route and the alternate PVC route list 57 corresponding to the above from the PVC list 56 of the faulty PVC route changeable table 8, at any optional time when the operator handles a console 94. Further, the alternate route list 57 is displayed on the GU1. Reference number 94 denotes a console which is handled by an operator.

The operator changes the priority order of the applied alternate route from the alternate route list in accordance with operator's instructions on the console 94, inputs the priority order into an alternate route new priority order table (NEW PRIORITY ORDER TABLE) 93, and updates the priority order data of the alternate route list 57 in the faulty route switching table 8.

As explained above, in the ninth embodiment, as shown in FIG. 14, when there are a plurality of alternate routes, the operator previously designates the priority order for the change so that it is possible to realize selection due to operator's proper reason and to raise flexibility of priority order, compared to an automatic decision, when selecting the alternate route.

FIG. 37 shows a concrete example of the ninth embodiment, and shows the concrete example of the PVC list 56 and the alternate route list 57.

The alternate route list (before change) E57' and the alternate route list (after change) E57 indicate before and after change of the changeable priority order by the operator. Further, the alternate route list (after change) E57 and the same data are contained in the alternate route new priority order table 93 in FIG. 14. After edition and change were executed based on the new priority order table 93, and the result is reflected to an actual route list 57 so that the change of the priority order is executed. In the lists E57 and E57', NAME denotes a name of alternate route, and PRIORITY ORDER denotes priority order of the alternate route.

A Tenth Embodiment

Next, as the tenth embodiment, when there are a plurality of alternate routes in the first embodiment, and when the fault occurs, a degree of margin for an average value or a maximum value of a band in each structural element of the alternate route candidate is extracted from a resource managing function and an actual network so that it is possible to automatically set the optimum changing order of the alternate route with a margin for the resource in the PVC rerouting system.

Figure 15:
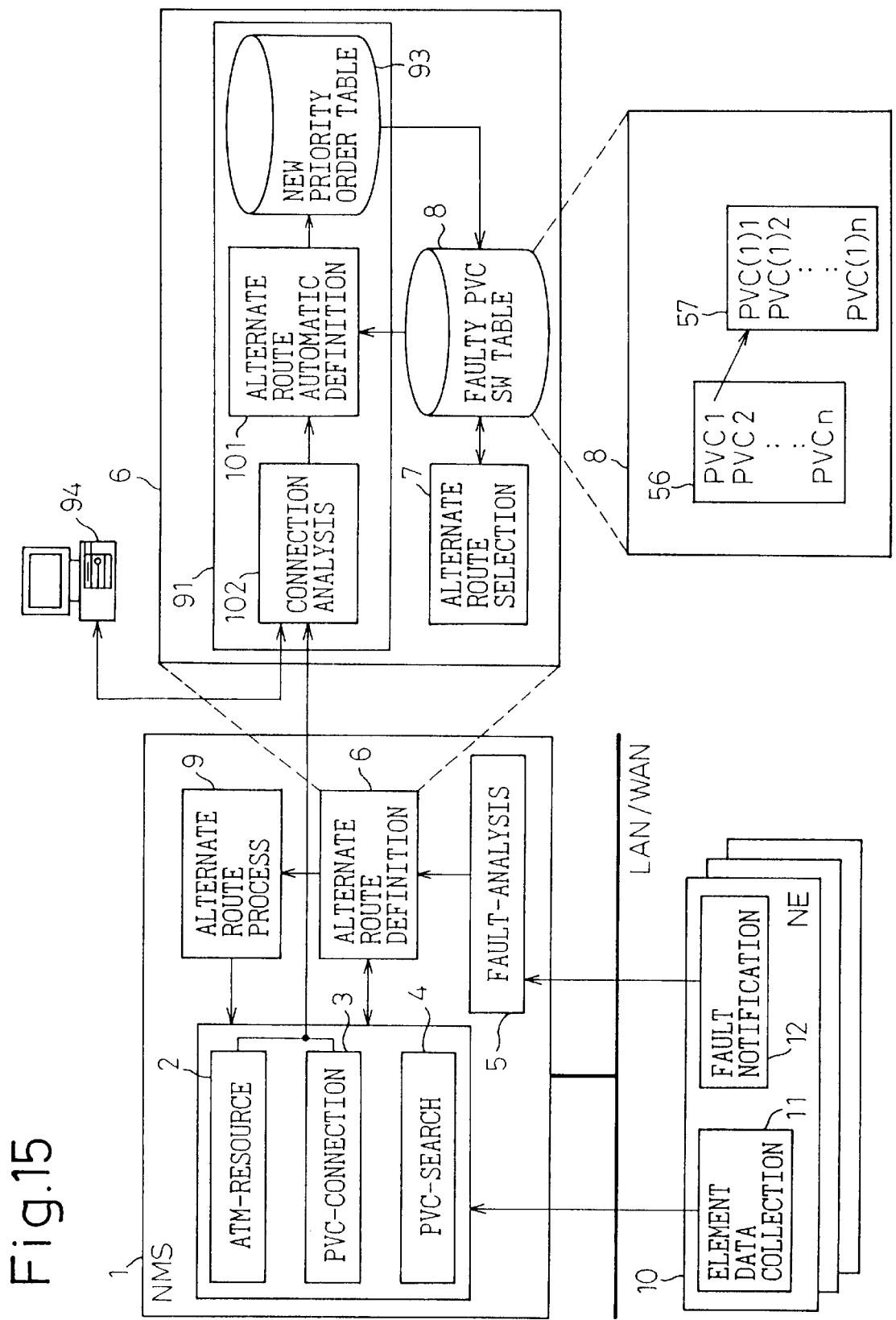
FIG. 15 is a basic structural view of a rerouting system according to a tenth embodiment of the present invention.

FIG. 15 is a basic structural view of a rerouting system according to the tenth embodiment of the present invention. An alternate route automatically defining means is explained based on connection information in the tenth embodiment.

When the fault occurs, the alternate route priority order defining unit 91, which is provided in the alternate route defining unit 6, extracts the faulty present PVC route and the alternate route list 57 from the faulty PVC route switching table 8. A connection information analyzing unit (CONNECTION ANALYSIS) 102 converts connection information regarding a vacant band and traffic characteristic of connection, which were. acquired from the ATM network resource managing means 2 and a PVC connection managing means 3, to weighted values, and changes the priority order of the alternate route in accordance with the weighted values in the alternate route automatically defining unit (ALTERNATE ROUTE AUTOMATIC DEFINITION) 101. After the changed priority order is input to the alternate route new priority order table (NEW PRIORITY TABLE) 93, the priority order of the alternate route list 57 are updated in the faulty route switching table 8. In this case, it is possible to previously set parameters when executing the weight in accordance with input by the operator from the console 94.

As explained above, in the tenth embodiment, as shown in FIG. 15, when there are a plurality of alternate routes, it is possible to automatically set the priority order for the optimum alternate route based on connection situation when the fault occurs.

Figure 38:
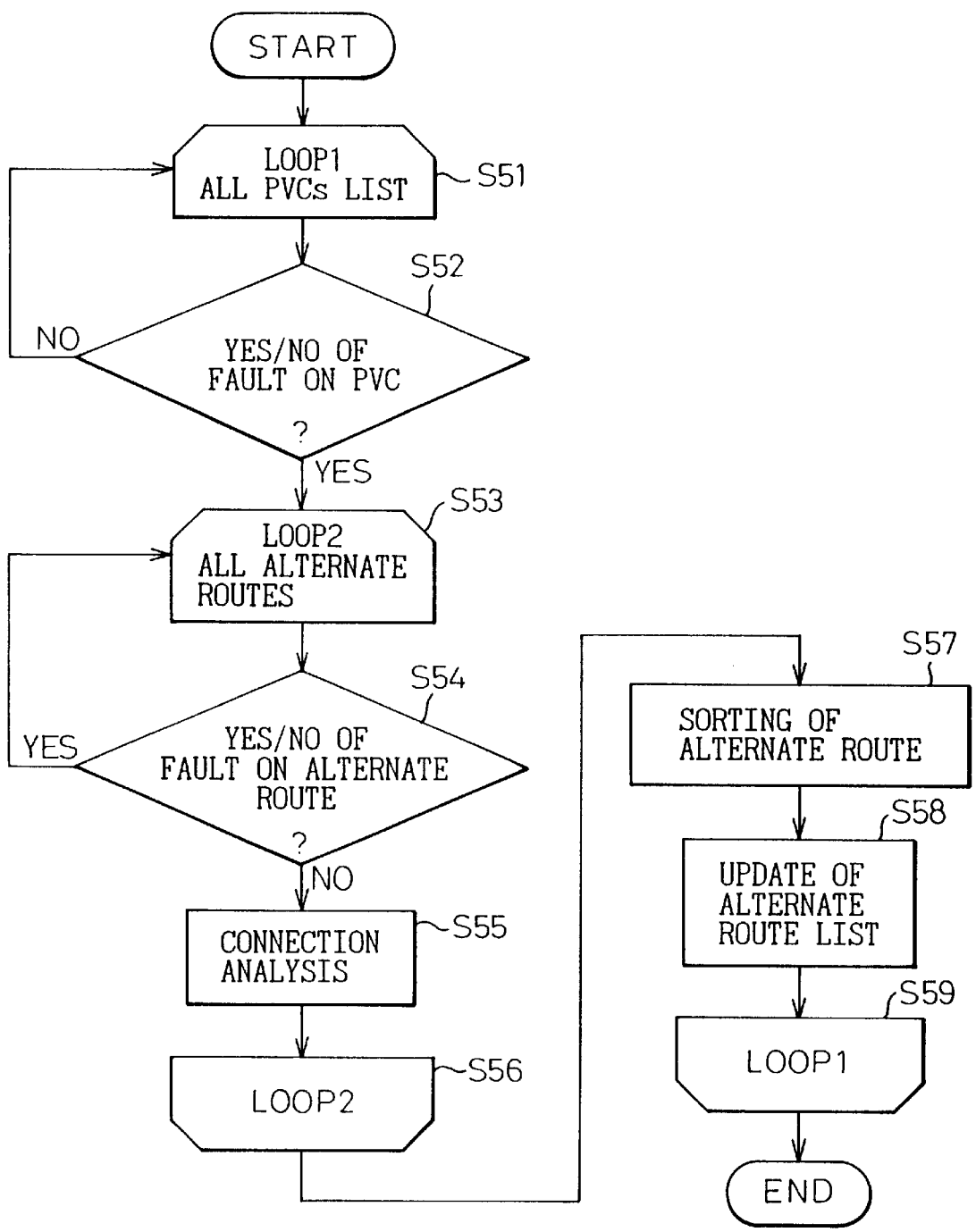
FIG. 38 shows a concrete example of automatically changing steps of an alternate route priority order when the fault occurs.

FIG. 38 shows a concrete example of automatically changing steps of the alternate route priority order when the fault occurs. In the following flowcharts, "LOOP" denotes searching operation for all PVC or alternate routes in the PVC list or the alternate list. Further, "YES" denotes presence of fault, and "NO" denotes absence of fault.

When the fault occurs, the PVC is extracted one by one from the PVC list in the faulty PVC route switching table 18, and the extracted PVC is sent to the alternate route automatically defining unit 101 with the alternate route list 57 (step S51). The alternate route automatically defining unit 101 determines whether the fault of the PVC occurs or not based on the fault which has already occurred, for each PVC sent from the PVC list 56 and the alternate route list 57 (step S52). The PVCs which are not relevant to the fault are eliminated from the above process.

In the faulty PVC, the alternate route is extracted from the alternate list 57 for the PVC (step S53), and whether the alternate route can be used or not is determined depending on the fault is determined (step S54).

For the alternate route in which the fault does not occur, a connection information analyzing unit 102 acquires connection information for constituent apparatuses of the alternate route, and the priority order of the alternate route is set in accordance with weighted values which were previously set (step S55). The above processes are executed on all alternate routes in which the fault does not occur (step S56). Further, the set data are sorted in the alternate route new priority order table based on the priority order for the numeralized alternate route (step S57). The result is reflected in the alternate route list 57 (step S58). The above processes are executed for all faulty PVC (step S59) so that it is possible to automatically change the priority order in this embodiment.

An Eleventh Embodiment

Next, as the eleventh embodiment, when there are a plurality of alternate routes in the first embodiment, a line margin for line interface or connection in each structural element of the alternate route candidate when the fault occurs, is assumed from transmission amount of cells or traffic information in the network managing system (NMS) during a predetermined interval before the fault occurs, and the information extracted from the network managing system and the actual network is compared. As result, it is possible to realize automatic setting of the optimum alternate route switching order having a small traffic amount in the rerouting system.

Figure 16:
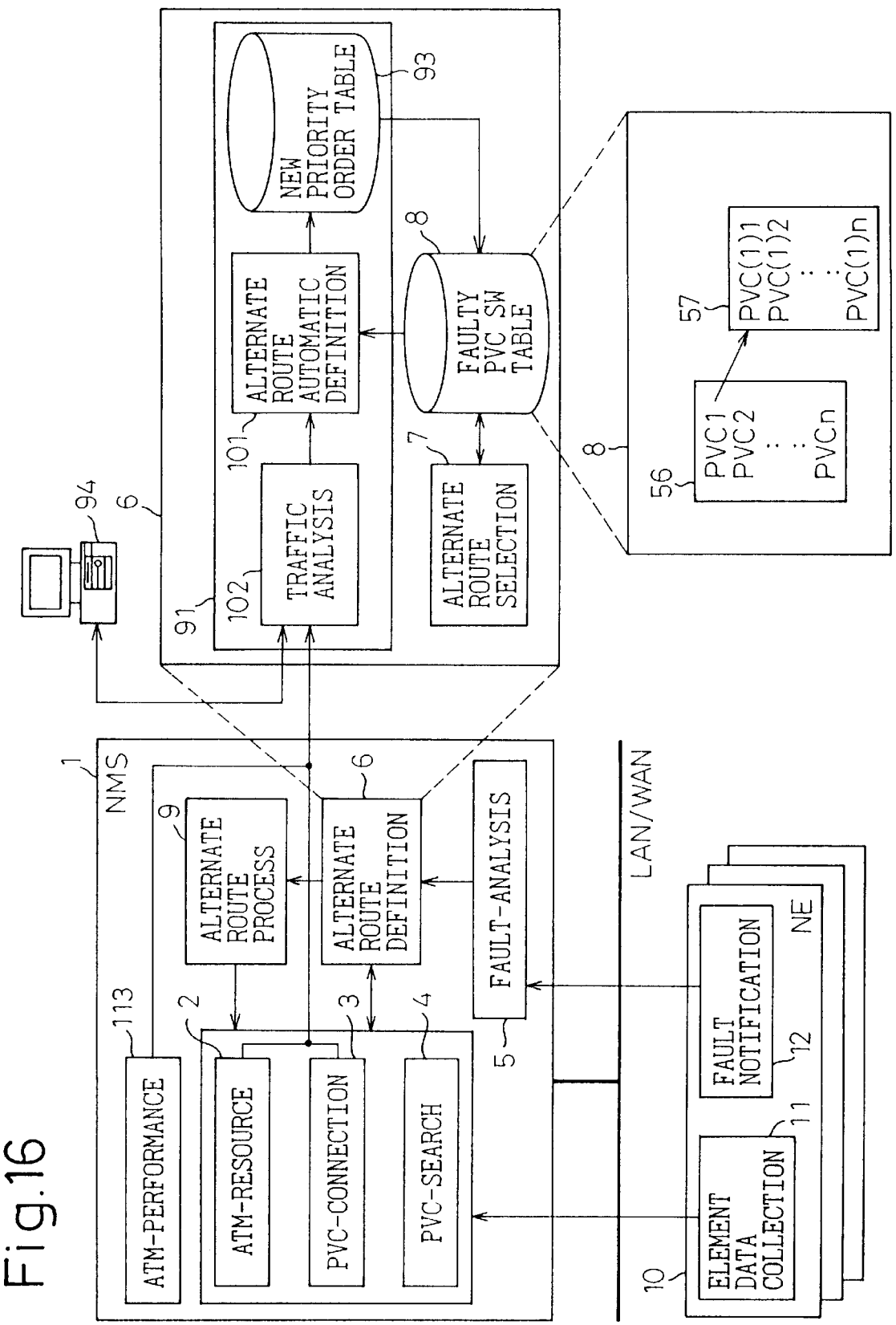
FIG. 16 is a basic structural view of a rerouting system according to an eleventh embodiment of the present invention.

FIG. 16 is a basic structural view of a rerouting system according to the eleventh embodiment of the present invention. An alternate route automatically defining unit (ALTERNATE ROUTE AUTOMATIC DEFINITION) 101 is provided based on traffic information in this embodiment.

When the fault occurs, the alternate route priority order defining unit 91 in the alternate route defining unit 6 extracts the faulty present route and the alternate route list 57 from the faulty PVC route switching table 8. The line margin is assumed from the transmission amount of cells during a constant period before the fault and the past traffic information in the network managing system 1 for the line interface and connection, which are acquired from the ATM network resource managing unit 2, the PVC connection managing unit 3 and an ATM network performance managing unit (ATM-PERFORMANCE) 113 for each alternate route. The result is converted to the weighted numerals in a traffic information analyzing unit (TRAFFIC ANALYSIS) 102.

After the above, the priority order of the alternate route is changed in accordance with the weighted values in the alternate route automatically defining unit 101, the changed priority orders are input into the alternate route new priority order table 93, and the priority order of the alternate route list 57,is updated in the faulty route switching table 8. In this case, it is possible to previously set the parameters when executing the weight, in accordance with the input to the console 94 by the operator.

As explained above, in the eleventh embodiment, as shown in FIG. 16, when there are a plurality of alternate routes, it is possible to automatically set the priority order for the optimum alternate route from the traffic state when the fault occurs.

Figure 39:
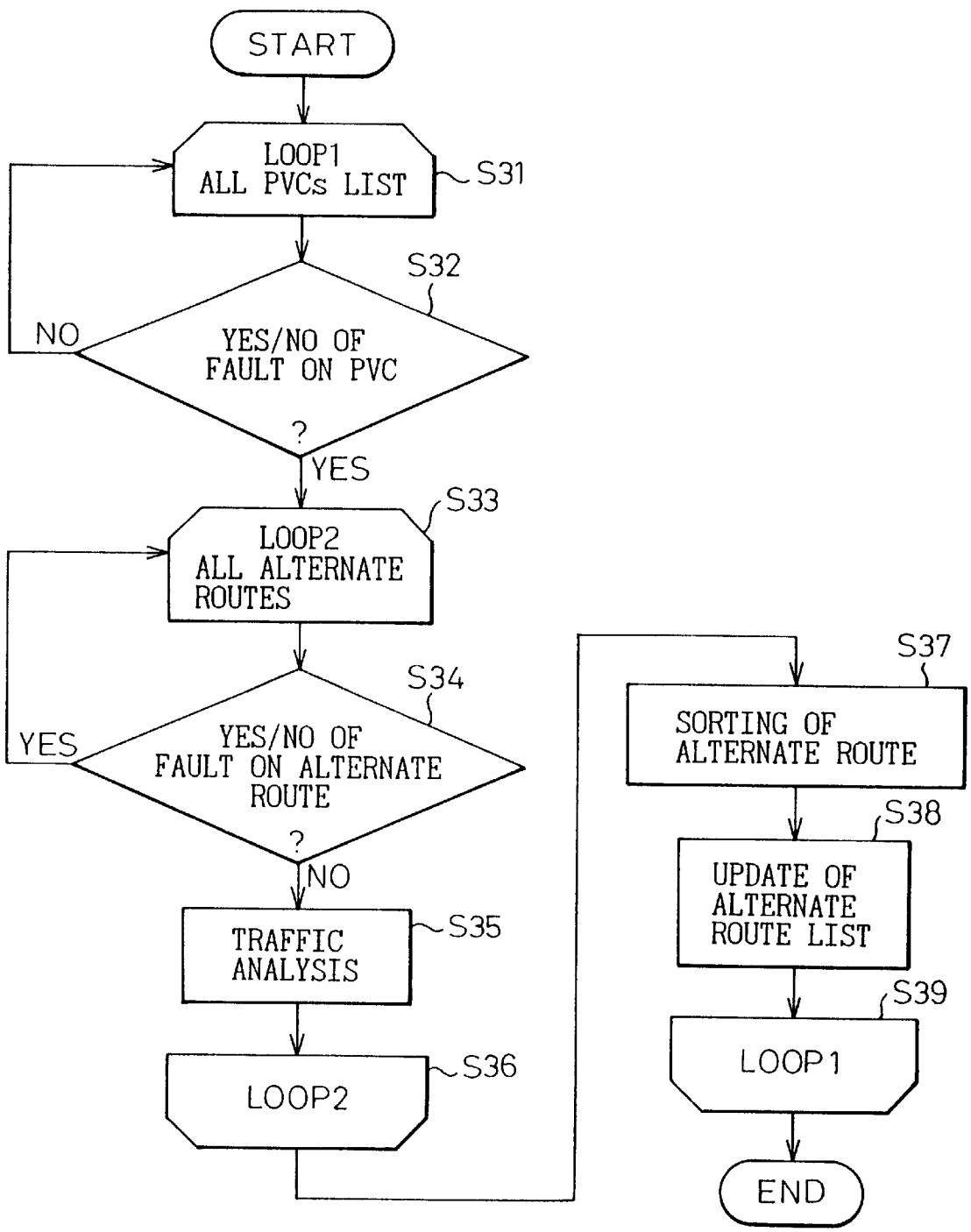
FIG. 39 shows another concrete example of automatically changing steps of the alternate route priority order when the fault occurs.

FIG. 39 shows another concrete example of automatically changing steps of the alternate route priority order when the fault occurs. When the fault occurs, the PVC is extracted one by one from the PVC list 56 in the faulty PVC route switching table 18, and the extracted PVC is sent to the alternate route automatically defining unit 101 with the alternate route list 57 (step S31). The alternate route automatically defining unit 101 determines whether the fault occurs in the PVC due to the fault which occurred in each PVC sent from the PVC list 57 (step S32). In this case, the PVC which is not relevant to the fault is eliminated from the above process as it is not necessary to execute alternation.

In the faulty PVC, the alternate route is extracted from the alternate route list 57 for each PVC (step S33) and whether the extracted route can be used or not due to the fault is determined (step 34).

For the alternate route in which the fault does not occur, the traffic information analyzing unit 102 acquires connection information for the constituent apparatus of the alternate route, and the alternate route priority orders are numeralized based on the weighted values which were previously set (step S35). The above processes are executed to all alternate routes in which the fault does not occur (step S36). The numeralized data are sorted in the alternate route new priority order table based on the priority order of the numeralized alternate route (step S379. The result is reflected to the alternate route list 57 (step S38). The above processes are executed for all PVCs in which the fault. occurs (step S39) so that it is possible to realize automatic change of the priority order.

A Twelfth Embodiment

Next, as the twelfth embodiment, when there are a plurality of alternate routes in the first embodiment, and when the fault occurs, an activity ratio of a CPU in the network element NE including each structural element of the alternate PVC route candidate is extracted from the network managing system and the actual network so that it is possible to realize an automatic setting of the optimum alternate route switching order having a small load on the CPU in the rerouting system.

Figure 17:
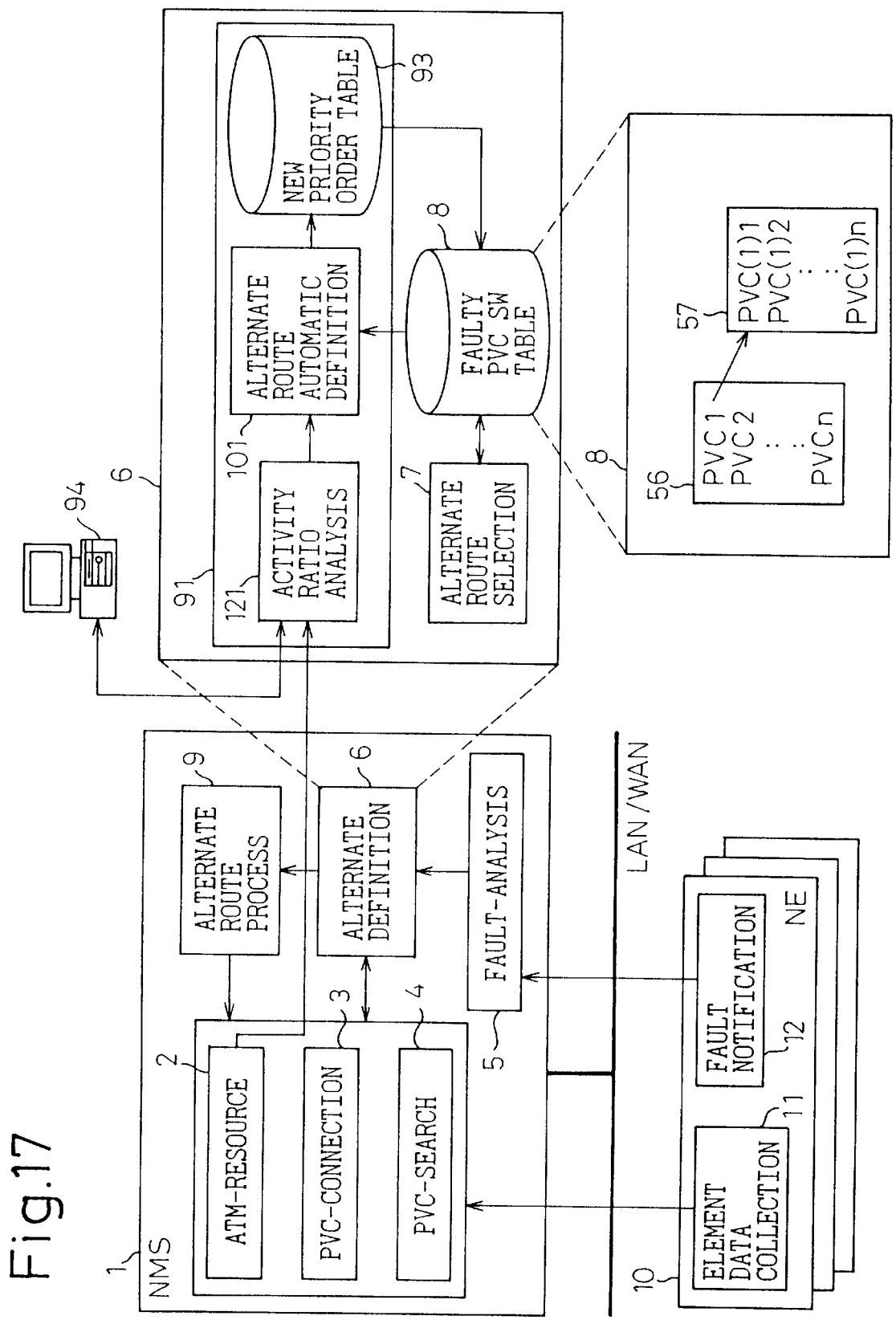
FIG. 17 is a basic structural view of a rerouting system according to a twelfth embodiment of the present invention.

FIG. 17 is a basic structural view of a rerouting system according to the twelfth embodiment of the present invention. An activity ratio of a CPU analyzing unit (ACTIVITY RATIO ANALYSIS) 121 is connected to the ATM network resource managing unit 2 and the console 94. Further, the activity ratio of the CPU analyzing unit 121 is connected to the alternate route automatically defining unit 101. In this case, the CPU is provided in the network element 10.

When the fault occurs, the alternate route priority order defining unit 91 in the alternate route defining unit 6 extracts the faulty present route and the alternate route list 57 from the faulty PVC route switching table 8, and converts the activity ratio of the CPU at the network element NE, which was acquired from the ATM network resource managing means 2 for each alternate route at that time, to the weighted valves.

After the above processes, the alternate route automatically defining unit 101 changes the priority order of the alternate route in accordance with the weighted values, and updates the priority order of the alternate route list 57 in the faulty route switching table 8 after the changed priority order was input to the alternate route new priority order table 93. In this case, it is possible to previously set the parameters when executing the weight based on the input from the console 94 by the operator.

As explained above, in the twelfth embodiment, as shown in FIG. 17, when there are a plurality of alternate routes, it is possible to automatically set the priority order of the optimum alternate route based on the activity ratio of the CPU in the network element NE when the fault occurs.

Figure 40:
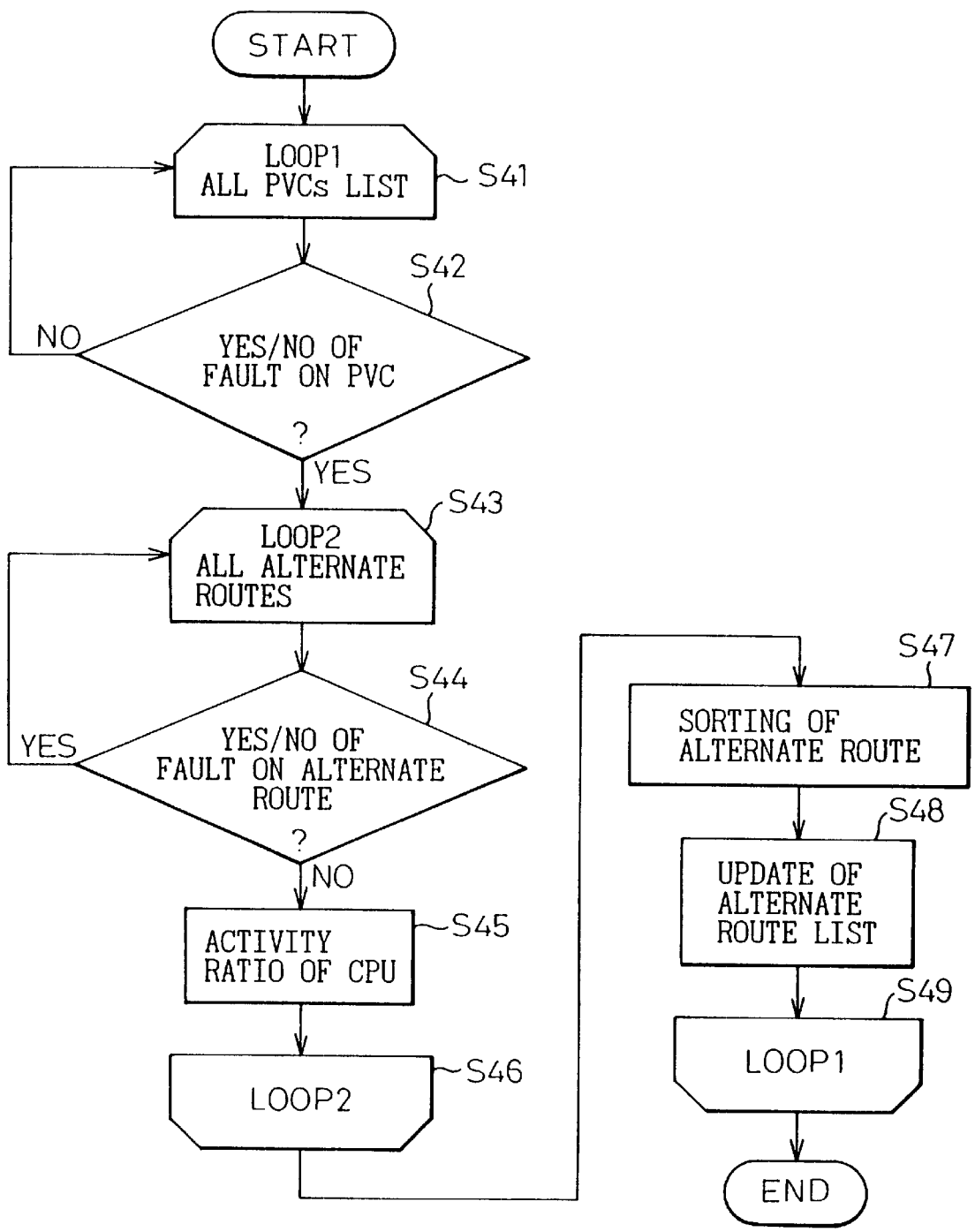
FIG. 40 shows still another concrete example of automatically changing steps of the alternate route priority order when the fault occurs.

FIG. 40 shows still another concrete example of automatically changing steps of the alternate route priority order when the fault occurs. When the fault occurs, the PVCs are extracted one by one from the PVC list 56 in the faulty PVC switching table 18, and the extracted PVCs are sent to the alternate route automatically defining unit 101 (step S101). The alternate route automatically defining unit 101 determines whether the fault occurs in a PVC which was sent from the PVC list 56 (step S42). In this case, a PVC which is not relevant to the fault is eliminated from the rerouting process since it is not necessary to execute alternation.

In the faulty PVC, the alternate route is extracted from the alternate route list 57 for each PVC (step S43), whether the alternate route can be used or not due to the fault is determined (step S44). For the alternate route in which the fault does not occur, a CPU activity ratio analyzing unit 121 acquires connection information for constituent apparatuses of the alternate route, and the alternate priority order is numeralized based on the weighted value the previously set (step S45). The above processes are executed for all alternate routes which the fault does not occur (step S46), and is sorted in the alternate route new priority order table based on the priority order for the numeralized alternate route (step S47). The result is reflected into the alternate route list 57 (step S48). It is possible to realize automatical change of the priority order when the above processes are executed for all faulty PVCs (step S49).

A Thirteenth Embodiment

Next, as the thirteenth embodiment, the VP/VC for the alternate PVC is previously set on the alternate route in the sixth embodiment, there is situation in which the VP/VC for the PVC to be alternated has been already completed on the alternate line when executing alternation. When the line is disconnected, it is possible to switch only connections at a start point and end point of alternation in the rerouting system.

In the thirteenth embodiment, the following value is added to the flag in the alternate PVC information 71 in the seventh embodiment.

flag which has been already provided (below, present flag) which indicates that the VP/VC for the alternate PVC is previously set on the designated segment at registration.

Based on the above, there are three possible flag values, i.e., new value, diverted value and present value, and the additional values are previously set as the alternate PVC information 71 with the segment collection 62 and the alternate route collection 63 at registration.

As explained above, the alternate route processing unit 9 further includes the following process variation in the rerouting process described in the seventh embodiment. That is, when the flag indicates the present value for the segment of the alternate route, both end terminal points of the segment are connected to the opposite terminal points since the VP/VC for the alternate PVC already exists.

As explained above, in the thirteenth embodiment, when the fault occurs, and when only a faulty segment is alternated based on the alternate route information for each segment which is previously held in each PVC, it is possible to realize a quick alternation process, compared to a new setting of the VP/VC at rerouting process, by previously setting the VP/VC for the alternate PVC.

Figure 41:
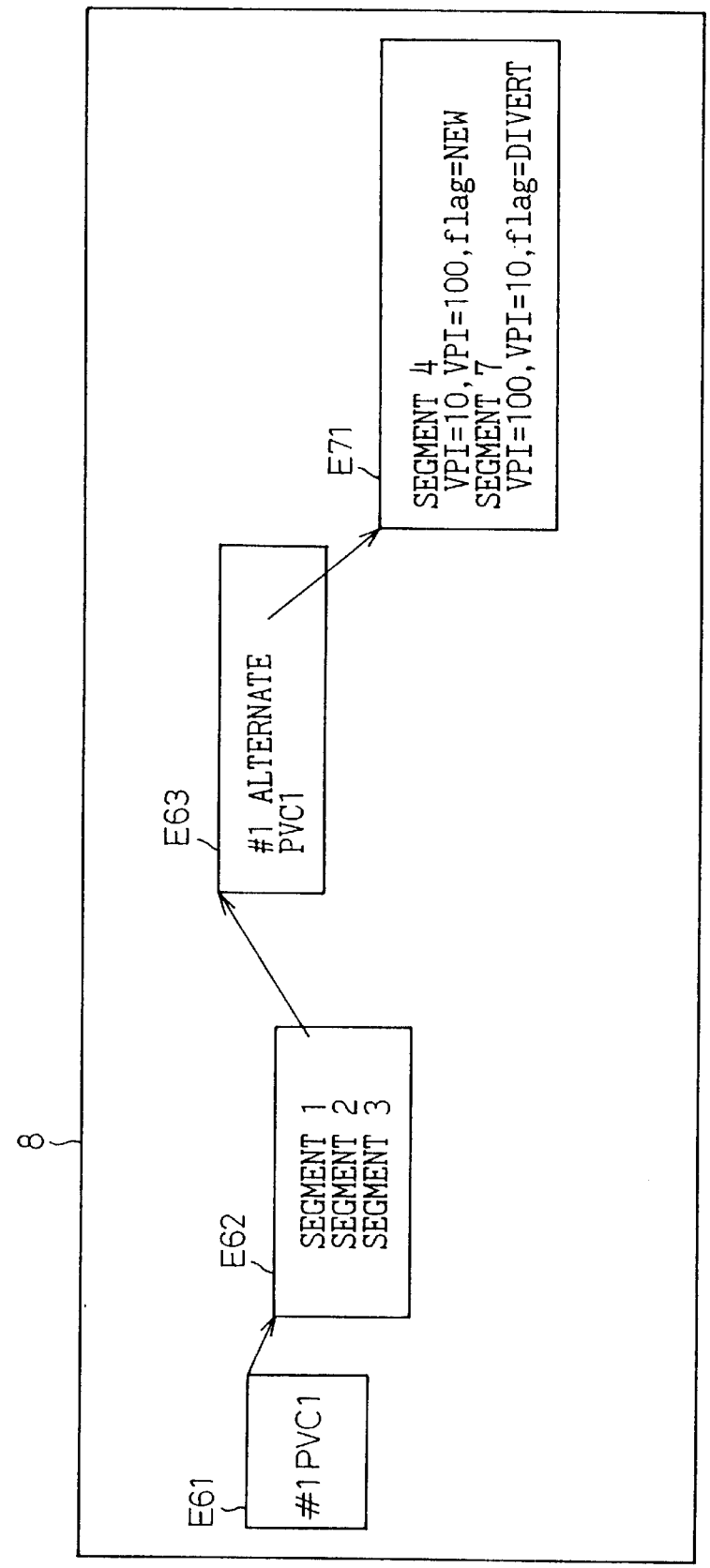
FIG. 41 shows still another example of the faulty route changeable table.
Figure 42:
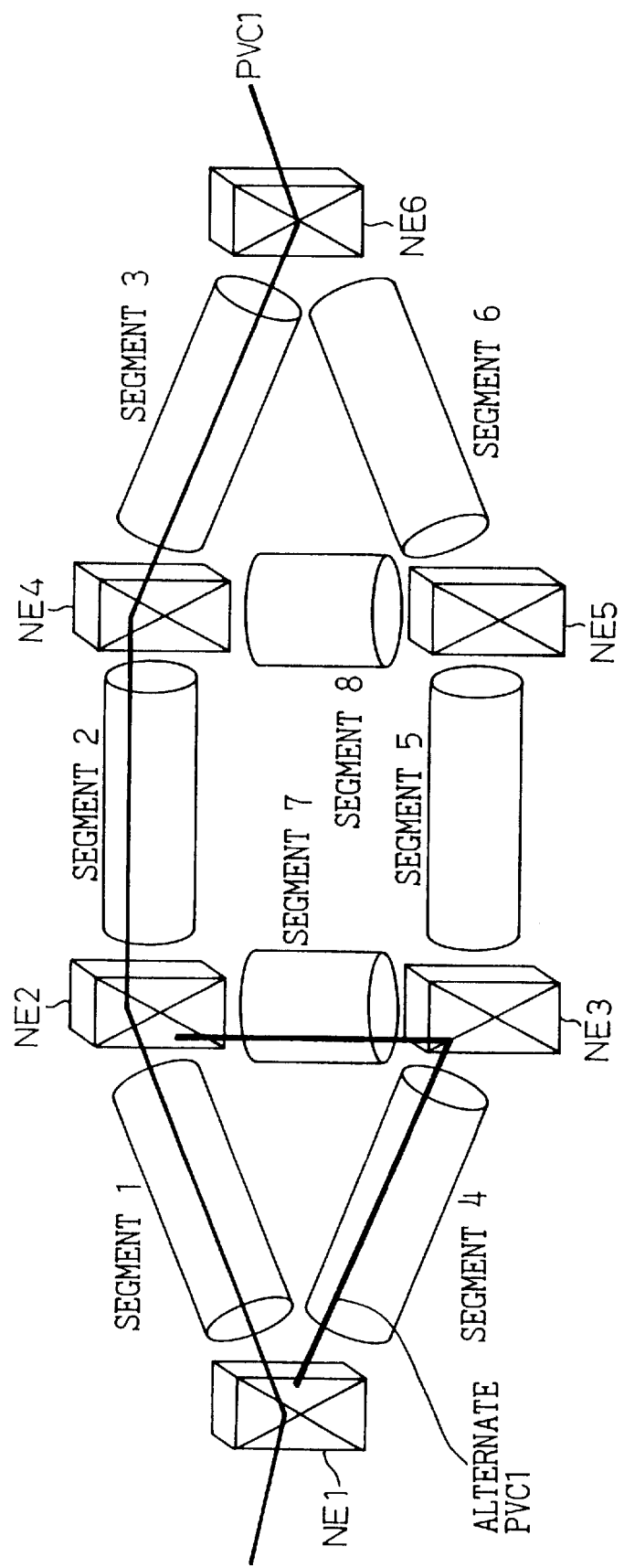
FIG. 42 shows a concrete example of the thirteenth embodiment according to the present invention.

FIG. 41 shows still another example of the faulty route changeable table, and FIG. 42 shows a concrete example of the thirteenth embodiment. As shown in FIG. 42, when one PVC (PVC1) is set on the network to be managed, the PVC1 includes different alternate routes (in this embodiment, only the list E63 is shown) for the segment list E62 contained in the PVC1 and each segment in the list. In this case, for the alternate PVC1 of the alternate route list E63 for the segment 1, the segment information containing the alternate PVC1 is held as the segment list E71.

In this embodiment, the alternate PVC1 includes the segment 4 and segment 7 in the segment information list E71. At that time, the segment 4 includes parameters necessary for the ATM connection, for example, VPI/VCI information and band information, and further sets the segment flag information (flag present). In this case, "flag= present" indicates that the VP/VC for the alternate PVC is already set for the segment 4 when the alternate PVC was registered. Accordingly, in the rerouting process, without setting of new VP/VC for the alternate PVC, only both end terminal points of the segment 4 are connected to the terminal points of the opposite segment. The segment flag information (flag diverted) in the segment 7 is the same contents as explained in the seventh embodiment.

A Fourteenth Embodiment

Next, as the fourteenth embodiment, there are means for sharing the alternate route by a plurality of main routes, and means for notifying shared situation and used situation of the alternate route, in the rerouting system.

Figure 18:
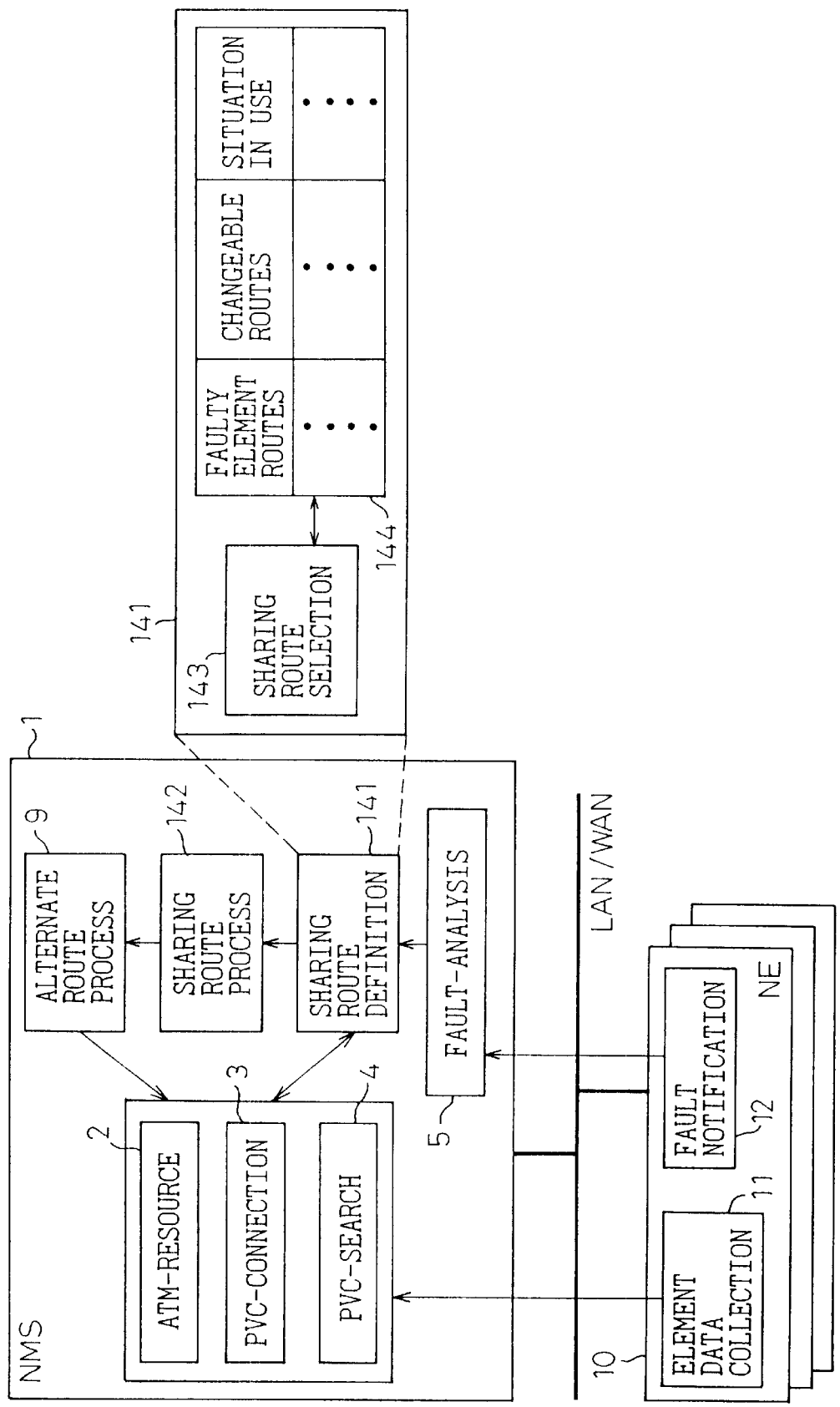
FIG. 18 is a basic structural view of a rerouting system according to a fourteenth embodiment of the present invention.
Figure 19:
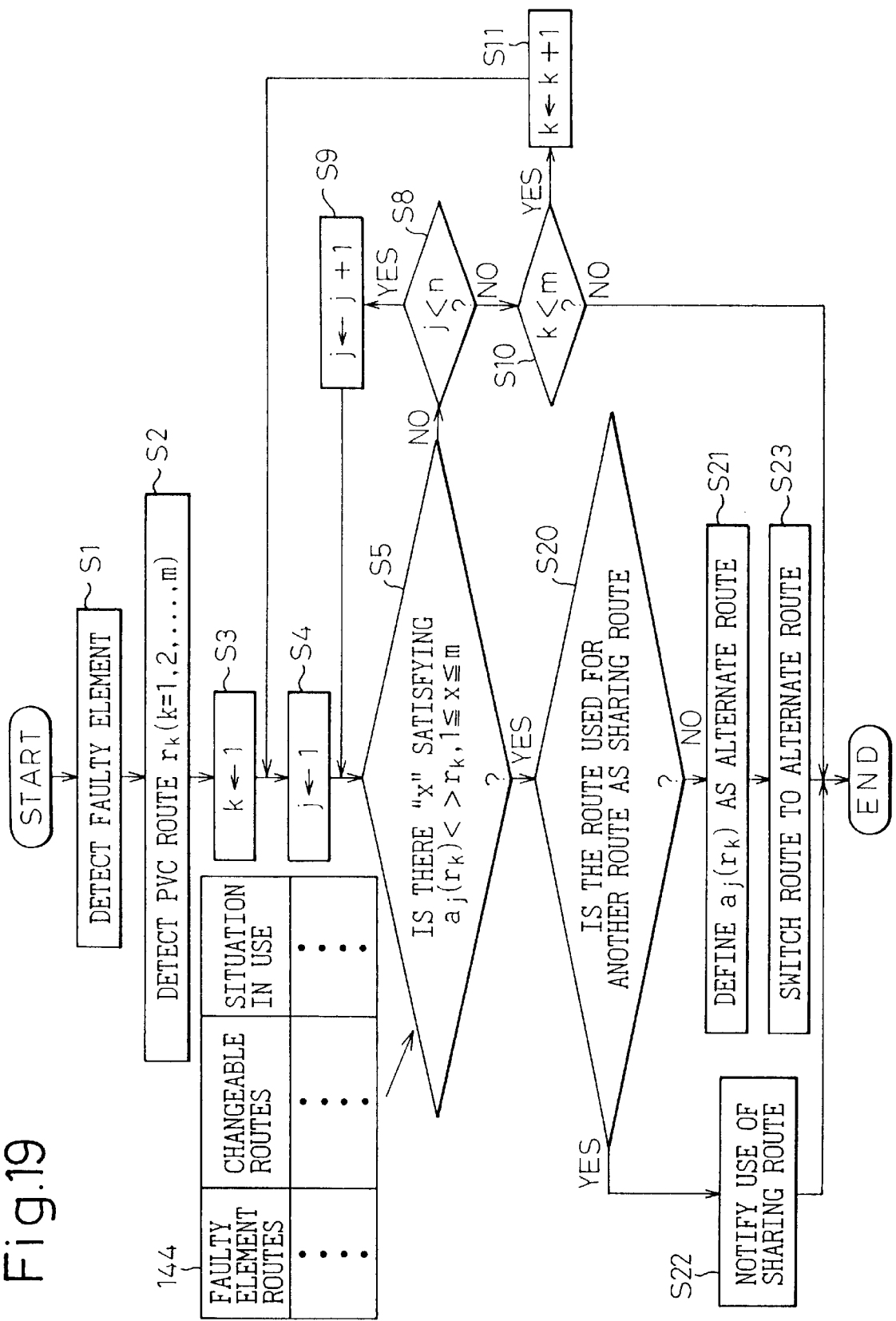
FIG. 19 is a process flowchart of the fourteenth embodiment according to the present invention.

FIG. 18 is a basic structural view of a rerouting system according to the fourteenth embodiment of the present invention, and FIG. 19 is a flowchart in the fourteenth embodiment.

In the elements indicated by the faulty event analyzing means 5 as a faulty source, the PVC defined as the changeable route is detected by a sharing route defining unit (SHARING ROUTE DEFINITION) 141, and shared situation and used situation is confirmed by a sharing route selecting unit 143 (step S20). When the PVC route is not used, the rerouting process is executed by the alternate route processing unit 9 (steps S21 and S23). Reference number 142 denotes a sharing route processing unit (SHARING ROUTE PROCESS), and 144 denotes a sharing PVC route table which is formed by the faulty element containing PVC routes, the changeable PVC routes and a sharing and using situation of route (SITUATION IN USE).

When the PVC route is used, for all shared (overlapped) changeable PVC routes, the information in which the route is changed due to the fault of main route and the sharing route is in use, is notified (step S22).

As mentioned above, in the fourteenth embodiment, since there are means for sharing the alternate route by a plurality of main routes, and means for notifying situation of share and use of the alternate route, it is possible to get the information of the vacant resource and to get the influence to the main route due to the fault of the alternate route.

Figure 43:
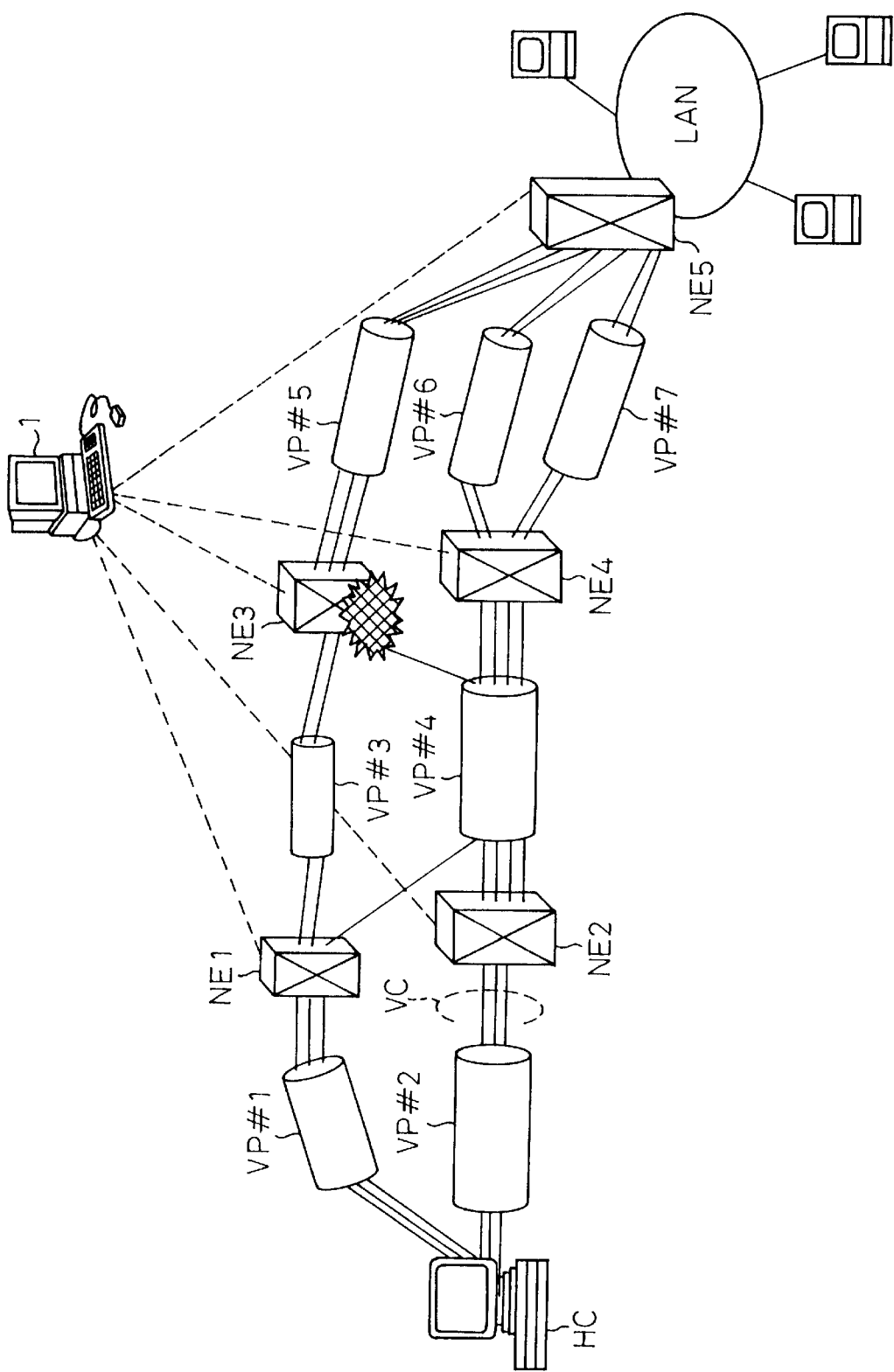
FIG. 43 shows still another concrete example in the fourteenth embodiment.
Figure 44:
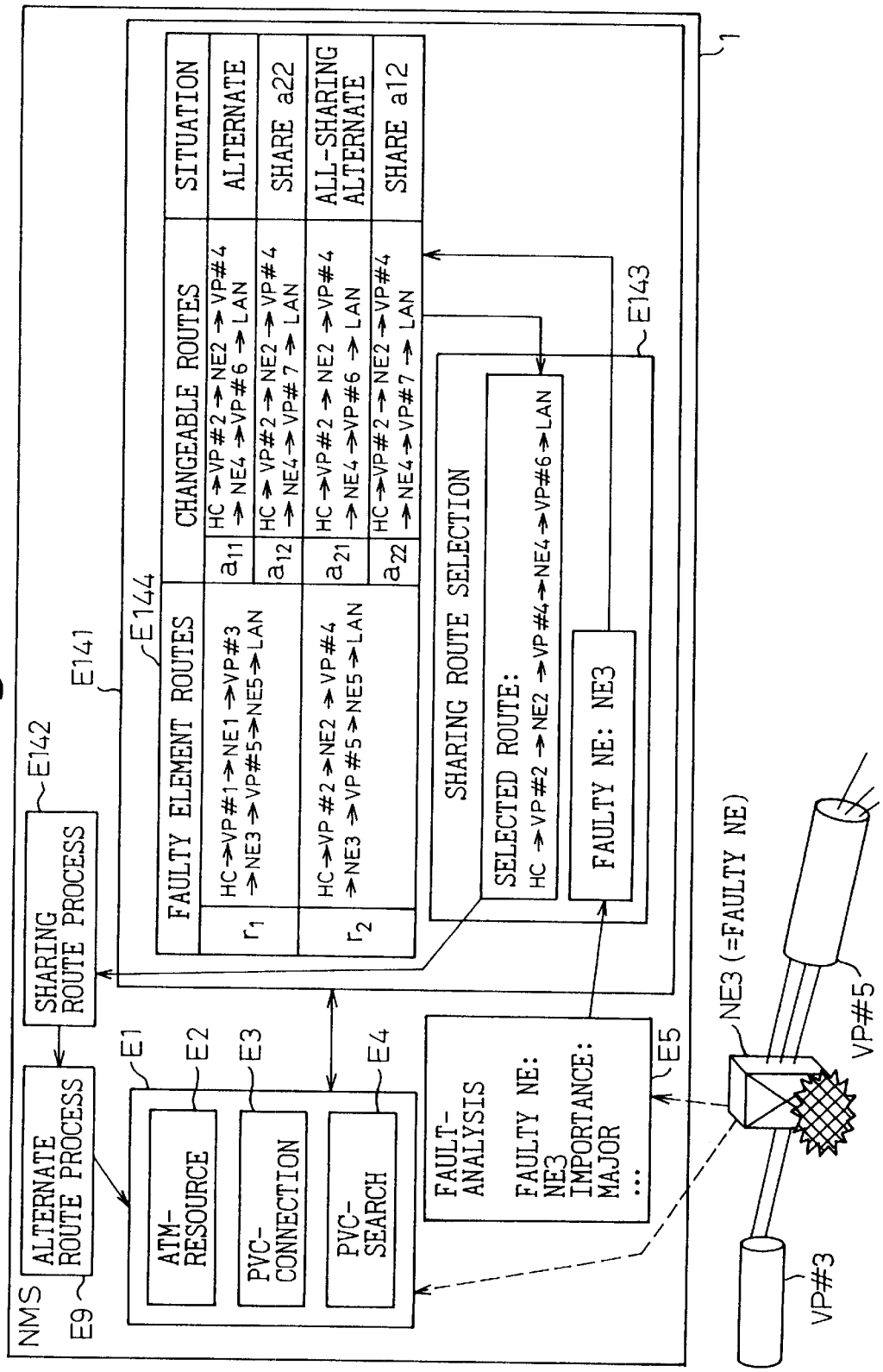
FIG. 44 shows still another concrete example of the network managing system in the fourteenth embodiment.

FIGS. 43 and 44 show still another concrete example in the fourteenth embodiment. In this embodiment, the faulty event analyzing unit E5 receives faulty information from the ATM exchange NE3, and the alternate route selecting unit E7 searches the faulty element containing PVC route from the faulty PVC route switching table E8. In this embodiment, the following routes $r_1$ and $r_2$ correspond to the faulty element containing PVC routes, i.e., $r_1$: host computer HC→VP#1→NE1→VP#3→NE3 →PV#5→NE5→LAN, and $r_2$: host computer HC→VP#2→NE2→VP#4→NE3 →PV#5→NE5→LAN.

In the case of the faulty element containing PVC route $r_1$, an alternate route confirming unit 19 executes the alternation process from the following changeable PVC route, i.e., $a_{11}$: host computer HC→VP#2→NE2→VP#4→NE4 →PV#6→LAN, and $a_{12}$: host computer HC→VP#2→NE2→VP#4→NE4 →PV#7→LAN, along the algorithm shown in FIG. 14.

Further, shared situation and used situation of the changeable PVC route $a_{11}$ is changed in the alternation, and situation of the following changeable PVC route which shares the same route as the changeable PVC route $a_{11}$, i.e., $a_{21}$: host computer HC→VP#2→NE2→VP#4→NE4 →PV#6→LAN, is changed to situation in which another route is in use for alternation.

On the other hand, the changeable PVC route $a_{12}$ and the following route, i.e., $a_{22}$: host computer HC→VP#2 →NE2→VP#4→NE4→PV#7→LAN, shares the alternate route. However, since it is not in alternation, the route is maintained as situation of the shared PVC.

According to the present invention, briefly, in the case that the network element groups are activated on the network, when the fault occurs in a part of structural elements of the PVC route, it is possible to realize quick rerouting process for changing to the PVC of another route in manual/ automatical operation. Accordingly it is possible to realize the rerouting process for each network at the network managing operation as the operation in the network managing system.

What is claimed is:

1. A method of rerouting a PVC route on an ATM network, including steps of:

previously defining a plurality of alternate routes for the PVC route which are managed in an ATM network managing system; and switching the PVC route to one of the previously defined alternative routes when a fault occurs in a network element forming the PVC route.

2. A method of rerouting a PVC route in an ATM network as claimed in claim 1, further comprising step of determining an order of relief for a plurality of PVC routes in accordance with information of importance in which each PVC route previously holds when the fault occurs, and rerouting the PVC route based on the order of relief.

3. A method of rerouting a PVC route in an ATM network as claimed in claim 1, further comprising step of executing a check of situation of the alternate route when the defined route cannot be used as the alternate route due to the fault or when a route is not defined as the alternate route, and notifying the situation.

4. A method of rerouting a PVC route in an ATM network as claimed in claim 1, further comprising a step of notifying whether an alternation route should be returned to a previous route before alternation when the previous route is recovered during use of the defined alternate route, and a step of returning to the previous route.

5. A method of rerouting a PVC route in an ATM network as claimed in claim 1, further comprising steps of, when defining the alternate route or at any time, comparing the alternate rout with the previous route before alternation for each structural element of the PVC route on the alternate route defined when executing an actual switching process; sorting an element necessary for newly preparing in the alternate route after alternation; with an element which can utilize the present element before alternation; and previously defining an effective switching order so as to omit decision process when executing switching process.

6. A method of rerouting a PVC route in an ATM network as claimed in claim 1, further comprising steps of previously setting the alternate route for each segment, and re-setting the alternate route for only segment which is disconnected, and making the alternate route which reroutes between only faulty segments on the PVC which includes a plurality of segments.

7. A method of rerouting a PVC route in an ATM network as claimed in claim 6, further comprising steps of determining whether a present VP/VC on the alternate route can be utilized or not as the alternate route at registration of the same; executing registration as the alternate route for the VP/VC which was determined as the alternate route which can be utilized; and diverting an element VP/VC of another PVC route which exists on the alternate route.

8. A method of rerouting a PVC route in an ATM network as claimed in claim 1, further comprising steps of providing an interactive means for a maintenance operator when executing alternate route switching process; providing a relief order information of a faulty PVC route, an attribute information of the faulty PVC route, and a candidate information of changeable PVC route to the maintenance operator; and determining the alternate route based on the maintenance operator's decision.

9. A method of rerouting a PVC route in an ATM network as claimed in claim 1, further comprising a step of, when there are a plurality of alternate routes, designating a priority order of change of the route in an alternate route list for each route, at registration by the maintenance operator or at any time, so that the flexibility of route selection can be increased.

10. A method of rerouting a PVC route in an ATM network as claimed in claim 1, further comprising a step of, when there are a plurality of alternate routes, extracting a degree of margin for an average value or a maximum value of a band in each structural element of the alternate route candidate from a resource managing function and an actual network when the fault occurs, so that an optimum changing order of the alternate route having a margin for the resource can be automatically set in the network managing system.

11. A method of rerouting a PVC route in an ATM network as claimed in claim 1, further comprising a step of, when there are a plurality of alternate routes, assuming a line margin for line interface or connection in each structural element of the alternate route candidate when fault occurs, from transmission amount of cells or traffic information in the network managing system during a predetermined interval before the fault occurs; and comparing the information extracted from the network managing system and the actual network, so that a switching order of an optimum alternate route having little traffic amount can be automatically set.

12. A method of rerouting a PVC route in an ATM network as claimed in claim 1, further comprising a step of, when there are a plurality of alternate routes, extracting an activity ration of a CPU in the network element NE including each structural element of the alternate PVC route candidate when the fault occurs, from the network managing system and the actual network, so that an optimum alternate route switching order having little load of a CPU can be automatically set.

13. A method of rerouting a PVC route in an ATM network as claimed in claim 6, further comprising steps of previously setting a VP/VC for a PVC route on the alternate route, providing situation in which the VP/VC for the PVC route to be alternated has been already completed on the alternate line when executing alternation, and switching only connections at a start point and end point of alternation when the line is disconnected.

14. A method of rerouting a PVC route in an ATM network as claimed in claim 1, further comprising steps of providing means for sharing the alternate route by a plurality of main routes, and providing means for notifying shared situation and used situation of the alternate route.

15. A network management system connected to a plurality of network elements provided on a permanent virtual channel (PVC) route through a predetermined communication network, each network element including an element data collecting means and a fault notifying means, and the system comprising:

an ATM network resource managing means for managing resources included in the ATM network;

a PVC route connection managing means connected to the element data collecting means through the communication network for managing situation of connection of the PVC route;

a PVC route searching means for searching a plurality of PVC routes;

a fault event analyzing means for receiving a fault from the fault notifying means through the communication network when the fault occurs at any one of the network elements, and analyzing the fault;

an alternate route defining means for previously defining a plurality of alternate routes for the PVC route; and an alternate route processing means for switching a faulty route to one of the plurality of alternate routes defined by the alternate route defining means when the fault occurs at any one of network elements.

16. A network management system as claimed in claim 15, wherein the alternate route defining means comprises and alternate route selecting unit and a faulty PVC route switching table, wherein the alternate route selecting unit selects any one of PVC routes from the faulty PVC route switching table, and the faulty PVC route switching table is formed by a plurality of faulty element containing PVC routes and a plurality of changeable PVC routes each corresponding to each faulty element containing PVC route.

17. A network management system as claimed in claim 15, further comprising a PVC relief order determining means connected between the faulty event analyzing means and the alternate route defining means, for determining an order of relief for the PVC route based on information of importance which is previously held in each PVC route, when the fault occurs, wherein the PVC connection managing means includes connection information which are defined by an importance of a customer, an importance of continuity, a service class and a designation value by an operator, in order to select the alternate route.

18. A network management system as claimed in claim 15, further comprising an alternate route confirming means connected between the alternate route defining means and the alternate route processing means, for checking and notifying situation of another alternate route, when the defined alternate route cannot be used due to a fault, or when the alternate route has not yet defined.

19. A network management system connected to a plurality of network elements provided on a permanent virtual channel (PVC) route through a predetermined communication network, each network element including an element data collecting means and a recovery notifying means, the system comprising:

an ATM network resource managing means for managing resources included in the ATM network;

a PVC connection managing means connected to the element data collecting means through the communication network for managing a situation of connection of the PVC route;

a PVC route searching means for searching a plurality of PVC routes;

a recovery event analyzing means for receiving a recovery information from the recovery notifying means through the communication network when the fault recovered at any one of network elements, and analyzing the recovery information from the recovery notifying means;

a previous route defining means for defining a route before alternation; and a recovery processing means for recovering the route.

20. A network management system as claimed in claim 19, wherein the previous route defining means comprises a route selecting unit before alternation and a recovery PVC route switching table, wherein the route selecting unit selects any one of the PVC routes before alternation from the recovery PVC route switching table, and the recovery PVC route switching table is formed by a plurality of alternate PVC routes, a plurality of routes during alternation and a plurality of recovery element containing PVC routes.

21. A network management system as claimed in claim 15, wherein the alternate route defining means comprises an alternate route establishing steps defining means, an alternate route selecting means, and a faulty PVC route switching table; wherein the alternate route establishing steps defining means includes: a PVC route overlap determining unit for determining overlap of the PVC route, an alternate route establishing steps analyzing unit, a data storage for storing route difference data, and an alternate route establishing steps data storage; and wherein the faulty PVC route switching table includes a PVC route list, an alternate route list and an alternate route preparing steps list.

22. A network management system as claimed in claim 16, wherein the faulty PVC route switching table is formed by the plurality of faulty element containing PVC routes having a PVC route collection list and a segment collection list in which one PVC route in the PVC route collection list corresponds to one segment collection list, and the changeable PVC route having an alternate route collection list in which one segment in the segment list corresponds to the alternate route collection list.

23. A network management system as claimed in claim 22, wherein the changeable PVC route further includes an alternate route PVC information list having a plurality of segments each having VP, VC and flag information, in which one PVC route in the alternate route collection list corresponds to the alternate route PVC information list.

24. A network management system as claimed in claim 15, further comprising a maintenance/interaction processing means connected between the alternate route defining means and a maintenance operator's terminal.

25. A network management system as claimed in claim 16, wherein the alternate route defining means further comprises a maintenance/interaction switching unit.

26. A network management system as claimed in claim 16, wherein the alternate route defining means includes an alternate route priority order defining unit having an alternate route manually defining unit connected a console which is handled by an operator, and an alternate route new priority order table; and a faulty PVC route switching table having the PVC route list and the alternate route list in which one PVC route in the PVC list corresponds to the alternate route list.

27. A network management system as claimed in claim 16, wherein the alternate route defining means includes an alternate route priority order defining unit having a connection information analyzing unit connected to a console which is handled by an operator and further connected to the PVC connection managing means, an alternate route automatically defining unit, and an alternate route new priority order table; and a faulty PVC route switching table having the PVC list and the alternate route list in which on PVC route in the PVC list corresponds to the alternate route list.

28. A network management system as claimed in claim 15, further comprising an ATM network performance managing means, and wherein the alternate route defining means includes an alternate route priority order defining unit having a traffic information analyzing unit connected to a console which is handled by an operator and further connected to the PVC connection managing means and the ATM network performance managing means, an alternate route automatically defining unit, and an alternate route new priority order table; and a faulty PVC route switching table having the PVC list and the alternate route list in which one PVC route in the PVC list corresponds to the alternate route list.

29. A network management system as claimed in claim 16, wherein the alternate route defining means includes an alternate route priority order defining unit having an activity ratio of a CPU analyzing unit connected to a console which is handled by an operator and further connected to the ATM network resource managing means, an alternate route automatically defining unit, and an alternate route new priority order table; and a faulty PVC route switching table having the PVC list and the alternate route list in which one PVC in the PVC list corresponds to the alternate route list.

30. A network management system as claimed in claim 16, wherein the faulty route switching table includes a fault element containing PVC list, a segment list in which one PVC route in the faulty element containing PVC list corresponds to the segment list, an alternate route list in which one segment in the segment list corresponds to the alternate route list, and a segment list in which one alternate PVC route in the alternate route list corresponds to the segment list.

31. A network management system connected to a plurality of network elements provided on a permanent virtual channel (PVC) route through a predetermined communication network, each network element including an element data collecting means and a fault notifying means, the system comprising:

an ATM network resource managing means for managing resources included in the ATM network;

a PVC connection managing means connected to the element data collecting means through the communication network for managing situation of connection of the PVC route;

a PVC searching means for searching a plurality of PVC routes;

a faulty event analyzing means for receiving a fault from the fault notifying means through the communication network when the fault occurs at any one of the network elements, and analyzing the fault;

a sharing route defining means for previously defining a plurality of sharing routes for the PVC route;

a sharing route processing means for selecting an alternate sharing route from among the plurality of sharing routes; and an alternate route processing means for switching a faulty route to the alternate route defined by the sharing route processing means when the fault occurs at any one of the network elements.

32. A network management system as claimed in claim 31, wherein the sharing route defining means comprises a sharing route selecting unit and a sharing PVC route table, wherein the sharing route selecting unit selects the alternate route from among a plurality of PVC routes from the sharing PVC route table, and the sharing PVC route table is formed by a plurality of faulty element containing PVC routes, a plurality of changeable PVC routes each corresponding to each faulty element containing PVC route, and a plurality of sharing or used situations each corresponding to each changeable PVC route.

* * * * *